(12) United States Patent
Miller et al.

(10) Patent No.: US 8,979,969 B1
(45) Date of Patent: *Mar. 17, 2015

(54) METHOD AND SYSTEM FOR AGRICULTURAL FERTIGATION

(71) Applicants: John C Miller, Fresno, CA (US); Deborah L Miller, Fresno, CA (US)

(72) Inventors: John C Miller, Fresno, CA (US); Deborah L Miller, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,210

(22) Filed: Apr. 2, 2014

Related U.S. Application Data

(63) Continuation-in-part of application No. 13/385,736, filed on Mar. 5, 2012, now Pat. No. 8,721,758, which is a continuation-in-part of application No. 13/136,032, filed on Jul. 21, 2011, now Pat. No. 8,568,506, which is a continuation-in-part of application No. 12/283,448, filed on Sep. 12, 2008, now abandoned.

(60) Provisional application No. 61/056,151, filed on May 27, 2008.

(51) Int. Cl.
| | | |
|---|---|---|
| C05C 9/00 | (2006.01) |
| C05C 1/00 | (2006.01) |
| C05C 11/00 | (2006.01) |
| C05B 7/00 | (2006.01) |
| C05D 9/00 | (2006.01) |
| B01J 10/00 | (2006.01) |
| B01J 14/00 | (2006.01) |
| A01G 25/00 | (2006.01) |
| E02B 13/00 | (2006.01) |
| C05B 17/00 | (2006.01) |
| C05B 17/02 | (2006.01) |

(52) U.S. Cl.
CPC .............. *A01G 25/00* (2013.01); *E02B 13/00* (2013.01); *C05B 17/00* (2013.01); *C05B 17/02* (2013.01)
USPC ............... 71/28; 71/29; 71/30; 71/31; 71/33; 71/34; 71/36; 71/58; 71/63; 239/727; 422/129

(58) Field of Classification Search
USPC .......... 71/28–31, 33, 34, 36, 58, 63; 239/727; 422/129
See application file for complete search history.

(56) References Cited

U.S. PATENT DOCUMENTS

| 2,163,065 | A | * | 6/1939 | Rosenstein | ............................. 71/1 |
| 8,568,506 | B1 | * | 10/2013 | Miller et al. | ....................... 71/28 |
| 8,721,758 | B1 | * | 5/2014 | Miller et al. | ....................... 71/28 |

* cited by examiner

*Primary Examiner* — Wayne Langel
(74) *Attorney, Agent, or Firm* — Joan I. Norek; The Law Office of Joan I. Norek

(57) ABSTRACT

An agricultural fertigation method includes the continuous charging of crop-quality-enhancer-feedstock comprised of one or more crop-quality enhancers (fertilizers, soil amendments and the like) to an irrigation system upstream of the agricultural field being irrigated. The crop-quality-enhancer-feedstock is diluted upon so charging to a level within the system solubility limits and the stream of flowing irrigation water dampens the resultant dissolution exotherm. A system wherein crop-quality enhancers are efficiently continuously fed to the irrigation system main line or a side-arm mixing chamber efficiently implements the method.

17 Claims, 4 Drawing Sheets

METHOD AND SYSTEM FOR AGRICULTURAL FERTIGATION

This application is a continuation in part of co-pending application Ser. No. 13/385,736, filed Mar. 5, 2012, which is a continuation in part of application Ser. No. 13/136,032, filed on Jul. 21, 2011, which is a continuation in part of application Ser. No. 12/283,448, filed on Sep. 12, 2008, claiming the domestic priority benefit of application No. 61/056,151 filed on May 27, 2008, inventors Miller et al., for Device, Composition and Method for Supplying Soil Amendments and Fertilizers to Irrigation Systems.

BACKGROUND OF THE INVENTION

The present invention relates to methods for adding crop-quality enhancers, including but not limited to fertilizers, to agricultural irrigation systems, including particularly agricultural micro-irrigation and sprinkler systems.

The agriculture industry has developed the practice of adding fertilizers to the plant environs, such as the soil, to enhance crop growth and subsequent yields. These fertilizers come in a variety of formulations depending on the specific crop to be grown and its nutrient requirements.

Fertilizers generally are classified according to their NPK content. NPK is common terminology used in the fertilizer industry and stands for: (1) N—the amount of nitrogen in the formulation as N; (2) P—the amount of phosphorus in the formulation as $P_2O_5$; and (3) K—the amount of potassium in the formulation as $K_2O$. In other words, the N refers to nitrogen-containing compounds that are added to the soil and are utilized by the particular plant to satisfy its nitrogen requirement. The P refers to phosphorus-containing compounds that are added to the soil and are utilized by the particular plant to satisfy its phosphorus requirement (a nutrient required for plant growth). K refers to potassium-containing compounds that are added to the soil and are utilized by the particular plant to satisfy its potassium requirement (another nutrient essential for plant growth). Besides these basic nutrients or macronutrients, namely nitrogen, phosphorus and potassium, which are normally provided by the addition of fertilizers that typically are known as NPK fertilizers, other minor nutrients (micronutrients) can also be provided by the addition of fertilizers to the soil. Typical micronutrients are calcium, magnesium, sulfur, iron, zinc, manganese, copper, boron and molybdenum. The term "fertilizer" as used herein, unless expressly indicated otherwise, refers to NPK fertilizers, that is, fertilizers that include one of more of the macronutrients (nitrogen, phosphorus and potassium). An NPK fertilizer might, or might not, include or be combined (formulated) with materials that are added to the soil to provide micronutrient-containing compounds (micronutrient fertilizers).

As mentioned above, fertilizers contain macro and/or micro nutrients and it is these nutrients ("fertilizer nutrients") that are taken up and utilized by the growing crops. A fertilizer, as that term is used herein and as generally understood, refers to the nutrient-containing materials that are physically employed to deliver fertilizer nutrients to a crop. The fertilizer-nutrient content of fertilizers can range from very low to very high. Conventional fertilizers typically (and low-nutrient-content fertilizers always) will contain non-nutrient materials that are extraneous to the crop's nutrient-uptake ("nutrient-extraneous materials"), but for practical and/or other reasons such non-nutrient materials may be necessary to the delivery of the nutrients. The process of delivering fertilizer nutrients to crops is referred to as fertilization although, as explained here, fertilizers typically contain nutrient-extraneous materials.

Growers added fertilizers centuries ago to grow better crops to feed increasing populations, typically by simple mechanical addition (mechanical delivery) to the soil in which the crop was grown. As populations increased further, irrigation of the land to improve crops and crop yields became another common agricultural practice. Fertilization methods ultimately were facilitated by the practice of adding fertilizers to the water being used to irrigate the crops. The term "fertigation" is used for this combination of irrigation and fertilization. Although extremely crude by today's standards, the early fertigation techniques provided higher crop yields and drastically reduced the labor expended in the addition of fertilizers.

Today's high demand for crops (food crops and otherwise) has turned agriculture into a technically-sophisticated business, and a business in which large corporate farms dominate the small family farm. The technical challenges faced by the modern agricultural industry include both the ever-increasing need for arable land, especially in the western and southwestern United States, and the decreasing availability and increasing cost of water. To conserve water, current conventional technology includes micro-irrigation systems that deliver precise amounts of water directly to the soil holding the root system of the plant that is being grown. In the past twenty to thirty years, a large percentage of crop producers in the western and southwestern United States have converted from flood and sprinkler irrigation systems to micro-irrigation technology. Micro-irrigation contains devices called emitters, micro-sprinklers or other such devices that provide the precise amounts of water directly to the desired soil site, namely the soil holding the roots of the plant or crop being irrigated. Similar to the advent of fertigation practices generally, upon conversion to micro-irrigation systems, modern farmers began adding fertilizers through them.

Micro-irrigation systems, unfortunately, are sensitive to water quality and the inclusion of fertilizers and other additives. The sensitivity of micro-irrigation systems to water quality and additives stems from the refinement of the micro components in a micro-irrigation system. These emitters, micro-sprinklers or other micro devices deliver the desired precise amounts of water so long as they do not plug or foul. Plugging occurs when deposits, from any source, build up inside these devices. The smallest particle or foreign material can cause fouling of these devices because these devices have very tiny orifices and/or a long tortuous narrow passageway that provide the requisite pressure for delivery of precise amounts of water in a uniform manner to each plant in the crop being irrigated. Water quality and the inclusion of fertilizers and other additives can, and frequently does, cause severe plugging problems. The problems arise from a number of factors: (1) the irrigation water is typically obtained from wells, reservoirs, canals, lakes, or rivers which contain various amounts of dissolved minerals; and (2) fertilizers, soil amendments and other additives can form insoluble salts and/or cause particulate formation when added to the water. Macro-irrigation systems mainly tolerate these conditions, while micro-irrigation systems are extremely intolerant.

In more detail, the addition of fertilizers or other materials, for instance soil amendments, to the micro-irrigation water increases the loading of inorganic salts over that already in the water. When the loading, or the combined loading, is too high, the solubilities of at least some of the naturally-occurring minerals and/or added compounds are exceeded and particulate formation increases dramatically. When particulates form, significant deposits begin to build up throughout the entire micro-irrigation system. The end result is plugging of the emitters or micro-sprinklers.

Plugging results in uneven distribution of water and nutrients to the crop being irrigated. In some cases, complete shut-down of the irrigation system occurs. Therefore problem-free use of additives such as fertilizers and/or soil amendments and the like in micro-irrigation systems is normally seen only in irrigation systems that use relatively pure water sources.

Various methods for the mechanical delivery of fertilizers to the crop are of course still available. Fertilizers can simply be spread onto the soil and mixed into the soil prior to planting the crop. Although this method of addition is still practiced today, especially in the case of inexpensive NPK sources, such as salt peter (potassium nitrate), phosphate rock (calcium phosphate) and gypsum (calcium sulfate hexahydrate, which is a source of the micronutrients calcium and sulfur), this spread-and-mix-in method is extremely expensive due to the high cost of the equipment employed, the fuel consumed and labor required.

Another mechanical method is to place or deposit fertilizers, such as solid fertilizers, alongside (by the side of) the plant rows in the field. This "side dressing" of additives is then plowed or tilled into the area surrounding the roots of the plant. This method is considered a "root zone" application of fertilizers because it provides a concentrated amount of fertilizer at or very close to the area at which absorption through the roots occurs, and it avoids fertilizing the areas between crop rows. Although this method reduces fertilizer usage (and thus fertilizer cost), the high equipment, fuel and labor costs remain.

Another mechanical delivery method of fertilizers is to spray concentrated aqueous solutions of fertilizers directed towards the root zone instead of depositing solid fertilizers in the side dressing method. Spraying eliminates the need to plow and mix the solid fertilizer into the soil, but does not significantly reduce overall costs because the spraying equipment is expensive and labor costs remain.

The fertigation process, in contrast, reduces the equipment, fuel and labor costs associated with the various methods for the mechanical delivery of fertilizers to the crop. In conventional fertigation practices, including micro-irrigation fertigation practices, commercial fertilizers are pumped directly into the irrigation system in single-shot or "slug" feedings and delivered to the root system or root zone together with the irrigation water that is already being supplied to the crop. In comparison to mechanical delivery/distribution methods, fertigation achieves a significant overall cost savings.

The conventional agricultural practice is to make intermittent or periodic applications of fertilizers. Such intermittent additions might be a single addition, or a plurality of additions, of large amounts (high concentrations) of fertilizer during a brief time interval each growing season or crop cycle. (The number of applications per growing season or crop cycle usually depends on the crop and/or the type of fertilizer being added.) When the fertilizer-delivery method is fertigation, fertilizers are typically slug fed into the irrigation system as quickly as possible to minimize the labor requirements and ease material handling. Slug feeding of a block (portion of a field) normally entails feeding the large amounts (high concentrations) of fertilizer to the irrigation water over a six to seven hour period during irrigation, and then, after the fertilizer feed is shut off, continuing the irrigation of that block for an additional two to three hours to rinse out all of the fertilizer that is contained inside the irrigation system, insuring that all of the fertilizer intended for the block is in fact delivered to the block.

The cost of commercial fertilizer formulations is, however, itself significant, and commercially viable fertilizer formulations (formulations sufficiently inexpensive for bulk agricultural use) typically include, as mentioned above, nutrient-extraneous materials which do not contribute to plant nutrition, and can even be undesirable components.

SUMMARY OF THE INVENTION

The present method is directed to fertigation wherein a crop-quality-enhancer feedstock is charged to an active irrigation system continuously, or substantially continuously, at very low levels, during the entire time, or substantially the entire time, that irrigation water is sufficiently flowing through the irrigation system. The feedstock is comprised of at least one, and in embodiments includes a plurality of, crop-quality enhancers (feedstock components) that intermix as the feedstock is charged to the irrigation system, and in further embodiments the feedstock explicitly includes one or more micronutrients (micronutrient-augmented crop-quality-enhancer feedstock) such as iron, manganese, zinc, magnesium, boron, copper, molybdenum and cobalt. The present invention provides a method and/or system for fertigation wherein a crop-quality-enhancer feedstock (raw materials or inputs), which in some embodiments includes fertilizers (commercial or otherwise, and including fertilizer-nutrient feedstocks), is charged to an active irrigation system continuously, or substantially continuously, at very low levels, during the entire time, or substantially the entire time, that irrigation water is sufficiently flowing through the irrigation system, via a system that provides a high-dilution environment in the feedstock-component intermixing zone. The present method does not exclude on-site fertilizer production (manufacture) from the feedstock as that feedstock is charged to the irrigation system continuously, or substantially continuously, at very low levels, during the entire time, or substantially the entire time, that irrigation water is sufficiently flowing through the irrigation system, whereby an enhanced fertilizer is produced that has a higher fertilizer-nutrient content (low or minimal nutrient-extraneous material) and that is flexible as to the type of nutrient so as to be readily customized to a crop's nutrient needs and/or growing conditions, which are advantages that are not available from conventional fertilizers. In preferred embodiments, the system of the present invention is automatic and subject to variation of the amount and type of crop-quality enhancers forming the feedstock as desired.

The term agricultural "crop-quality enhancer" as used herein is a comprehensive term or descriptor for soil amendments, fertilizers and pH modifiers because they all enhance (improve, boost, add to) the quality of the crop, including the quantity of crop yields. A fertilizer provides plant nutrients and thereby enhances the quality of the crop. A soil amendment or soil modifier changes or improves the soil structure whereby the crop is better enabled to utilize or take up water and nutrients in the soil. A pH modifier internally cleans, or maintains the internal cleanliness of, the irrigation system, whereby irrigation water is distributed uniformly and without the distribution gaps caused by plugged lines, emitters and the like. A pH modifier also may optimize the pH such that certain nutrients are more readily available to the crop plants and thereby enhance the quality of the crop. Each of these functional modes promotes crop health, growth and productivity, including reduction of crop losses due to insufficient irrigation. In other words, each of these functional modes promotes the quality of the crop. The crop-quality enhancer of the present invention typically enhances an agricultural crop in more than one mode. Typically, but not necessarily, all three crop-quality enhancements are realized at least to some degree in the various embodiments of the invention. The term "micro-irrigation" as used herein and in the claims refers to microsprinklers, drip, and subsurface drip systems.

DETAILED DESCRIPTION OF THE INVENTION

Continuous Fertigation

Figure 1:
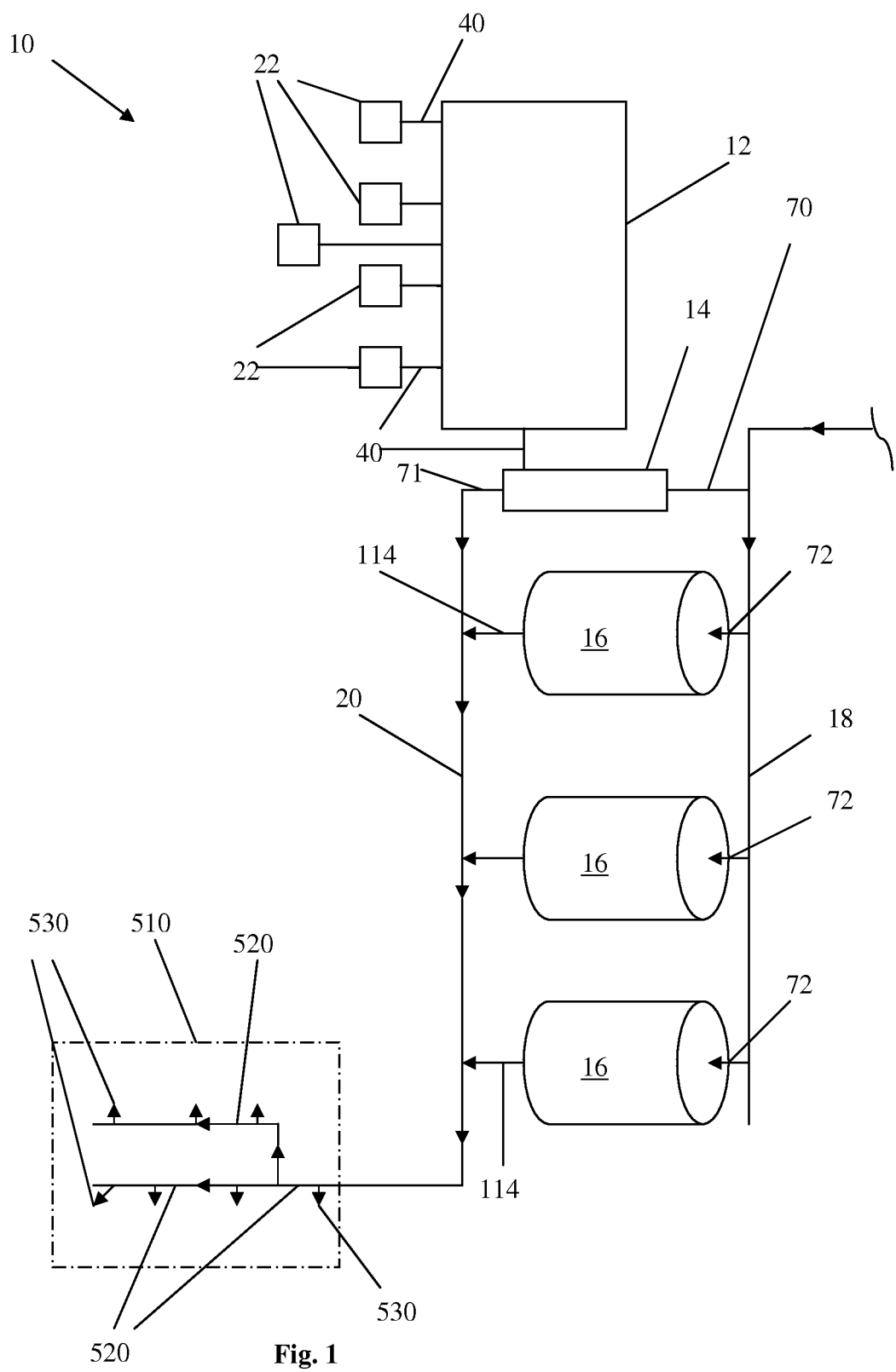
FIG. 1 is an at least partially diagrammatic view of a system of the present invention.

The method and/or system of the present invention, namely the method and/or system for fertigation by charging a crop-quality-enhancer feedstock which includes one or more crop-quality enhancers, to the irrigation system, drastically reduces costs and labor in comparison to conventional fertigation techniques; drastically is far more flexible and controlled as to the crop-quality enhancers provided and in some embodiments reduces the extraneous material in the crop-quality enhancers delivered to the crops, in comparison to conventional fertigation and other fertilization and/or soil amendment practices and techniques.

Depending on the crop-quality enhancer(s) being added, the present invention may reduce the number of undesirable components being added (nutrient-extraneous material) in comparison to the undesirable components that will normally be added with conventional fertigation. A component is undesirable when it interferes with, or is otherwise detrimental to, the fertigation process, such as a species which lowers the system solubility ceiling, or creates an excess of a nutrient, or is toxic to the crop, or is superfluous or the like.

The in-situ fertilizer formulation or manufacture embodiment of the present invention generally, in combination with the continuous low level addition of the crop-quality-enhancement method of the present invention, will further reduce the labor and the plugging potential drawbacks of conventional fertigation.

The crop-quality-enhancer feedstock used in certain embodiments of the invention is selected from eight basic crop-quality enhancers, namely sulfuric acid, nitric acid, phosphoric acid, potassium hydroxide, urea, calcium nitrate, magnesium nitrate and ammonium hydroxide. These crop-quality enhancers are typically not, or cannot be, currently added to an irrigation system. (The crop-quality-enhancer feedstock used in the present invention may be other than these eight crop-quality enhancers, and may include commercial fertilizers.)

Sulfuric Acid

If concentrated sulfuric acid was added to the irrigation system, without the control provided by the present on-site manufacturing system, the following problems would be encountered by the grower. (1) The irrigator would be required to handle a very corrosive material that necessitates special equipment and safety precautions. (2) Special handling techniques must be employed because adding sulfuric acid creates a risk of (a) corrosion of the metal components of the irrigation system and (b) embrittlement of, and damage to, the sensitive plastic irrigation-system components (emitters and the like) that deliver regulated amounts of water to each plant. When sulfuric acid is added to an irrigation system in conventional agricultural practices, for instance for soil amendment purposes (sulfuric acid has no NPK nutrients) or cleaning to remove scale, the addition is typically done by an outside provider as a service due to the hazardous properties and the supervision that is required for its addition.

Nitric Acid

Nitric acid has the same safety and handling problems, and the same corrosion and embrittlement problems, as described above for sulfuric acid. In addition, despite its N nutrient content, it is never used as a fertilizer because its nitrogen is only nitrate nitrogen. Nitrate nitrogen is immediately absorbed by a plant and for agronomic reasons a mixture or blend of nitrate and ammoniacal nitrogen is desirable. No outside companies supply nitric acid to agriculture for direct application because of its hazardous properties, its lack of a balanced blend of suitable nitrogen and the outside supervision that would be required for its addition.

Phosphoric Acid

Phosphoric acid has the same, although less severe, safety and handling problems, and the same corrosion and embrittlement problems, as described above for sulfuric acid. Growers do occasionally feed phosphoric acid as a cleaner or (infrequently) as a phosphorus source. To obtain the requisite amount of phosphorous as P, the grower typically instead uses blends of potassium and/or ammoniacal phosphate solutions which are easier to handle, but more expensive than phosphoric acid.

Potassium Hydroxide

Potassium hydroxide is never used in agriculture due to its caustic nature (high alkalinity) which results in safety and handling problems for the grower. The high alkalinity, in combination with the typical low quality of typical irrigation water, leads to calcium and/or magnesium carbonate precipitation, which plugs the irrigation system. The high alkalinity also leads to soil "hardpanning" (forming a rock-hard barrier that water cannot penetrate) upon interaction with the soil. (Hardpanning is one of the reasons acidic soil amendments are added at times to the irrigation water.) Potassium salts are instead utilized as a conventional potassium source despite their much higher costs.

Urea

Urea, a very slow release source of nitrogen (N), is rarely used as a fertilizer itself. Instead, because growers prefer a more predictable profile of the release of nitrogen, they normally use a blend of nitrogen sources. The most common nitrogen-source fertilizer blend is called UAN-32. (UAN is an acronym for an aqueous solution of urea and ammonium nitrate.) UAN-32 is a blend of ammonium nitrate and urea (sometimes referred to as "urea ammonium nitrate"), which contains 32.0% nitrogen (as N), namely 7.75% ammoniacal nitrogen (slow release nitrogen), 7.75% nitrate nitrogen (fast release nitrogen), and 16.5% urea nitrogen (very slow release nitrogen). Nitrate nitrogen is utilized by the plant directly and therefore is considered a fast release source of nitrogen. Ammonia, ammonic or ammoniacal nitrogen, considered a slow-release form of nitrogen, first must be oxidized or fixed in the soil to form nitrate, which can then be used by the plant. Urea, considered a very slow or controlled-release form of nitrogen, must be hydrolyzed in the soil to form ammonia and carbon dioxide and then fixed to form nitrate, before it can be used by the plant and is considered a very slow or controlled release form of nitrogen. A common alternative to an UAN-32 blend is AN-20, an ammonium nitrate solution. (AN is an acronym for an aqueous solution of ammonium nitrate.) In either case, these commercial products are supplied as very dilute solutions (which creates high shipping costs) and are expensive.

Calcium Nitrate

Calcium nitrate (a non-co-reactant crop-quality enhancer), a nitrogen source of the rapid-release nitrate form, is rarely used by growers. Instead, if both calcium and nitrogen were needed for the crop, and because growers prefer a more constant ("uniform") release of nitrogen, the grower would use a product called CAN-17. (CAN is an acronym for an aqueous solution of calcium nitrate and ammonium nitrate.) CAN-17 is a blend of calcium nitrate and ammonium nitrate (sometimes referred to as "calcium ammonium nitrate") which contains 17.0% nitrogen (as N), namely 5.4% ammoniacal nitrogen (slow-release nitrogen) and 11.6% nitrate nitrogen (fast-release nitrogen), and 8.8% calcium (Ca). CAN-17 is a very dilute solution (which creates high shipping costs) and is expensive. Another source of calcium that is frequently used by a grower is gypsum (calcium sulfate hexahydrate). This calcium source is very difficult to add through the irrigation system because of its limited water solubility (grower must use specialized gypsum machines for addition). Addition of gypsum can cause severe plugging of the irrigation system. It is mainly used as a soil amendment and less so as a calcium source, particularly since it does not contain any nitrogen which the grower must add anyway. If used, to overcome the solubility issues the trend has been to field spread the gypsum which is very equipment and labor intensive.

Magnesium Nitrate

Fertilizer companies conventionally do not offer magnesium nitrate (a non-co-reactant crop-quality enhancer) as a standard product. To overcome soil magnesium deficiencies, growers typically field-spread dolomite, a naturally occurring mineral which is a 1 to 1 mixture of calcium and magnesium carbonate. Unfortunately, a ratio of about 4 to 1 of calcium to magnesium is optimal for plant growth and therefore a grower who field-spreads dolomite is "out-of-balance" in terms of the desired calcium/magnesium ratio. Further, although dolomite is a cheap magnesium source despite its low per-pound magnesium content, field-spreading is very equipment and labor intensive.

Ammonium Hydroxide

Ammonium hydroxide is never used in agriculture due to its caustic nature which results in safety and handling problems for the grower. The high alkalinity, in combination with the typical low quality of typical irrigation water, leads to calcium and/or magnesium carbonate precipitation, which plugs the irrigation system. The high alkalinity also leads to soil "hardpanning" (forming a rock-hard barrier that water cannot penetrate) upon interaction with the soil. (Hardpanning is one of the reasons acidic soil amendments are added at times to the irrigation water.) In the practice of the method of the present method, ammonia gas dissolved in water on-site to produce ammonium hydroxide can be used.

Further, one or more of the following twenty-three fertilizers might be produced according to the chemical reactions shown below when the feedstock includes sulfuric acid, phosphoric acid, nitric acid, potassium hydroxide, urea, ammonium hydroxide (or ammonia), calcium nitrate and/or magnesium nitrate, and the present invention does not exclude the addition of one or more of the acids (or hypothetically one or more of the bases) on the list for the purpose of pH adjustment, regardless of whether or not such acid (or base) is a co-reactant when it intermixes with the other crop-quality enhancers.

Potassium nitrate, produced from nitric acid and potassium hydroxide, Eq. 1.

$$HNO3+KOH \rightarrow KNO3+H2O \quad (Eq. 1)$$

Potassium sulfate, produced from sulfuric acid and potassium hydroxide, Eq. 2.

$$H2SO4+2KOH \rightarrow K2SO4+2H2O \quad (Eq. 2)$$

Potassium hydrogen sulfate, produced from sulfuric acid and potassium hydroxide, Eq. 3.

$$H2SO4+KOH \rightarrow KHSO4+H2O \quad (Eq. 3)$$

Potassium ammonium sulfate, produced from sulfuric acid, potassium hydroxide and ammonium hydroxide or ammonia, Eq. 4a, 4b.

$$H2SO4+KOH+NH4OH \rightarrow K(NH4)SO4+2H2O \quad (Eq. 4a)$$

$$H2SO4+KOH+NH3 \rightarrow K(NH4)SO4+H2O \quad (Eq. 4b)$$

Potassium phosphate (mono-H) produced from phosphoric acid and potassium hydroxide, Eq. 5.

$$H3PO4+2KOH \rightarrow K2HPO4+2H2O \quad (Eq. 5)$$

Potassium phosphate (di-H) produced from phosphoric acid and potassium hydroxide, Eq. 6.

$$H3PO4+KOH \rightarrow KH2PO4+H2O \quad (Eq. 6)$$

Potassium phosphate produced from phosphoric acid and potassium hydroxide, Eq. 7.

$$H3PO4+3KOH \rightarrow K3PO4+3H2O \quad (Eq. 7)$$

Potassium ammonium phosphate (mono-NH4 and mono-K) produced from phosphoric acid, ammonium hydroxide (or ammonia) and potassium hydroxide, Eq. 8.

$$H3PO4+NH4OH+KOH \rightarrow KH(NH4)PO4+2H2O \quad (Eq. 8)$$

Potassium ammonium phosphate (di-NH4 and mono-K) produced from phosphoric acid, ammonium hydroxide (or ammonia) and potassium hydroxide, Eq. 9.

$$H3PO4+2NH4OH+KOH \rightarrow K(NH4)2PO4+3H2O \quad (Eq. 9)$$

Potassium ammonium phosphate (mono-NH4 and di-K) produced from phosphoric acid, ammonium hydroxide (or ammonia) and potassium hydroxide, Eq. 10.

$$H3PO4+NH4OH+2KOH \rightarrow K2(NH4)PO4+3H2O \quad (Eq. 10)$$

Urea nitrate produced from urea and nitric acid, Eq. 11.

$$H2NCONH2+HNO3 \rightarrow (H2NCONH2)(HNO3) \quad (Eq. 11)$$

Urea phosphate produced from urea and phosphoric acid, Eq. 12.

$$H2NCONH2+H3PO4 \rightarrow (H2NCONH2)(H3PO4) \quad (Eq. 12)$$

Dicarbamide dihydrogen sulfate (equivalent of N-pHURIC® 28/27; N-pHURIC® is a registered trademark of Union Oil Company of California dba Unocal Corporation California of El Segundo, Calif.) produced from urea and sulfuric acid, Eq. 13.

$$2H2NCONH2+H2SO4 \rightarrow (H2NCONH2)2(H2SO4) \quad (Eq. 13)$$

Monocarbamide dihydrogen sulfate (equivalent of N-pHURIC® 15/49; N-pHURIC® is a registered trademark of Union Oil Company of California dba Unocal Corporation California of El Segundo, Calif.) produced from urea and sulfuric acid, Eq. 14.

$$H2NCONH2+H2SO4 \rightarrow (H2NCONH2)(H2SO4) \quad (Eq. 14)$$

Urea ammonium nitrate (UAN-32) produced from urea, ammonium hydroxide (or ammonia) and nitric acid, Eq. 15.

$$H2NCONH2+NH4OH+HNO3 \rightarrow (H2NCONH2)((NH4)NO3)+H2O \quad (Eq. 15)$$

Ammonium nitrate (AN-20) produced from ammonium hydroxide (or ammonia) and nitric acid, Eq. 16.

$$NH4OH+HNO3 \rightarrow (NH4)NO3+H2O \quad (Eq. 16)$$

Ammonium sulfate produced from ammonium hydroxide (or ammonia) and sulfuric acid, Eq. 17.

$$2NH4OH+H2SO4 \rightarrow (NH4)2SO4+2H2O \quad (Eq. 17)$$

Ammonium hydrogen sulfate produced from ammonium hydroxide (or ammonia) and sulfuric acid, Eq. 18.

$$NH4OH+H2SO4 \rightarrow (NH4)HSO4+H2O \quad (Eq. 18)$$

Ammonium phosphate (mono-H) produced from ammonium hydroxide (or ammonia) and phosphoric acid, Eq. 19.

$$2NH4OH+H3PO4 \rightarrow (NH4)2HPO4+2H2O \quad (Eq. 19)$$

Ammonium phosphate (di-H) produced from ammonium hydroxide (or ammonia) and phosphoric acid, Eq. 20.

$$NH4OH+H3PO4 \rightarrow (NH4)H2PO4+H2O \quad (Eq. 20)$$

Ammonium phosphate produced from ammonium hydroxide (or ammonia) and phosphoric acid, Eq. 21.

$$3NH4OH+H3PO4 \rightarrow (NH4)3PO4+3H2O \quad (Eq. 21)$$

Calcium ammonium nitrate (CAN-17) produced from ammonium hydroxide (or ammonia), nitric acid and calcium nitrate, Eq. 22.

$$2NH4OH+2HNO3+Ca(NO3)2 \rightarrow (Ca(NO3)2)(NH4NO3)2+2H2O \quad (Eq. 22)$$

Magnesium ammonium nitrate produced from ammonium hydroxide (or ammonia), nitric acid and magnesium nitrate, Eq. 23.

$$2NH4OH+2HNO3+Mg(NO3)2 \rightarrow (Mg(NO3)2)(NH4NO3)2+2H2O \quad (Eq. 23)$$

The other aspect of the method and/or system of the present invention, namely the method and/or system for fertigation wherein crop-quality-enhancer feedstock is charged to the irrigation system continuously or substantially continuously at very low levels, drastically reduces the labor involved, eliminates fouling and plugging potential, and provides a uniform, consistent level of nutrient availability throughout a crop cycle, in comparison to conventional fertigation techniques.

Conventional Fertigation Methods and the Labor Drawback

In conventional fertigation methods, bulk fertilizer formulations are delivered to individual storage tanks at the grower's site. From there a person referred to as an irrigator may further fill a smaller tank or "nurse tank" with one of the fertilizer formulations and transfers that particular nurse tank to the irrigation water pump site. The irrigator then turns on the irrigation water, connects a feed pump to the irrigation system and then lets the fertilizer formulation slug feed (rapidly add) from the nurse tank to the irrigation water over a period of approximately six to seven hours. When the target amount of fertilizer has been added to the irrigation system in this manner, the irrigation water must then continue to flow for typically two to three hours to thoroughly flush the fertilizer from the irrigation system.

Depending on the number of "sets" or areas (or blocks) of the field that are to be fertigated, this process might be conducted two or three times per day by one or more irrigators. At the end of the day the irrigator(s) must clean the feed pump(s) and nurse tank(s)

Depending on the number of sets associated with an irrigation pumping site, the entire process, including cleaning the fertilizer feed pump and nurse tank, and filling/transporting the nurse tank, might be repeated for two or three days or longer for a given fertilizer formulation. During a growing season or cycle, the entire process may be repeated one or more times for a given fertilizer formulation. Additionally, the entire process described above is performed separately for each fertilizer formulation which is added to the crop. As seen from these descriptions, the conventional method of fertigation is very labor intensive.

Conventional Fertigation Methods and the Plugging-Potential Drawback

In conventional fertigation methods, the slug feeding of various fertilizer formulations can cause substantial plugging of the irrigation system. This type of plugging occurs when impurities contained in the irrigation water interact with the fertilizer being slug fed. The solubility of one or more components of fertilizer and one or more of the impurities of the irrigation water is exceeded and one or more insoluble salts are formed and precipitate. This precipitate then plugs the various parts of the irrigation system, particularly the emitters and/or micro-sprinklers.

In more detail, most naturally-occurring waters contain dissolved minerals that can lead to plugging in micro-irrigation systems. Irrigation water constituents such as calcium, magnesium, alkalinity, iron, manganese, sulfates, and sulfide can precipitate to clog emitter flow, causing plugging. Water bicarbonate alkalinity concentrations exceeding about 2 meq/liter (200 ppm as $CaCO_3$) can cause calcium carbonate precipitation. Calcium concentrations exceeding 2-3 meq/liter (100-150 ppm as $CaCO_3$) can cause precipitates to form during the injection of phosphate fertilizers. The Solubility Chart below provides an overview of inorganic anion/cation incompatibilities, that is, anions and cations that, when both are present, lead to insoluble inorganic salt formation that can cause plugging in micro-irrigation systems.

CHART 1

Solubility Chart For Common Irrigation-Systems Anions And Cations

| Cation | Anion | | | | | | | |
|---|---|---|---|---|---|---|---|---|
| | $Cl^-$ | $HCO_3^-$ | $OH^-$ | $NO_3^-$ | $CO_3^{-2}$ | $SO_4^{-2}$ | $S^{-2}$ | $PO_4^{-3}$ |
| $Na^+$ | S | S | S | S | S | S | S | S |
| $K^+$ | S | S | S | S | S | S | S | S |
| $NH_4^+$ | S | S | S | S | S | S | S | S |
| $H^+$ | S | S | $H_2O$ | S | $CO_2$ | S | $H_2S$ | S |
| $Ca^{+2}$ | S | SS | VSS | S | I | VSS | XXX | I |
| $Mg^{+2}$ | S | S | I | S | VSS | S | XXX | I |
| $Fe^{+2}$ | S | SS | VSS | S | VSS | S | I | I |
| $Fe^{+3}$ | S | I | I | S | I | S | XXX | I |
| $Mn^{+2}$ | S | XXX | I | S | I | S | I | I |

In Chart 1, S means soluble (over 5,000 ppm), SS means slightly soluble (2,000 to 5,000 ppm), VSS means very slightly soluble (20-2,000 ppm), I means insoluble (<20 ppm) and XXX means does not form (is not a compound). From Kemmer, Frank N., *Water: The Universal Solvent*, Basic Chemistry, p. 37, Nalco Chemical Company 1977.

As seen from the solubility information in Chart 1, the addition of phosphates, such as phosphate fertilizers, to naturally-occurring waters that contain hardness (cationic calcium or magnesium) can cause precipitation that would result in the plugging of micro-irrigation systems. Also as seen from the solubility information in Chart 1 there are many incompatibilities that can be problematic for irrigation waters, let alone for a combination of irrigation waters to which fertilizers and micronutrients have been added. As mentioned above, hardness, namely calcium ($Ca^{+2}$) and magnesium ($Mg^{+2}$) cations, in the presence of alkalinity, namely bicarbonate ($HCO_3^-$), carbonate ($CO_3^{-2}$) and hydroxide ($OH^-$) anions, can combine to form harmful precipitates, even in unmodified irrigation water. This situation is exacerbated when materials such as gypsum (calcium sulfate hexahydrate, $CaSO4 \cdot 6H_2O$) or ammonium phosphate fertilizer (a mixture of $(NH_4)_2HPO_4$ and $(NH_4)H_2PO_4$ are slug fed to the irrigation water. In the case of slug-feeding gypsum, the additional loading of calcium cation triggers a precipitation leading to plugging because, when irrigation water contains hardness and/or alkalinity, more precipitate will form upon an increase in one of the hardness or alkalinity components, regardless of whether the component is anionic or cationic. In the case of slug-feeding of phosphate fertilizer, the addition of phosphate anion leads to the formation of insoluble calcium and magnesium phosphates when the irrigation water contains hardness.

Conventional Fertigation Methods and the Unbalanced Nutrient Availability Drawback As discussed above, the conventional method of fertilizer addition, by fertigation or mechanical means, involves adding the fertilizer about once or twice a growing season or crop cycle because of the logistics and labor that are required. When the fertilizer is accordingly slug fed to the field, it is typically fed at a very high rate over a short period of time, whereby a high concentration of fertilizer is added to the root zone of the crop. This high concentration of fertilizer is greater than the plant can absorb, and therefore it is not completely absorbed (which is why it is a "nutrient-extraneous material"). Some of the residual (non-absorbed) fertilizer, which typically is a high fertilizer residual, interacts with the soil. These fertilizer-soil interactions normally result in the formation of insoluble inorganic salts and non-exchangeable soil particles, with a concomitant and substantially irreversible loss of available fertilizer. Further, each subsequent irrigation drives or washes available residual fertilizer away from the wetted root zone core towards the perimeter of the wetted zone, mechanically diminishing its availability to the plant. Eventually, the fertilizer concentration gradient which is created results in very little fertilizer being available within the wetted root zone: The level of available residual fertilizer in the wetted root zone will typically drop to essentially zero for a time period ahead of the next fertigation. For these reasons, conventional fertigation practices lead to huge swings in the amount of fertilizer that is available to the plant over time. These swings in available fertilizer in turn lead to costly compensations in the form of increased fertilizer feeds. In other words, the amount of fertilizer that is considered required is increased because a significant portion of the residual fertilizer becomes unavailable to the plant.

The Basics of the Present Fertigation Method and System

The crop-quality-enhancer feedstock is charged to an irrigation system by concomitantly feeding its components (one or more crop-quality enhancers, also referred to herein as raw materials) to either (1) a water stream (preferably a stream of irrigation water) flowing through a mixing chamber that discharges to a main line of an irrigation system downstream of any irrigation-system filters and upstream of the delivery points of the irrigation system, or (2) directly to a main line of an irrigation system downstream of any irrigation-system filters and upstream of the delivery points of the irrigation system. The intermixing of crop-quality enhancers, and any reaction(s), for instance reactions by which the fertilizers are produced therefrom, initiate either in such a mixing chamber upstream of the irrigation system's main line or within the main line itself.

The present method and system of the present invention preferably employ an automated feed system which simultaneously feeds or charges one or a plurality of crop-quality enhancers to the mixing chamber or main line at a pre-selected or pre-determined rate. Such an automated feed system therefore charges a crop-quality-enhancer feedstock of a pre-selected or pre-determined composition at a pre-selected or pre-determined rate. The automatic feeding of the crop-quality-enhancer feedstock at a pre-selected or pre-determined rate is particularly important when it is desirable to feed the feedstock at a rate relative to the irrigation-water flow rate, so as to automatically provide and maintain a pre-selected or pre-determined concentration of each crop-quality enhancer in the irrigation water throughout the fertigation period, including when the irrigation water flow rate varies from one set to the next. Such an automated feed system would be inactive or idle when there is no irrigation water flow in the irrigation line served by the automated feed system. That automated feed system may be, and in certain embodiments is preferably, automatically activated or triggered upon the commencement of water flow in the irrigation line, and may be, and in certain embodiments is preferably, automatically deactivated or halted when the flow of irrigation water ceases.

The charge of the crop-quality-enhancer feedstock to the irrigation water is at a very low level feed so as to restrict or confine crop-quality enhancer concentration in the irrigation water to low levels at all times. The charge of the crop-quality-enhancer feedstock to the irrigation water is continuous. By a continuous charge of crop-quality-enhancer feedstock is meant herein that the charge is continuous when irrigation water is sufficiently flowing to dampen the dissolution, and any reaction, exotherms that result from the charge, or in other words, substantially continuous throughout the irrigation cycles or continuous when the irrigation system is active. In more detail, when an irrigation system is idled, water usually drains out and the system becomes mainly filled with air. Upon reactivation, there is a time delay between the start of water flowing into the irrigation system and the point of time at which the system reaches its operating pressure (from about 10 to 150 psi depending on the system). The continuous charge of crop-quality-enhancer feedstock ceases when the shut down (the idling) of the irrigation system initiates and does not recommence until at least a preponderance of the irrigation system is refilled with water, at which point the system is typically approaching but might not yet be at its full operating pressure. The water-flow characteristics required to dampen the dissolution, and any reaction, exotherms can be calculated using simple thermodynamics for any given irrigation system.

The Present Fertigation Method and the Alleviation of the Labor Drawback

The method and system of the present invention preferably employ one or more smaller bulk tanks, positioned or located at the irrigation pumping station. Such bulk tanks are larger than the nurse tanks and smaller than the storage tanks which hold conventional bulk fertilizers. When a plurality of bulk tanks are positioned at a given irrigation station, they may, and preferably do, each hold a different crop-quality enhancer. The method and system of the present invention feeds a crop-quality-enhancer feedstock comprising one or a plurality of crop-quality enhancers to the irrigation water by simultaneous feeding from one or a plurality of bulk tanks.

The automated feed system in certain embodiments may be set to automatically shut off either at a pre-set time or when an irrigation period to the irrigation line being served by the automated feed system is over and the irrigation water stops flowing. In all embodiments of the present invention, labor is drastically reduced in comparison to conventional fertigation methods. While bulk raw materials for the crop-quality-enhancer feedstock under the present invention would usually still be delivered to individual storage tanks at the grower's site, most of the tasks conventionally performed by an irrigator, or person(s) handling the role of an irrigator, are eliminated. (1) The filling of a smaller tank or "nurse tank" with one of the conventional or commercial fertilizer formulations and the transferring of that particular nurse tank to the irrigation water pump site for each irrigation period is eliminated, because instead bulk tanks for each raw material of the crop-quality-enhancer feedstock are in-place at the irrigation water pump site and such bulk tanks normally require filling no more than once, namely at the beginning of a growing cycle. (2) The crop-quality-enhancer feedstock pump is continuously connected to the irrigation system and is, or can be, automatically triggered when irrigation-water flow commences, and therefore, when the irrigator turns on the irrigation water: (a) he does not connect a commercial fertilizer feed pump to the irrigation system for each irrigation set; (b) he does not slug feed commercial fertilizer for any amount of time (and therefore he does not need to start, maintain, stop and time a slug feed); and (c) he does not flush the commercial fertilizer from the irrigation system or conduct day-end cleaning of the feed pump and nurse tank. (3) Additionally, the entire conventional process(es) described above is normally performed separately for each conventional commercial fertilizer formulation which is added to the crop, and therefore the tremendous labor savings as a result of the elimination of these steps is multiplied. (4) In addition, the further, and typically greater, labor expenditures involved when remediation and repair of the irrigation system is required due to the plugging that may occur when conventional fertigation methods are used are also eliminated.

In addition, because the present invention eliminates any plugging potential, as discussed below, there is no labor required to clean the irrigation system due to any plugging of the irrigation system.

The Present Fertigation Method and Alleviation of the Plugging-Potential Drawback Plugging of the irrigation system due to the formation and precipitation of insoluble salts is totally eliminated by the method and system of the present invention because the charge of the crop-quality-enhancer feedstock continuously at very low levels keeps such precipitates from forming. In other words, the charge of crop-quality-enhancer feedstock in the method and system of the present invention is at a rate that provides a component concentration in the irrigation water below the concentration which would trigger precipitate formation, including but not limited to precipitate formation due to irrigation water quality.

In contrast to the slug feeding of various fertilizer formulations which can cause substantial plugging of the irrigation system when impurities contained in the irrigation water interact with the fertilizer being slug fed because the solubility of one or more components of fertilizer and one or more of the impurities of the irrigation water is exceeded, such solubilities are not exceeded in the present method because the feed rate maintains the requisite low concentration of components. Insoluble salts cannot be formed. There is no precipitate that could plug any of the various parts of the irrigation system.

The Present Fertigation Method and Alleviation of the Unbalanced Nutrient Availability Drawback In contrast to huge swings in available fertilizer when the fertilizer is slug fed about once or twice during a crop cycle, in the present method when one or more fertilizer crop-quality enhancers are being added, the crop-quality-enhancer feedstock is added continuously at a very low level. A low level of the fertilizer crop-quality enhancer is present in almost every drop of irrigation water. This results in a dramatic increase in the continuum or continuity of the availability of fertilizer to the plant in comparison to the traditional slug-feed approach for several reasons. Instead of a slug-fed addition of a high concentration of fertilizer at the root zone of the crop, a very low concentration of fertilizer is delivered over any given irrigation cycle. This concentration is sufficiently low to be completely, or almost completely, absorbed by the plants. There is little or no residual (non-absorbed) fertilizer to interact with the soil and thereby become unavailable due to the formation of insoluble inorganic salts and non-exchangeable soil particles. Further, there is little or no residual fertilizer that can be washed away from the root zone upon subsequent irrigations, and each subsequent irrigation adds another low level of fertilizer to the root zone. Therefore the level of available fertilizer in the wetted root zone will remain substantially uniform over the entire crop cycle. There will be no swings in the amount of fertilizer that is available to the plant over time. There will be no lost-fertilizer compensations in the form of increased fertilizer feeds. The amount of fertilizer that is considered required is not increased because, in the method and system of the present invention, essentially little or no fertilizer becomes unavailable to the plant.

Low Level of Crop-Quality Enhancer

A low (sometimes referred to herein as a very low) level of crop-quality enhancer (or of crop-quality-enhancer feedstock, or its feed or charge), as that terminology is used herein, means a level below that at which insoluble precipitates could form due to the solubility of any feedstock component and/or irrigation-water component being exceeded. In other words, a low level is at or below the system solubility ceiling, that is, within the system solubility limits. In preferred embodiments the low level is also a dual-role level that does not exceed the system solubility ceiling and yet meets the minimum continuous-delivery crop-quality enhancer requirement which is the crop-quality enhancer, particularly fertilizer, required to be continuously fed to the irrigation water throughout the cycle to meet the feed or nutrient profile (the feed or nutrients deemed necessary or desirable for a given crop at a given site). In other words, for a given crop and site, the low level of crop-quality enhancers, such as fertilizer, is preferably below the system solubility limits and at the minimum continuous-delivery crop-quality enhancer requirement (or a deviation of 10 percent thereof), and the factors that determine it are: (1) the quality of the irrigation water which will be used to irrigate the field in terms of its impurities; (2) crop-quality enhancer, such as fertilizer, type; (3) the particular nutrient and/or other crop-quality enhancer requirements of the subject field; and (4) the total amount of irrigation water which will be delivered to field in the given crop cycle. Factors (1) and (2) determine the system solubility ceiling and system solubility limits, and factors (3) and (4) determine the minimum continuous-delivery crop-quality enhancer requirement. Typically there is a wide margin between the system solubility ceiling and the minimum continuous-delivery crop-quality enhancer requirement point. Further, while there generally is no practical or economical reason to use a level of fertilizer and/or other crop-quality enhancer that is higher than the minimum continuous-delivery crop-quality enhancer requirement, in broad embodiments of the present invention, the low level of fertilizer and/or other crop-quality enhancer can significantly exceed the minimum continuous-delivery crop-quality enhancer requirement, provided of course that the low level does not exceed the system solubility ceiling, and can also fall below the minimum continuous-delivery crop-quality enhancer requirement.

Long-Felt Need

The present invention is believed to fulfill a long-standing and long-felt need of the agricultural industry and is expected to garner great commercial success attributable to such fulfillment. Further, as seen from the above list of some basic crop-quality enhancers of the crop-quality-enhancer feedstock, and their reactions, among the crop-quality enhancers are strong acids, such as sulfuric, nitric and phosphoric acids, and these preferably will be used in the present invention in concentrated form. Also among the crop-quality enhancers are strong bases, such as potassium hydroxide and ammonium hydroxide (ammonia), and these preferably will be used in the present invention in concentrated form. All of these crop-quality enhancers possess a large heat of dissolution. Moreover, there is a large heat of reaction when an acid and a base react, which is a type of reaction that is among the reactions listed above. In addition, the MSDS safety sheets for acids warn about the incompatibility with bases, and the MSDS safety sheets for bases warn about the incompatibility with acids, and therefore teach away from the present invention.

Figure 2:
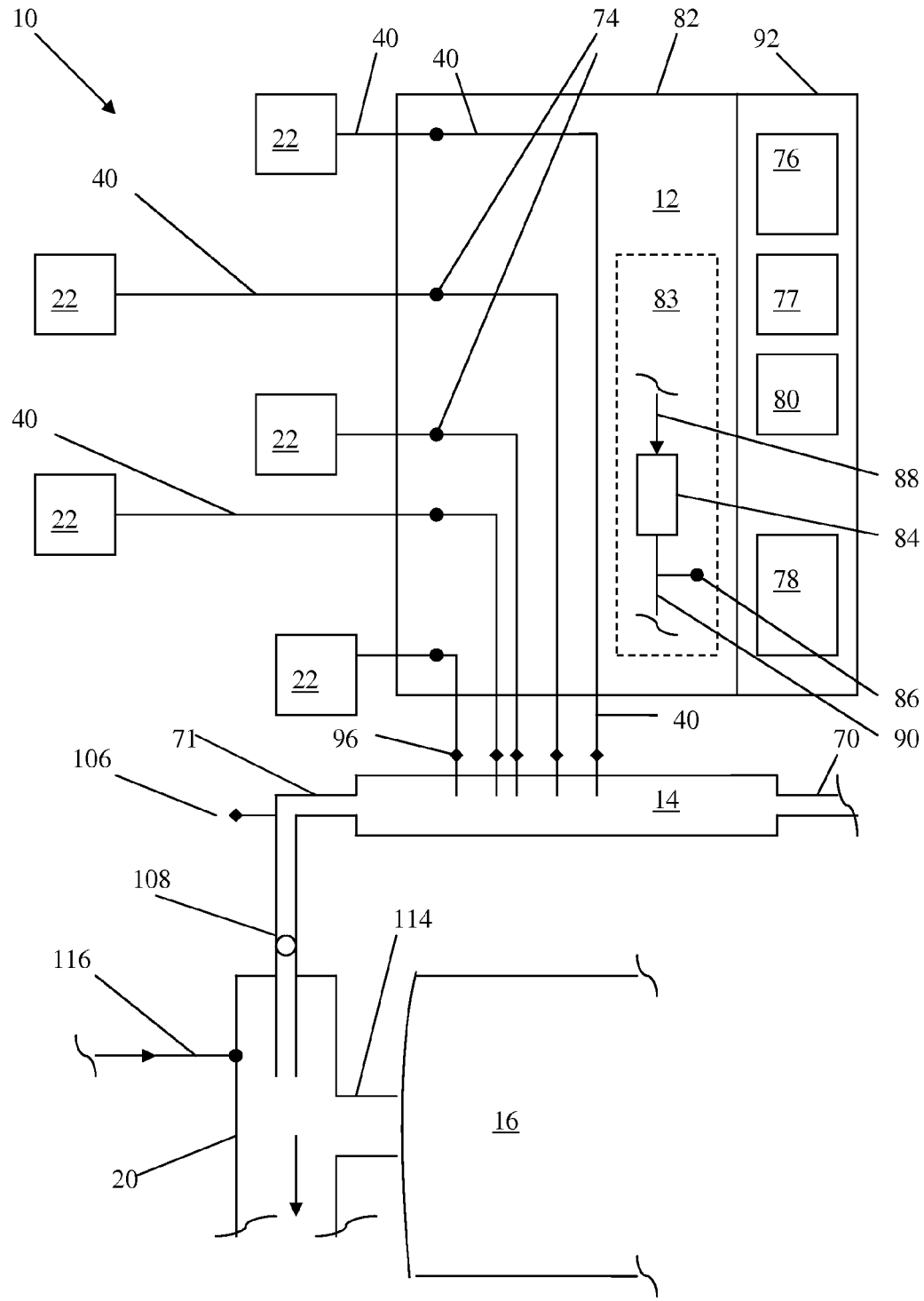
FIG. 2 is an at least partially diagrammatic view of a section of the system of FIG. 1.
Figure 3:
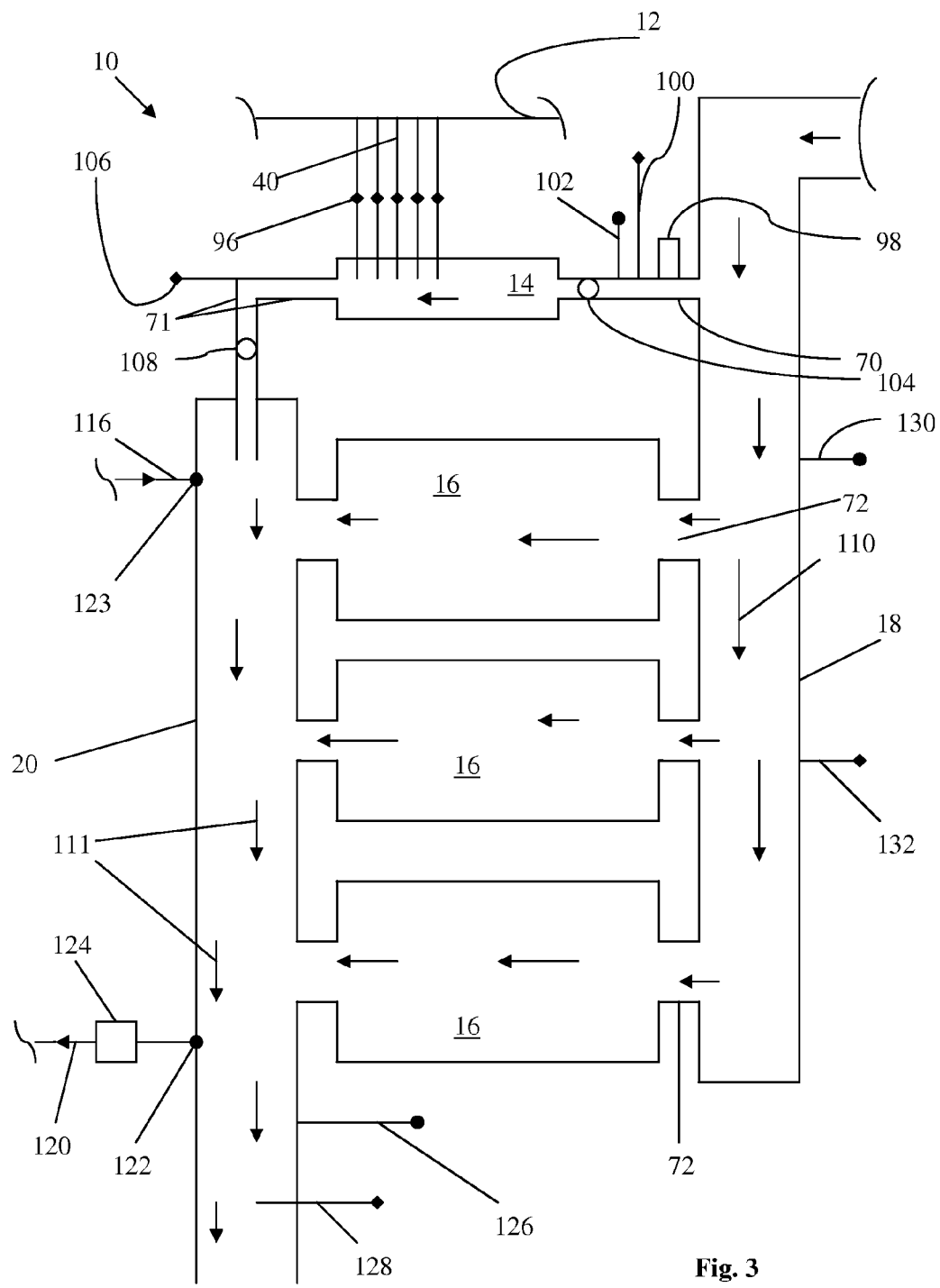
FIG. 3 is an at least partially diagrammatic view of a section of the system of FIG. 1.

The System of FIG. 1 to FIG. 3

Referring to FIG. 1 and, to the extent components are shown in FIG. 2 and FIG. 3, to FIG. 2 and FIG. 3 also, there is shown a system of the present invention designated by the general reference numeral 10. An agricultural irrigation system distributes irrigation water typically from a water source whether it be a well, surface water (such as water in a canal, reservoir, stream or the like), reclaimed or recycled water. A stream of irrigation water is pumped into a main line (irrigation system main line) and then is filtered. The system 10, as shown in FIG. 1, FIG. 2 and FIG. 3, is an embodiment of an extended system of the present invention because system 10 includes such filters and a segment of such a main line from a point upstream of the filters to a point downstream of the filters, and the addition of crop-quality-enhancer feedstock raw materials occurs between these two points.

As described below, a segment of a stream of irrigation water that is running between the irrigation-water source and the irrigation line(s) in the field(s) is within the system 10 wherein the irrigation water is first filtered and then treated by the addition of one or more crop-quality enhancers, and as exemplified here, the in-situ manufacture of one or more fertilizers derived from feedstock of the present invention. The system 10 includes a control unit 12, optionally a plurality of filters, which here are shown as sand-media filters 16, an irrigation-water line, which here is shown as a pre-filter (and somewhat higher pressure) segment of an irrigation-water main line, or pre-filter main line 18; which feeds irrigation water (identified and discussed below) through each of the sand-media filters 16, and also through a mixing chamber 14, to a post-filter (and somewhat lower pressure) segment of the irrigation-water main line, or post-filter main line 20. (The post-filter main line 20 is a transport pipe that carries irrigation water to one or more agricultural fields, such as the agricultural field 510 shown in phantom, and obviously not to scale, in FIG. 1. One or more secondary transport pipes service a typical agricultural field, such as transport pipes 520 shown in FIG. 1. Devices for delivering the irrigation water at points in the field, shown as devices 530 in FIG. 1, can be overhead sprinklers or micro-devices (such as emitters or micro-sprinklers.) The feedstock raw materials are stored in separate storage containers which may be conveniently disposed nearby the control unit 12 as shown. As shown, such storage containers include one for each of eight crop-quality enhancers, namely a sulfuric acid tank 22, a calcium nitrate tank 24, a magnesium nitrate tank 26, a nitric acid tank 28, a phosphoric acid tank 30, a urea tank 32, a potassium hydroxide tank 34 and an ammonium hydroxide tank 36. (These and/or other storage tanks can likewise hold any other crop-quality enhancer, including but not limited to commercial fertilizers.) (The storage tanks 22, 24, 26, 28, 30, 32, 34, 36 are shown staggered for simplicity in showing each of the crop-quality enhancer feed lines 40.)

As mentioned above, and as shown for system 10, eight crop-quality-enhancer feed tanks, namely a feed tank for each and every crop-quality enhancer of the system 10, are provided. The present invention, however, does not exclude the use of fewer than all eight crop-quality enhancers because there are growers who need and/or desire fewer than all of the fertilizer nutrients that can be provided from the in-situ manufacture that occurs from the eight crop-quality enhancers of certain embodiments of the system of the present invention. The present invention in certain embodiments instead uses at least a plurality of the eight crop-quality enhancers (at least one of which contains at least one of the NPK nutrients), and there typically is no practical reason for having other than the same number of crop-quality-enhancer feed tanks as the number of crop-quality enhancers used.

There is a crop-quality-enhancer feed line 40 between each of the crop-quality-enhancer tanks and the mixing chamber 14. These crop-quality-enhancer feed lines 40 run through the interior of the control unit 12 (not shown in FIG. 1) to the mixing chamber 14. (Only one of such crop-quality-enhancer feed lines 40 is shown running to the mixing chamber 14 for simplicity). For each of the crop-quality enhancers, and crop-quality-enhancer feed lines 40, which for system 10 is eight crop-quality enhancers and eight crop-quality-enhancer feed lines 40, there is an injection valve 96 along the crop-quality-enhancer feed line 40 just ahead of the point at which the feed line 40 enters the mixing chamber 14, none of which is shown in FIG. 1 for simplicity, and all eight of which are shown in FIG. 2 and FIG. 3.

Irrigation water flows to and through each of the sand-media filters 16 through filter feed lines 72. A stream of the irrigation water also flows from the pre-filter main line 18 to the mixing chamber 14 through a mixing-chamber feed line 70, except when the mixing-chamber feed line 70 is closed off. The water flows from the mixing chamber 14 and from each of the sand-media filters 16 discharge to the post-filter main line 20.

Referring now in particular to FIG. 2 (where the storage tanks 22, 24, 26, 28, 30, 32, 34, 36 are again shown staggered for simplicity in showing each of the crop-quality enhancer feed lines 40), each of the crop-quality-enhancer feed lines 40 is equipped with a feed pump 74. Each of these feed pumps 74 (except the feed pump 74 along the crop-quality-enhancer feed line 40 from the sulfuric acid feed tank 22 when sulfuric acid is being used solely for pH adjustment and not for instance as a raw material for the manufacture of a fertilizer such as shown in Equations 2 through 4b above) is controlled by a flow controller 76 and a master controller 78. The feed pump 74 along the crop-quality-enhancer feed line 40 from the sulfuric acid feed tank 22 when sulfuric acid is being used solely for pH adjustment is controlled by the master controller 78 and a pH controller 80. Each of these feed pumps 74 (except the feed pump 74 along the sulfuric acid feed tank 22 when sulfuric acid is being used solely to adjust pH) is in electrical communication with a flow controller 76 and the master controller 78 (the electrical connections are not shown) and injects or pumps in its respective crop-quality enhancer to its respective feed line 40 at the rate determined by the flow controller 76 and the master controller 78. The feed pump 74 along the sulfuric acid feed line 40 is generally in electrical communication with the master controller 78 and the pH controller 80 (the electrical connections are not shown) and pumps sulfuric acid though its respective feed line 40 at the rate determined by the flow controller 76, the master controller 78 and the pH controller 80.

The control unit 12 is divided into two chambers, one of which is a lower chamber 82 which houses the feed pumps 74 and a portion of the crop-quality enhancer feed lines 40 downstream of the respective tanks 22, 24, 26, 28, 30, 32, 34, 36 and upstream of the mixing chamber 14. The lower chamber 82 also houses a pH monitoring system 83 (shown in phantom lines in FIG. 2) which, as shown, is comprised of a pH monitoring-system pump 84, a pH sensor 86, a pH feed line 88 and a pH return line 90. The second chamber of the control unit 12 is an upper chamber 92 which houses the flow controller 76, the master controller 78, the pH controller 80 and a temperature controller 77.

Along each of the crop-quality enhancer feed lines 40 downstream of the respective feed pumps 74 and upstream of the mixing chamber 14 is, as mentioned above, an injection valve 96, each of which is equipped with a backflow preventer (not shown). Along the mixing-chamber feed line 70 are, in the order of from upstream (closest to the pre-filter main line 18) to downstream (closest to the mixing chamber 14) an optional booster pump 98, a mixing-chamber feed-line flow meter 100, a mixing-chamber feed-line flow sensor 102 and a mixing-chamber feed-line shut-off valve 104. The line opposite the mixing-chamber feed line 70 is a mixing-chamber discharge line 71 that is open to the post-filter main line 20. Along the mixing-chamber discharge line 71, in the order of from upstream (closest to the mixing chamber 14) to downstream (closest to the post-filter main line 20), are a mixing-chamber discharge-line thermocouple 106 and a mixing-chamber discharge-line shut-off valve 108.

The pre-filter main line 18 is open to the mixing chamber 14 through the mixing-chamber feed line 70, and is open to each of the sand-media filters 16 through filter feed lines 72 or openings. Untreated irrigation water, that is, irrigation water that is not yet treated by the system of the present invention, which is shown by flow arrows and is designated as untreated irrigation water 110 in FIG. 3, flows through the pre-filter main line 18 and discharges to the mixing chamber 14 and the sand-media filters 16 through these respective lines.

As noted above, the mixing-chamber discharge line 71 is open to, and discharges to, the post-filter main line 20, which is best seen in FIG. 3. In addition, each of the sand-media filters 16 is open to, and discharges to, the post-filter main line 20 via filter discharge lines 114 or openings. The untreated irrigation water 110 of the pre-filter main line 18 thus flows to the post-filter main line 20 and therein receives the discharge from the mixing-chamber discharge line 71, becoming irrigation water that carries or has been treated with the crop-quality-enhancer feedstock of the present invention. Such treated irrigation water is shown by flow arrows and is designated as treated irrigation water 111 in FIG. 3 and elsewhere herein.

Along the post-filter main line 20, in the order of from upstream (closest to the mixing-chamber discharge line 71) to downstream (farthest from the mixing-chamber discharge line 71), are the terminal end 116 of the pH return line 90, the starting end 120 of the pH feed line 88 (along which is a pH line shut-off valve 122 and a solenoid 124), a post-filter main-line pressure gauge 126 and a post-filter main-line flow sensor 128.

Along the pre-filter main line 18, in the order of from upstream (closest to the mixing-chamber feed line 70) to downstream (farthest from the mixing-chamber feed line 70), are a pre-filter main-line pressure sensor 130 and a pre-filter main-line pressure gauge 132.

The storage containers, namely the sulfuric acid tank 22, calcium nitrate tank 24, magnesium nitrate tank 26, nitric acid tank 28, phosphoric acid tank 30, urea tank 32, potassium hydroxide tank 34 and ammonium hydroxide tank 36, can vary in size depending on the size and nutrient needs of the irrigation site they serve. Typical storage container sizes are between 300 and 6,500 gallons. The electrical connections between the feed pumps 74 along the crop-quality-enhancer feed lines 40 and the controlling flow controller 76 and master controller 78 (flow controller 76, master controller 78 and pH controller 80 for the feed line 40 of the sulfuric acid tank 22) each consist separately of an on/off power control (not shown) and a feedback loop (not shown) which controls the output of the respective feed pumps 74, and the construction and operation of such electrical connections are well within the skill of an ordinary person skilled in the art. The upper chamber 92 of the control unit 12, which houses the electrical controls, namely the flow controller 76, the temperature controller 77, the master controller 78 and the pH controller 80, is isolated from the lower chamber 82 (which houses the feed pumps 74 and the pH monitoring system 83) to avoid, or at least inhibit, corrosion of the electrical components of the electrical controls. The control unit 12 generally is preferably constructed of heavy gauge steel that is anodized to inhibit corrosion. It preferably is secured with a high security lock system (not shown) and is preferably anchored to the ground with several six foot deep spikes (not shown) to prevent tampering and/or theft of the equipment held within the control unit 12.

The flow controller 76 within the control unit 12, which is one of the controls over the feed pumps 74, is also in electrical connection (not shown) with the post-filter main-line flow sensor 128 along the post-filter main line 20. (Additionally, the pH controller 80, which is in electrical connection (not shown) with the flow controller 76, will override the flow controller 76 at times to control the feed pump 74 along the feed line 40 of the sulfuric acid tank 22 to give the target pH. (The construction and operation of these electrical connections are well within the skill of an ordinary person skilled in the art) The flow controller 76 proportionately varies the input of the crop-quality enhancers through the respective feed pumps 74 based on the flow rate of the treated irrigation water 111 which is read by the post-filter main-line flow sensor 128 downstream of (beyond) the sand-media filters 16.

The temperature controller 77 within the control unit 12 is in electrical connection (not shown) with the mixing-chamber discharge-line thermocouple 106 along the mixing-chamber discharge-line 71. (The construction and operation of these electrical connections are well within the skill of an ordinary person skilled in the art.) The crop-quality enhancers from the various storage tanks (reference numerals 22-36) are routed through the respective crop-quality enhancer feed lines 40 and charged to the mixing chamber 14 as the crop-quality-enhancer feedstock of the present invention. The components of the crop-quality-enhancer feedstock, when there are more than one component, are exposed to, intermixed with and at times reacted with each other and a stream of untreated irrigation water 110 being fed into the mixing chamber 14 through the mixing-chamber feed line 70. Upon such exposure, intermixing and any reaction, there is an exotherm from the heat of dissolution and the various crop-quality enhancers may also react as described above, and these reactions can be exothermic. These exotherms are the reason the temperature of the crop-quality-enhancer feedstock and irrigation water mixture is preferably monitored by the mixing-chamber discharge-line thermocouple 106 as the crop-quality-enhancer feedstock exits the mixing chamber 14. If that temperature is undesirably high, for instance 40° C. or higher (higher than 39° C.), the temperature controller 77 sends a feedback signal to the master controller 78 and the master controller 78 shuts off the feed pumps 74 until a safe temperature is seen at the mixing-chamber discharge-line thermocouple 106, and this off/on sequence is repeated until a safe temperature, as seen at the mixing-chamber discharge-line thermocouple 106, is maintained.

The pH controller 80 is electrically connected (not shown) to the pH monitoring system 83. (The construction and operation of these electrical connections are well within the skill of an ordinary person skilled in the art.) The pH controller 80 in conjunction with the pH monitoring system 83 controls the pH of the treated irrigation water 111 as it leaves the system 10. The pH of the treated irrigation water 111 is monitored by diverting a very small stream of treated irrigation water 111 through the starting end 120 of the pH feed line 88 (see FIG. 3) to the pH sensor 86 (see FIG. 2) whereat the pH of that small stream is determined. Based on the pH of the treated irrigation water 111 and based on the fertilizer crop-quality enhancer composition being produced in the mixing chamber 14, the pH controller 80 adjusts (increases or decreases) the feed of acid(s) and/or base(s) to achieve a constant target treated irrigation water pH. (Under the present invention, a base is available for increasing the pH if needed to achieve a constant target pH, although in practice a pH increase would normally not be required. Further discussion herein of pH adjustment presumes that decreasing the pH is the only adjustment required.) The target treated irrigation water pH is typically a pH of about 6.5. The feed pump 74 along the feed line 40 from the sulfuric acid tank 22 is at times activated only when the target pH cannot be maintained by adjustments to the feed pumps 74 of nitric acid and/or the phosphoric acid tanks 28, 30 because sulfuric acid has no nutrient value. If the target pH can be obtained by slight additional amounts of nitric and/or phosphoric acid (both of which contain an NPK nutrient and thus have nutrient values), then the use of nitric and/or phosphoric acid to adjust the pH is preferable, although the use of sulfuric acid for pH adjustment is obviously not excluded and can at times be more practical. Typically the target pH, which generally is between 6.5 and 7, is lower than the pH of the untreated irrigation water, because untreated irrigation water is usually alkaline, and of course a base would be used for the pH adjustment if the target pH is higher than the pH of the untreated irrigation water.

The master controller 78 automatically turns the system 10 on. The master controller 78 is electrically connected (not shown) both to the pre-filter main-line pressure sensor 130 and to the mixing-chamber feed-line flow sensor 102. (The construction and operation of these electrical connections are well within the skill of an ordinary person skilled in the art.) When a minimum pressure (typically 15 psi) is seen at the pre-filter main-line pressure sensor 130 and a minimum flow of water (typically twenty gallons per minute) is seen at the mixing-chamber feed-line flow sensor 102, the master controller 78 actuates the feed pumps 74 and injection valves 96 and any other component of the system 10 which facilitate the treatment of the untreated irrigation water that are then in an inactive state. Upon such actuation, crop-quality enhancers start feeding to, mixing in, and possibly reacting in, the mixing chamber 14 (The master controller 78, pre-filter main-line pressure sensor 130 and mixing-chamber feed-line flow sensor 102 are typically always in an active state.). The master controller 78 will not allow such actuation unless both minimums are met. Once the feed pumps 74 and injection valves 96 are actuated, the master controller 78, for safety reasons and preferably, will automatically shut down the feed pumps 74 and injection valves 96 when either of the values seen at the pre-filter main-line pressure sensor 130 and the mixing-chamber feed-line flow sensor 102 falls below its respective minimum, and automatically restart the feed pumps 74 and injection valves 96 when both of the values seen at the pre-filter main-line pressure sensor 130 and the mixing-chamber feed-line flow sensor 102 meet or exceed its respective minimum. In other words, once the flow of untreated irrigation water 110 to the fields begins, it starts flowing (a) through the pre-filter main line 18, (b) to and through the sand-media filters 16, (c) discharging to, and flowing through the post-filter main line 20, and (d) from there to the irrigation lines in the field(s) (not shown), the master controller 78 will actuate the feed pumps 74 and injection valves 96 if the irrigation water is at the normal or expected pressure, flow and flow rate. Note that generally the flow of irrigation will occur as described above regardless of whether the master controller 78 has actuated the feed pumps 74 and injection valves 96 or has shut down the feed pumps 74 and injection valves 96 after initial actuation because that flow sequence and infrastructure are the conventional elements of the irrigation system.

One of the components of the system 10 that might not be in an active state when irrigation water first starts to flow, and when the feed pumps 74 and injection valves 96 re-actuate, is the solenoid 124 which allows the small stream of the treated irrigation water 111 to be diverted to the pH monitoring system 83 via the pH feed line 88. The master controller 78 will normally and preferably activate the solenoid 124 when it actuates the feed pumps 74 and injection valves 96. The electrical connections between the solenoid 124 and the master controller 78 are not shown.

Based on the crop-quality enhancer profile (which might be a nutrient-application profile, which is the type and amount of nutrients that are required for a given time period of the given crop cycle), the master controller 78 automatically determines and sets the correct synchronizations of the feed pumps 74 to provide the needed feedstock raw materials while avoiding any conflicting interactions between its components in the mixing chamber 14 or downstream therefrom.

As mentioned elsewhere herein, the master controller 78 controls the temperature within the mixing chamber 14, preventing the temperature from straying out of (normally exceeding) the desired range, by shutting off the feed pumps 74 until that temperature drops to, and can be maintained within, the desired range.

When filter(s) are disposed within the path of the irrigation water flowing through the system of the present invention (which is standard but not universal for commercial irrigation systems), such as the sand-media filters 16 shown within the path of the irrigation water between the pre-filter main line 18 and post-filter main line 20 (except the small stream of irrigation water that is routed through the mixing chamber 14), there is normally a small but significant water-flow pressure drop across the filters, such as sand-media filters 16. A flow rate of at least 20 gallons per minute or more of untreated irrigation water 110 through the mixing chamber 14 is preferred, and the optional booster pump 98 is preferably included to provide such flow rate if the pressure drop across the sand-media filters 16 would result in a lower flow rate through the mixing chamber 14 or if a higher flow rate is required to maintain a mixing chamber temperature below 40 degrees C.

As noted elsewhere, disposed along the mixing-chamber feed line 70 are the booster pump 98, the mixing-chamber feed-line flow meter 100; the mixing-chamber feed-line flow sensor 102 and the mixing-chamber feed-line shut-off valve 104. The mixing-chamber feed-line flow meter 100 determines the actual flow rate of untreated irrigation water 110 to, and therefore through, the mixing chamber 14. The mixing-chamber feed-line flow sensor 102 determines if a flow of untreated irrigation water 110 is occurring to, and therefore through, the mixing chamber 14. The flow of crop-quality enhancers to the mixing chamber 14 will not be permitted unless a flow of untreated irrigation water 110 is occurring through the mixing chamber 14. There of course are electrical connections (not shown) between the mixing-chamber feed-line flow meter 100 and the master controller 78, and between the mixing-chamber feed-line flow sensor 102 and the master controller 78.

The mixing-chamber feed-line shut-off valve 104 is not generally an active element in the operation of the present system, but instead it is an optional, and typically manual, expedient. The mixing-chamber feed-line shut-off valve 104 and the mixing-chamber discharge-line shut-off valve 108 (which likewise is an optional, and typically manual, expedient) can be conveniently used together to isolate the mixing chamber 14 from the flows of irrigation water for maintenance or repair purposes, if ever needed. When the mixing-chamber feed-line shut-off valve 104 and the mixing-chamber discharge-line shut-off valve 108 are open (or in embodiments when they are not present), the small stream of untreated irrigation water 110 flows through the mixing chamber 14 whenever the irrigation water is flowing to the fields (not shown), regardless of whether or not any crop-quality enhancers are being fed to the mixing chamber 14.

Along the mixing-chamber discharge line 71, downstream of the mixing chamber 14, are the mixing-chamber discharge-line thermocouple 106 which senses the temperature of the crop-quality-enhancer feedstock and irrigation water mixture as it exits the mixing chamber 14, and sends that data signal (temperature reading) to the master controller 78 for its processing and control of the temperature within the mixing chamber 14 as discussed elsewhere herein. There of course are electrical connections (not shown) between the mixing-chamber discharge-line thermocouple 106 and the master controller 78.

Along the post-filter main line 20, in the order of upstream to downstream in relation to the flow through the post-filter main-line 20, are the terminal end 116 of the pH return line 90, the starting end 120 of the pH feed line 88, the post-filter main-line pressure gauge 126 and the post-filter main-line flow sensor 128. The terminal end 116 of the pH return line 90 is the return line from the pH monitoring system 83 through which the small stream of treated irrigation water 111 that is diverted through the pH feed line 88 to the pH monitoring system 83 is returned to the post-filter main line 20.

As mentioned elsewhere, the small stream of treated irrigation water 111 is diverted from the post-filter main line 20 to the pH monitoring system 83 through the pH feed line 88 and is returned to the post-filter main line 20 (preferably, as shown, upstream of its diversion point) through the pH return line 90. Along the starting end 120 of the pH feed line 88 is a pH feed-line shut-off valve 122. Along the terminal end 120 of the pH return line 90 is a pH return-line shut-off valve 123. The pH feed-line shut-off valve 122 and the pH return-line shut-off valve 123 are not normally active elements of the system 10 but instead are optional, and typically manual, expedients which can be conveniently used together to isolate the pH monitoring system 83 from the flows of irrigation water for maintenance or repair purposes, if ever needed, without discontinuing the irrigation water flow through the remainder of the system 10.

The small stream of treated irrigation water 111 that is diverted from the post-filter main line 20 at the starting end 120 of the pH feed line 88 feeds into the pH monitoring system 83 through the pH feed line 88. (The starting end 120 of the pH feed line 88 as seen in FIG. 3 and the pH feed line 88 as seen in FIG. 2 are opposite ends of a single flow line.) The pH of that small stream is read by the pH sensor 86 of the pH monitoring system 83. Electrical connections between the pH sensor 86 and the pH monitoring system 83 exist but are not shown. The pH monitoring-system pump 84 pumps the small stream through the pH monitoring system 83, and the pH monitoring-system pump 84 is controlled by the master controller 78 (electrical connections between these elements are not shown.)

To summarize, the pH monitoring system 83 includes the pH monitoring-system pump 84 which pumps treated irrigation water 111 from the post-filter main line 20 through the pH feed line 88, past the pH sensor 86, and then back to the post-filter main line 20 through the pH return line 90. The electrical connections between the pH monitoring system 83 and the pH controller 80 are not shown.

The solenoid 124 shuts off treated irrigation water 111 flow from the post-filter main line 20 through the starting end 120 of the pH feed line 88 when the water-flow pressure seen at the pre-filter main-line pressure sensor 130 and/or at the mixing-chamber feed-line flow sensor 102 drop below pre-determined threshold values. The solenoid 124 is in electrical connection (not shown) with the master controller 78.

The dispositions and functions of the post-filter main-line pressure gauge 126, pre-filter main-line pressure gauge 130 and the post-filter main-line flow sensor 128 are discussed elsewhere.

The sand-media filters 16 are typically large, for instance 300 gallon, stainless steel filters. Such type of filters is routinely used by growers to remove debris from untreated irrigation water before it enters the irrigation system in the fields. The sand-media filters 16 of the system 10 of the present invention generally and preferably would be filters that are already in place at the given irrigation-system site. As the untreated irrigation water 110 passes through the sand of the sand-media filters 16, the flow of the untreated irrigation water 110 is restricted and that flow restriction causes a small but significant pressure drop across the sand-media filters 16. Such pressure drop is typically in the range of from 5 to 15 psi (but can be higher as debris builds up in the filter), and is the reason that there is a pressure differential between the pre-filter main line 18 and the post-filter main line 20. This pressure drop facilitates a large (fast) flow of untreated irrigation water 110 through the mixing chamber 14 that is needed to temper or mitigate the temperature increase stemming from the potential exotherms within the mixing chamber 14. (As mentioned elsewhere, if the temperature of the water flowing out the mixing chamber 14 is too high, the charging of crop-quality-enhancer feedstock to the mixing chamber 14 is halted.) The previously-described optional booster pump 98 is available to create and/or maintain the requisite water flow through the mixing chamber 14, and it is a highly recommended option for irrigation systems that do not have a large enough pressure drop across the filters 16 to provide the requisite cooling by the untreated irrigation water 110 when the crop-quality-enhancer feedstock is charged to the mixing chamber 14.

In other words, the flow of untreated irrigation water 110 water through the mixing chamber 14 is large (fast) compared to the feed rate (injection rate) of the crop-quality enhancers into the mixing chamber 14, and thereby quenches any exotherm(s) caused by the charging of crop-quality-enhancer feedstock to the mixing chamber 14. It is generally believed that reactions between components of the crop-quality-enhancer feedstock (to form the various fertilizers discussed above) occur within the mixing chamber 14 prior to the discharge into the post-filter main line 20.

The level of crop-quality-enhancer feedstock that can be charged to the mixing chamber 14 depends on the size of the mixing chamber 14. For any given level, the mixing chamber 14 and the stream of water flowing through it must be sufficiently large to dampen and mitigate any of the potential exotherms generated.

In contrast, the system shown in FIG. 4 and described below charges the crop-quality-enhancer feedstock directly into the irrigation main line, and therefore it intrinsically has a sufficient water flow to dampen and mitigate exotherms generated regardless of the level of crop-quality-enhancer feedstock charged. (Any level of crop-quality-enhancer feedstock that might raise exotherm concerns would be far to high for any reasonable purpose.)

Master controller 78 includes various electronic components that are designed to monitor various electrical signals from the sensing devices. Depending on what signals are input, the master controller 78 turns on the various components of the system once the irrigation system is fully operational and in a mode to insure the proper feed of all the crop-quality enhancers in the correct proportions, under controlled conditions, to safely manufacture the fertilizer crop-quality enhancer inside the irrigation system. Numerous configurations of electric components could be designed to achieve this control. As shown, the master controller 78 consists of various relays, timing devices and power supplies that take the various signals from the sensing equipment and turn on and off the various control systems to safely control the chemical feed pumps 74 used to manufacture the various fertilizer crop-quality enhancers. (A master controller could of course send the sensing and control data, via wireless communication networks, to an operator stationed in a distant office.) If any incorrect or out-of-range signal is received by the master controller 78 the circuitry inside the master controller 78 responds and sends the appropriate feedback signal to the appropriate device or system to immediately correct the out-of-range condition, change the flow rate of one or more of the crop-quality enhancer feed pumps 74 or totally shut off one or more of the crop-quality enhancer feed pumps 74.

Figure 4:
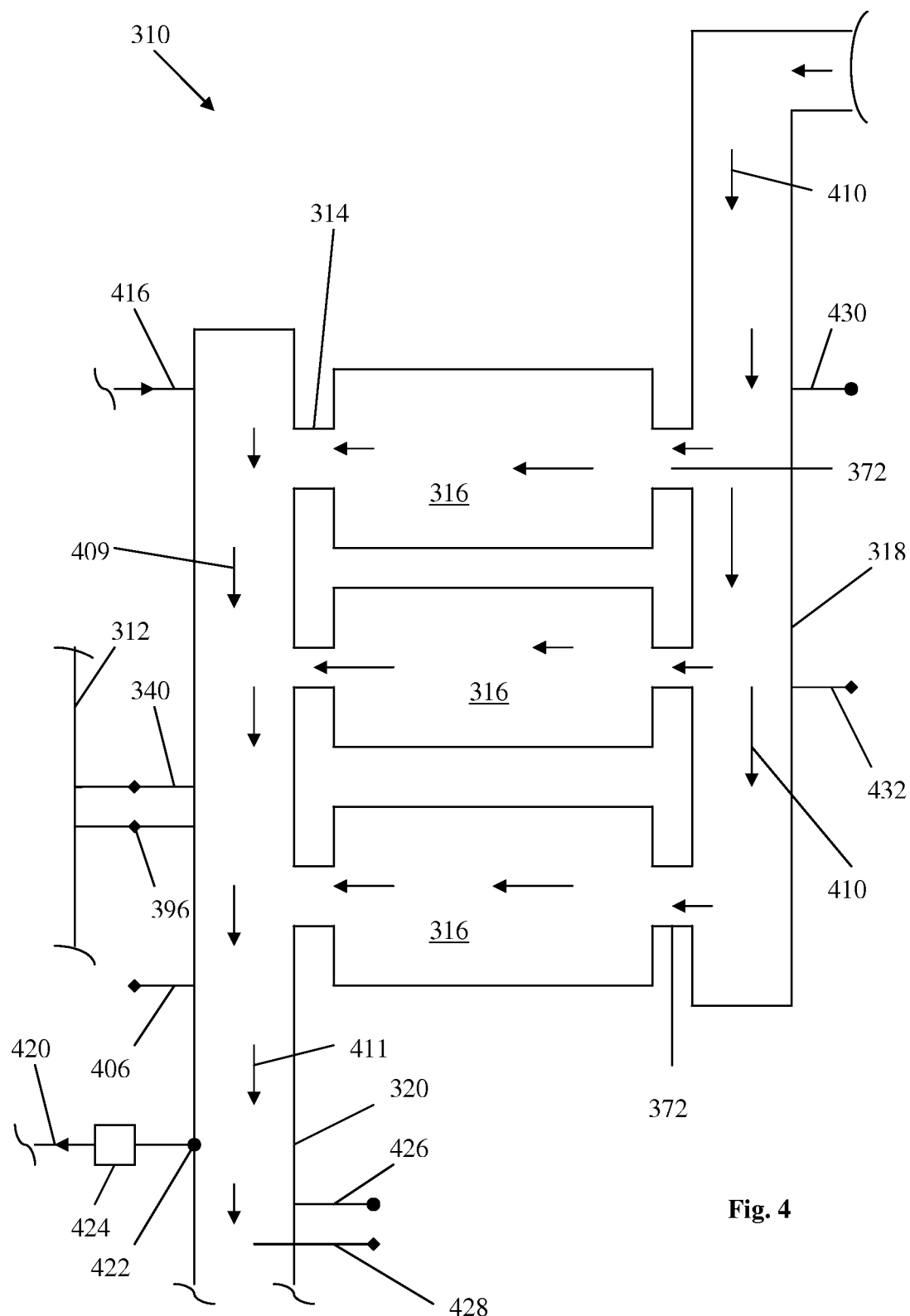
FIG. 4 is an at least partially diagrammatic view of a section of a system of the present invention.

The System of FIG. 4

Referring to FIG. 4, there is shown a segment of a system of the present invention designated by the general reference numeral 310, which differs from the system 10 of FIG. 1 to FIG. 3 by the omission of a separate mixing chamber component such as the mixing chamber 14 of the embodiment shown in FIG. 1 to FIG. 3. In the system 310 of FIG. 4, the crop-quality enhancer feed lines 340 feed directly into a main line (as shown, into the main line segment that is the post-filter main line 320.

The system 310 includes a control unit 312 (partially shown in FIG. 4), a plurality of filters 316, an irrigation-water line or main line (which is designated in two segments, namely a pre-filter main line 318 and a post-filter main line 320) and filters 316 along the main line between its pre-filter segment (pre-filter main line 318) and its post-filter segment (post-filter main line 320). Components of system 310 that are not shown in FIG. 4 include the components within the control unit 312, namely a lower chamber which houses a feed-line feed pump, pH monitoring-system pump, a pH sensor, a pH feed line and a pH return line, and also an upper chamber which houses a flow controller, a master controller, a pH controller and a temperature controller. Other components of system 310 that are not shown in FIG. 4 include a plurality of storage containers (one for each of the two crop-quality enhancers, namely a sulfuric acid tank and a potassium hydroxide tank, although this system 310 could just as well have eight storage containers to hold all eight crop-quality enhancers as shown for system 10 of FIG. 1 through FIG. 3). In each instance the components of system 310 that are not shown in FIG. 4, and their electrical connections, are analogous to those described above for the system 10 shown in FIG. 1 to FIG. 3, and therefore no further description is needed here. Further, the components of system 310 that are shown in FIG. 4, and their electrical connections, also are analogous to those described above for the system 10 shown in FIG. 1 to FIG. 3, except as explicitly stated otherwise herein, and therefore little or no further description is needed here.

As mentioned above, there is a crop-quality-enhancer feed line 340 between each of the two crop-quality-enhancer tanks (not shown) and the post-filter main line 320. These crop-quality-enhancer feed lines 340 run through the interior of the control unit 312 and, as seen in FIG. 4, from there to the post-filter main line 320. For each of the crop-quality enhancers, and crop-quality-enhancer feed lines 340, which for system 310 is two crop-quality enhancers and two crop-quality-enhancer feed lines 340, there is an injection valve 396 along the crop-quality-enhancer feed line 340 just ahead of the point at which the feed line 340 enters, or discharges to, the post-filter main line 320.

Irrigation water flows to and through each of the filters 316 through filter feed lines 372, and discharges from each of the filters 316 to the post-filter main line 320. The crop-quality enhancers also discharge to the post-filter main line 320 (via the feed lines 340) and along each of the crop-quality enhancer feed lines 340 upstream of the post-filter main line 320 is, as mentioned above, an injection valve 396, each of which is equipped with a backflow preventer (not shown).

In system 310, unlike the system 10 shown in FIG. 1 to FIG. 3, not only is there no separate mixing chamber component, there is no mixing-chamber feed line, no optional booster pump, no mixing-chamber feed-line flow meter, no mixing-chamber feed-line flow sensor, no mixing-chamber feed-line shut-off valve, no mixing-chamber discharge line and no mixing chamber discharge-line shut-off valve. There is a component that is the functional equivalent of the mixing-chamber discharge-line thermocouple 106, and that is a post-filter main-line thermocouple 406 that is positioned along the post-filter main line 320 downstream of the points at which the feed lines 340 discharge to the post-filter main line 320. The post-filter main-line thermocouple 406 ("thermocouple 406"), like the mixing-chamber discharge-line thermocouple 106 of system 10, tracks the reaction and dissolution exotherms by monitoring the irrigation-water temperature in the water stream in which dissolution and reaction occurs.

The pre-filter segment of the main line (pre-filter main line 318) is open to each of the filters 316 through filter feed lines 372 or openings. Untreated irrigation water, that is, irrigation water that is not yet treated by the system of the present invention, which is shown by flow arrows and is designated as untreated irrigation water 410 in FIG. 4, flows through the pre-filter main line 318 and discharges to the filters 316 through the respective filter feed lines 372. In addition, each of the filters 316 is open to, and discharges to, the post-filter main line 320 via filter discharge lines 314 or openings. The untreated irrigation water 410 thus flows through the filters 316 and thereafter receives the charge of crop-quality enhancers from their feed lines 340, becoming treated irrigation water that carries or has been treated with the crop-quality enhancers of the present invention. Although charging the feedstock along a post-filter section of the main line (post-filter main line 320) is preferred, charging the feedstock along a pre-filter section of the main line (pre-filter main line 318) is not excluded from the present invention. The feedstock charge should, however, be pre-delivery (upstream of the point(s) of delivering the irrigation water to the crop). Such irrigation water is shown by flow arrows and is designated as treated irrigation water 411 in FIG. 4 and elsewhere herein.

Along the post-filter main line 320, in the order of from upstream (where the stream of irrigation water has not flowed past the feed lines 340 and therefore the water is filtered but not yet irrigation water 409) to downstream (farthest along the post-filter main line 320), are the terminal end 416 of the pH return line, the crop-quality enhancer feed lines 340, the thermocouple 406 (mentioned above), the starting end 420 of the pH feed line (along which is a pH line shut-off valve 422 and a solenoid 424), a post-filter main-line pressure gauge 426 and a post-filter main-line flow sensor 428.

Along the pre-filter main line 318, in the order of from upstream (closest to the water source, not shown) to downstream, are a pre-filter main-line pressure sensor 430 and a pre-filter main-line pressure gauge 432.

The temperature controller (not shown) within the control unit 312 is in electrical connection (not shown) with the thermocouple 406 along the post-filter main line 320. (The construction and operation of these electrical connections are well within the skill of an ordinary person skilled in the art.) The crop-quality enhancers from the various storage tanks (not shown) are routed through the respective crop-quality enhancer feed lines 340 and charged to the post-filter main line 320 as the crop-quality-enhancer feedstock of the present invention. The components of the crop-quality-enhancer feedstock are exposed to and intermix with each other and the relatively large stream of filtered irrigation water 409 flowing out from the filters 316, and react with each other. Upon such exposure, intermixing and possible reaction, there may be an exotherm from the heat(s) of dissolution and exothermic reactions between the various crop-quality enhancers. These exotherms are the reason the temperature of the crop-quality-enhancer feedstock and irrigation water mixture is preferably monitored by the thermocouple 406 downstream of the points at which the feed lines 340 discharge the crop-quality enhancers to the post-filter main line 320. If that temperature is undesirably high, for instance 40° C. or higher (higher than 39° C.), the temperature controller (not shown) sends a feedback signal to the master controller (not shown) and the master controller shuts off the feed pumps (not shown) until a safe temperature is seen at the thermocouple 406, and this off/on sequence is repeated until a safe temperature, as seen at the thermocouple 406, is maintained. The volume and flow of irrigation water 409 in the post-filter main line 320 are, however, far greater than that through the mixing chamber 14 of system 10 shown in FIG. 1 to FIG. 3, and therefore the likelihood of an excessively high temperature being seen at the thermocouple 406 approaches negligible, regardless of the concentration of crop-quality enhancers which are being fed, outside of, of course, a major water-flow problem in the irrigation system itself.

The starting end 420 of the pH feed line is downstream of the point(s) at which the crop-quality enhancers are charged to the post-filter main line 320 and therefore, as in system 10 shown in FIG. 1 to FIG. 3, it is the pH of the treated irrigation water 411, not the irrigation water prior to treatment, which is being monitored by diverting a very small stream of treated irrigation water 411 through the starting end 420 of the pH feed line to the pH sensor (not shown) whereby the pH controller (not shown) adjusts (increases or decreases) the feed of acid(s) and/or base(s) to achieve a constant target treated irrigation water pH. The target treated irrigation water pH is typically a pH of about 6.5. Since the crop-quality enhancers being charged in system 310 are sulfuric acid and potassium hydroxide, which at least to a degree react to form potassium sulfate or potassium hydrogen sulfate depending upon the relative amounts being charged, as shown in Equations 2 and 3 above respectively, a pH adjustment via an adjustment in the sulfuric acid feed is particularly practical here, and this approach exemplifies an instance when sulfuric acid, which itself does not contain an NPK nutrient, might be charged simultaneously as a crop-quality enhancer that is a raw material for manufacturing a fertilizer and as a crop-quality enhancer that is a pH adjustment additive.

The master controller (not shown) automatically turns the system 310 on. The master controller is electrically connected (not shown) to the pre-filter main-line pressure sensor 430. (The construction and operation of these electrical connections are well within the skill of an ordinary person skilled in the art.) When a minimum pressure (typically 15 psi) is seen at the pre-filter main-line pressure sensor 430, the master controller actuates the feed pumps (not shown) and injection valves 396 and any other component of the system 310 which facilitate the treatment of the irrigation water that are then in an inactive state. Upon such actuation, crop-quality enhancers start feeding to the post-filter main line 320 as the crop-quality-enhancer feedstock of the present invention. The master controller will not allow such actuation unless the minimum is met. Once the feed pumps (not shown) and injection valves 396 are actuated, the master controller, for safety reasons and preferably, will automatically shut down the feed pumps and injection valves 396 when the value seen at the pre-filter main-line pressure sensor 430 falls below its minimum, and automatically restart the feed pumps and injection valves 396 when the value seen at the pre-filter main-line pressure sensor 430 meets or exceeds its respective minimum. In other words, once the flow of untreated irrigation water 410 to the fields begins, the irrigation water starts flowing (a) through the pre-filter main line 318, (b) to and through the filters 316, (c) discharging to, and flowing through the post-filter main line 320, and (d) from there to the irrigation lines in the field(s) (not shown), and when this flow starts, the master controller will actuate the feed pumps and injection valves 396 provided this irrigation water flow is at the normal, or expected, pressure, flow and flow rate. Note that generally the flow of irrigation will occur as described above regardless of whether the master controller has actuated the feed pumps and injection valves 396 or has shut down the feed pumps and injection valves 396 after initial actuation because that water flow sequence and infrastructure are the conventional elements of the irrigation system.

Again, the remainder of the system 310 is analogous to the system 10 shown in FIG. 1 to FIG. 3 and described in detail above. Further, as described above for system 310, the "mixing chamber" concept is part of, or within, the irrigation main line, namely the post-filter section of the irrigation main line (post-filter main line 320). The dilution of the crop-quality-enhancer feedstock in this far greater water stream is of course highly increased, thereby minimizing the exotherms even more than is possible with a separate mixing chamber component such as the mixing chamber 14 of system 10. Further, system 310 is simpler than system 10 because most of the controls associated with a separate mixing chamber component such as the mixing chamber 14 of system 10 are eliminated, as described above, and even the thermocouple 406 may be an unnecessary safety component because the level of crop-quality-enhancer feedstock being charged is so extremely low in comparison to the volume of irrigation water to which it is being charged.

Example 1 and Comparative Example A Projections

The method of the present invention in comparison to conventional fertilization practices was evaluated for use at a very large vineyard. The grower conducted plant tissue analyses and soil analyses to determine the fertilization requirements. Based on these analyses, the fertilization recommendations to the grower for a single crop cycle are shown in Table 2 below:

TABLE 2

| Recommended Nutrient | Recommended Amount |
| --- | --- |
| Nitrogen | 50 lb/acre as N |
| Phosphorus | 22 lb/acre as P2O5 |
| Potassium | 40 lb/acre as K2O |
| Calcium | 39 lb/acre as Ca |
| Magnesium | 6 lb/acre as Mg |

Although these are the nutrients that meet the grower's agronomic needs, they clash in several ways with conditions on this ranch when conventional fertigation practices are considered. (1) The list of recommended nutrients includes phosphorus which is derived from phosphate fertilizers. This grower has experienced severe plugging problems in the past when feeding any type of conventional phosphate fertilizer, and therefore phosphate is never added through this grower's micro-irrigation system and instead it is manually field spread at this vineyard. (2) The list of recommended nutrients also includes calcium which is commonly derived from gypsum, but this grower has also experienced severe plugging problems in the past when feeding gypsum. The only alternative conventional commercial calcium source is CAN-17 which a mixture of calcium and ammonium nitrates which this grower can use if it is fed and then the irrigation system is, without delay, treated with concentrated sulfuric acid to remediate the plugging resulting from the interaction of the hard and alkaline irrigation water with the high concentration of calcium arising from slug feeding CAN-17. This remedial treatment, which is done to remedy the plugging due to the formation of calcium carbonate precipitates inside the irrigation system, requires the grower to have a service inject sulfuric acid to a level that reduces the pH of the irrigation water to approximately a pH of 4.0 throughout an irrigation time period of four to six hours. Extreme care must be taken during this remedial treatment because such a low pH could damage metal components and/or embrittle plastic components of the irrigation system. This conventional-practice alternative requires the additional cost and handling of a very dangerous material, namely concentrated sulfuric acid, and the amount of CAN-17 (the commercial mixture of calcium and ammonium nitrates) required to provide the recommended 39 pounds per acre of calcium will concomitantly provide 75 pounds per acre nitrogen (as N), which is fifty percent greater than the recommended nitrogen. (3) The list of recommended nutrients also includes magnesium which this grower can add through the irrigation system in a manner similar to the addition of calcium. Such addition of magnesium, however, also requires a subsequent flushing of the irrigation system with concentrated sulfuric acid for the same type of reasons and with the same type of downsides as noted above for the alternative calcium source.

Comparative Example A Details

This grower can use a combination of conventional fertigation and mechanical fertilization practices which gives the grower the ability to add all of the required fertilizer nutrients, but only with considerable downsides. The most practical, agronomical approach requires the use (and storage and handling) of five different solutions. (1) A commercial calcium nitrate-ammonium nitrate solution (CAN-17, discussed above) is selected as the calcium (and nitrogen) source because it is a standard, large scale, commercially available fertilizer solution. As mentioned above, the amount of nitrogen that will be applied when using CAN-17 to meet the calcium recommendation is significantly (fifty percent) in excess of the recommendation and necessitates the slug feeding of this fertilizer to the irrigation system in two approximately equal applications, namely one at the beginning of the crop cycle and a second in the middle of the crop cycle. (2) A magnesium nitrate solution is used as the magnesium source. At the recommended 6 lbs./acre magnesium (Mg) this fertilizer also adds 7 lbs./acre nitrogen (N) which further increases the nitrogen excess. In addition, there are no readily available, large scale sources of this fertilizer solution, and it must be specially made for this grower. This fertilizer would be slug fed to the irrigation system in one application shortly after the beginning of the crop cycle. (3) Concentrated sulfuric acid source would be slug fed without delay after each slug feeding of the calcium source and magnesium source to eliminate or minimize the plugging of the irrigation system with insoluble calcium and magnesium carbonates formed during their additions. Since concentrated sulfuric acid is an extremely hazardous material for any grower to handle, it is not a desirable material to store and use on this vineyard although it must be stored and used in this "agronomic best-choice" Comparative Example A. (4) A potassium nitrate solution is used as the potassium source. At 40 lbs./acre as potash (K2O) this fertilizer also adds 12 lbs./acre nitrogen (N) which again increases the nitrogen excess. This fertilizer would be slug fed to the irrigation system in three equal applications at the beginning, middle and end of the crop cycle. (5) Phosphoric acid is used as the phosphorus source. Due to the history of severe phosphate-produced plugging experienced by this grower, which presumably has arisen from an incompatibility between phosphates and the irrigation water, this phosphorus source is field spread by the grower in the amount of 22 lbs./acre of phosphate, as phosphorus pentoxide (P2O5), in two equal applications, namely one at the beginning and another toward the end of the crop cycle. (Phosphoric acid is the material of choice because no additional nitrogen is required or desired.) In Table 3 below there is shown the actual nutrient levels being added, in comparison to the recommended levels, and the number of slug feedings and mechanical spreadings required to meet the nutrient recommendations using conventional fertigation and fertilization methods.

TABLE 3

| Nutrient (basis for amounts) | Recommended Amount | Actual Amount | Number of Slug Feedings | Number of Required Mechanical Spreadings |
|---|---|---|---|---|
| Nitrogen (lb/acre as N) | 50 | 94 | (concomitant with potassium, calcium & magnesium additions) | — |
| Phosphorus (lb/acre as P2O5) | 22 | 22 | — | 2 |
| Potassium (lb/acre as K2O) | 40 | 40 | 3 | — |
| Calcium (lb/acre as Ca) | 39 | 39 | 2 | — |
| Magnesium (lb/acre as Mg) | 6 | 6 | 1 | — |
| Conc. Sulfuric acid | — | as needed for cleaning after each calcium & magnesium addition | 3 (after each calcium & magnesium addition) | — |

As seen in Table 3 above, not only are six separate slug feedings, three "cleaning" slug feedings and two mechanical spreadings required, this "agronomic best choice" Comparative Example A results in the addition of nitrogen at a level almost twice as high as the recommended amount.

Comparative Example A

Irrigation Water Profiles

Irrigation water usage of (a) 1.0 ac-ft/acre during the time period from February 1 through June 30; and (b) 1.0 ac-ft/acre during the time period from July 1 through September 30. Irrigation water flow rate of 1,000 gal./min. Irrigation water pH of 8.0 except during the three days of cleaning with concentrated sulfuric acid. Irrigation duration (as to slug feeding time) of six hours per slug-feed day. As noted above, the acreage being irrigated is 150 acres.

Comparative Example A

Slug-Feeding Projections and Multivalent Ion Levels

The slug-feeding dates, the fertilizer/additive slug-fed and the amount and type of nutrient/additive applied are set forth in Table 3.1 below.

TABLE 3.1

| Date | Fertilizer/Additive | Amount(s) of Nutrient/Additive Applied |
|---|---|---|
| 2/1 | CAN-17 | 37.7 lbs/acre N (as N) and 19.5 lbs/acre Ca (as Ca) |
| 2/2 | Sulfuric Acid (conc.) | as required as cleaner |
| 2/8 | Magnesium nitrate soln. | 6.9 lbs/acre N (as N) and 6.0 lbs/acre Mg (as Mg) |
| 2/9 | Sulfuric Acid (conc.) | as required as cleaner |
| 2/15 | Phosphoric Acid (conc.) | 11.0 lbs/acre P (as P2O5) |
| 3/1 | Potassium nitrate | 15.0 lbs/acre K (as K2O) and 4.5 lbs/acre NO-3 (as N) |
| 6/15 | Potassium nitrate | 10.0 lbs/acre K (as K2O) and 3.0 lbs/acre NO-3 (as N) |
| 7/1 | CAN-17 | 37.7 lbs/acre N (as N) and 19.5 lbs/acre Ca (as Ca) |
| 7/2 | Sulfuric Acid (conc.) | as required as cleaner |
| 9/15 | Potassium nitrate | 15.0 lbs/acre K (as K2O) and 4.5 lbs/acre NO-3 (as N) |
| 9/30 | Phosphoric Acid (conc.) | 11.0 lbs/acre P (as P2O5) |

As discussed above, multivalent cations and anions are the primary cause of precipitation. The slug feeding of 19.5 lbs/acre calcium (as Ca) over the six-hour irrigation period at the 1,000 gal./min. flow rate on February 1 and July 1 generates a 977 ppm level of $Ca^{+2}$ in the irrigation water. The slug feeding of 6.0 lbs/acre magnesium (as Mg) over the six-hour irrigation period at the 1,000 gal./min. flow rate on February 8 generates a 301 ppm level of $Mg^{+2}$ in the irrigation water. The 11.0 lbs/acre phosphorus (as P2O5) cannot be slug fed into the irrigation system and must be field spread. The result stems from the fact that high levels of phosphate added to hard and alkaline irrigation water are not compatible and form an insoluble precipitate. This insoluble calcium phosphate precipitate caused the disastrous plugging of the irrigation system that the grower has experienced in the past and is why the grower was forced to field spread the phosphorus. Nevertheless, for comparative purposes if the phosphoric acid could be added to the irrigation system the slug feeding of 11.0 lbs/acre phosphorus (as P2O5) over the six-hour irrigation period at the 1,000 gal./min. flow rate on February 15 and September 30 generates a 551 ppm level of P2O5, which is a 738 ppm level of $PO_4^{-3}$ in the irrigation water. All of these levels of multivalent cations and anions are well in excess of the levels that, in combination with the hardness and alkalinity already present in the irrigation water, cause precipitation and subsequent plugging of the irrigation system.

Example 1

Irrigation Water Profiles

Irrigation water usage of (a) 1.0 ac-ft/acre during the time period from February 1 through June 30; and (b) 1.0 ac-ft/acre during the time period from July 1 through September 30. Irrigation water flow rate of 1,000 gal./min. Irrigation water pH of 6.5. Irrigation duration (as to continuous feeding time) of six hours per irrigation period. As noted above, the acreage being irrigated is 150 acres.

Example 1

Continuous-Feeding Projections and Multivalent Ion Levels

The continuous manufacture and addition time periods, the crop-quality enhancers continuously fed and the amount and type of nutrient/additive applied are set forth in Table 4 below.

TABLE 4

| Time period | Raw Materials | Amount(s) of Nutrient/Additive Applied |
|---|---|---|
| 2/1 - 6/30 | Calcium nitrate soln. | 13.7 lbs/acre nitrate nitrogen (as N) and 19.5 lbs/acre Ca (as Ca) |
| same | Magnesium nitrate soln. | 6.9 lbs/acre nitrate nitrogen (as N) and 6.0 lbs/acre Mg (as Mg) |

TABLE 4-continued

| Time period | Raw Materials | Amount(s) of Nutrient/Additive Applied |
|---|---|---|
| same | Urea soln. | 7.0 lbs/acre urea nitrogen (as N) |
| same | Ammonium hydroxide soln. | 8.7 lbs/acre ammoniacal nitrogen (as N) |
| same | Potassium hydroxide soln. | 25.0 lbs/acre potassium (as K2O) |
| same | Phosphoric acid (conc.) | 11.0 lbs/acre phosphorus (as P2O5) |
| same | Sulfuric acid (conc.) | as required to both react with other crop-quality enhancers and lower the irrigation-water pH to 6.5 |
| 7/1 - 9-30 | Calcium nitrate soln. | 13.7 lbs/acre nitrate nitrogen (as N) and 19.5 lbs/acre Ca (as Ca) |
| same | Potassium hydroxide soln. | 15.0 lbs/acre potassium (as K2O) |
| same | Phosphoric acid (conc.) | 11.0 lbs/acre phosphorus (as P2O5) |
| same | Sulfuric acid (conc.) | as required to both react with other crop-quality enhancers and lower the irrigation-water pH to 6.5 |

Again, as discussed above, multivalent cations and anions are the primary cause of precipitation. The continuous feeding of 19.5 lbs/acre calcium (as Ca) first over a five-month time period (February 1-June 30) and then over a three-month time period (July 1-September 30) in six-hour irrigation periods at the 1,000 gal./min. flow rate generates at most a 7.2 ppm level of Ca+2 in the irrigation water. The continuous feeding of 6.0 lbs/acre magnesium (as Mg) over a five-month time period (February 1-June 30) in six-hour irrigation periods at the 1,000 gal./min. flow rate generates a 2.2 ppm level of Mg+2 in the irrigation water. The continuous feeding of 11.0 lbs/acre phosphorus (as P2O5) over a five-month time period (February 1-June 30), or the continuous feeding of 11.0 lbs/acre phosphorus (as P2O5) over a three-month time period (July 1-September 30), in six-hour irrigation periods at the 1,000 gal./min. flow rates generates at most an 4.1 ppm level of P2O5, which is a 5.4 ppm level of PO4-3 in the irrigation water. All of these levels of multivalent cations and anions are below the levels that, in combination with the hardness and alkalinity already present in the irrigation water, cause precipitation and subsequent plugging of the irrigation system. In comparison to Comparative Example A, there is a 136 fold reduction of Ca+2 concentration in the irrigation water, a 137 fold reduction of Mg+2 concentration in the irrigation water and a 137 fold reduction of PO4-3 concentration in the irrigation water. These reductions were achieved while providing nitrate nitrogen (fast-release), urea nitrogen (controlled release) and ammoniacal nitrogen (slow release) in roughly equal amounts. In addition, these reductions were achieved without delivering any excess nitrogen to the crop. Further, the method of the present invention allows phosphate to be successfully added to the irrigation system without disastrous plugging and eliminates the need for field spreading phosphate.

Example 2 and Comparative Example B Projections

The method of the present invention in comparison to conventional fertilization practices was evaluated for use at a 150 acre almond ranch that has been using conventional fertilization practices for years. For this comparison, a fertigation program similar to that used in the past was selected for the projection of Comparative Example B. The projection of Example 2 is based on the same nutrients as Comparative Example B at amounts that are approximately 25 percent lower because, as discussed above, a far higher percentage of the nutrients applied are available to the crop in comparison to conventional fertilization practices such as those of Comparative Example B. These projections are shown in Table 5 below.

TABLE 5

| Recommended Nutrient | Comparative Example B Recommended Amount | Example 2 Recommended Amount |
|---|---|---|
| Nitrogen (as N) | 200 lb/acre as N | 150 lb/acre as N |
| Phosphorus (as P2O5) | 70 lb/acre as P2O5 | 50 lb/acre as P2O5 |
| Potassium (as K2O) | 175 lb/acre as K2O | 125 lb/acre as K2O |
| Calcium (as Ca) | 35 lb/acre as Ca | 25 lb/acre as Ca |
| Magnesium (as Mg) | 0 lb/acre as Mg | 4 lb/acre as Mg |

The agricultural area of this Example 2 and Comparative Example B, namely the 150 acre almond ranch, will normally receive a total of four acre-feet of irrigation water over its eight-month (March 1 to November 1) growing season, delivered as follows: (a) 1.0 acre-foot during the first three months (March 1 through June 1); 2.5 acre-feet during the second three months (June 1 through September 1); and 0.5 acre-foot during the last two months (September 1 through November 1). An acre-foot is 325,851 gallons, and therefore 195.5 million gallons of irrigation water are delivered to the acreage of this ranch per growing season. The conventional fertigation program or schedule historically required on this almond ranch to meet the nutrient profile (shown again in Table 6 below) is shown in Table 7 below. The fertigation program required using the method of the present invention to meet the adjusted nutrient profile (shown again in Table 8 below) is shown in Table 9 below. The downward adjustment of the nutrient profile for the method of the present invention is a very conservative estimate of the lower nutrient levels required when nutrients are no longer being lost to the root area as described above for conventional fertilization.

TABLE 6

Nutrient Profile

| Nutrient | Total Nutrient Amount |
|---|---|
| Nitrogen (as N) | 200 lb/acre |
| Phosphorus (as P2O5) | 70 lb/acre |
| Potassium (as K2O) | 175 lb/acre |
| Calcium (as Ca) | 35 lb/acre |
| Magnesium (as Mg) | 0 lb/acre |

TABLE 7

Conventional Fertigation Schedule

| | Amounts Slug Fed (lb./acre) | | | | | | |
|---|---|---|---|---|---|---|---|
| | Mar. 1 | Mar. 15 | Mar. 30 | May 15 | Jul. 1 | Sep. 15 | Sep. 30 |
| Fertilizer Solution (% N-P-K & other nutrients) | | | | | | | |
| CAN-17 (17-0-0 + 8.8 Ca) | 198.9 | | | 198.9 | | | |
| NH4H2PO4 (10-34-0) | | | 102.9 | | | 102.9 | |
| UAN-32 (32-0-0) | | | | 349.4 | | | |
| K2S2O3 (0-0-25) | | 400 | | | | | 300 |
| Nutrient by Type | | | | | | | |
| Nitrate nitrogen (as N) | 23.07 | | | 27.08 | 23.07 | | |
| Ammoniacal nitrogen (as N) | 10.74 | | 10.29 | 27.08 | 10.74 | 10.29 | |
| Urea nitrogen (as N) | | | | 57.65 | | | |
| Phosphorus (as P2O5) | | | 35.0 | | | 35.0 | |
| Potassium (as K2O) | | 100 | | | | | 75 |
| Calcium (as Ca) | 17.5 | | | | 17.5 | | |

TABLE 8

Adjusted Nutrient Profile

| Nitrogen (as N) | 150 lb/acre |
|---|---|
| Phosphorus (as P2O5) | 50 lb/acre |
| Potassium (as K2O) | 125 lb/acre |
| Calcium (as Ca) | 25 lb/acre |
| Magnesium (as Mg) | 4 lb/acre |

TABLE 9

Continuous-Feed On-Site Manufacture Fertilization Schedule

| | Total Amounts Fed Over Time Periods (lb.) | | | | | | | |
|---|---|---|---|---|---|---|---|---|
| | March | April | May | June | July | August | September | October |
| Fertilizer Solution (% N-P-K & other nutrients) | | | | | | | | |
| Calcium nitrate (8.3-0-0 + 11.8 Ca) | ← | 70.59 | → | ← | 70.59 | → | ← 70.59 → | |
| Magnesium nitrate (7.2-0-0 + 6.3 Mg) | ← | 21.11 | → | ← | 21.11 | → | ← 21.11 → | |
| Nitric acid (15.1-0-0) | ← | 116.7 | → | ← | 33.91 | → | ← 33.91 → | |
| Ammonium hydroxide (24-0-0) | ← | 104.2 | → | ← | 52.8 | → | ← 52.8 → | |
| Urea (23-0-0) | ← | 108.7 | → | ← | 54.36 | → | ← 54.35 → | |
| Phosphoric acid (0-54.3-0) | ← | 55.24 | → | | | | ← 36.83 → | |
| Potassium hydroxide (0-0-42) | ← | 119.00 | → | ← | 59.5 | → | ← 119.0 → | |
| Nutrient (by type) | | | | | | | | |
| Nitrate nitrogen (as N) | ← | 25.00 | → | ← | 12.50 | → | ← 12.50 → | |
| Ammoniacal nitrogen (as N) | ← | 25.00 | → | ← | 12.50 | → | ← 12.50 → | |
| Urea nitrogen (as N) | ← | 25.00 | → | ← | 12.50 | → | ← 12.50 → | |
| Phosphorus (as P2O5) | ← | 30.00 | → | | | | ← 20.00 → | |
| Potassium (as K2O) | ← | 50.00 | → | ← | 25.00 | → | ← 50.00 → | |
| Calcium (as Ca) | ← | 8.33 | → | ← | 8.33 | → | ← 8.33 → | |
| Magnesium (as Mg) | ← | 1.33 | → | ← | 1.33 | → | ← 1.33 → | |

Comparative Example B and Example 2 Projection Comparisons

Slug Feed—Comparative Example B Projection (Nitrate Nitrogen)

On March 1 nitrate nitrogen (as N) is slug fed into the irrigation system. Specifically, 23.07 lbs./acre nitrate (as N) from a CAN-17 source is fed to 150 acres at a flow rate of 1200 gallons/min. for this grower's normal 9.0 hour irrigation period. (CAN is an acronym for an aqueous solution of calcium nitrate and ammonium nitrate.) The nitrate nitrogen (as N) concentration in the irrigation water during this slug fertigation process is: (23.07 lbs./acre NO3− (as N)×150 acres× 1000 grams/2.2 lbs.)/(1200 gal./min.×9 hrs.×60 min./hr.× 3.78 liters/gal.×1000 ml/1 liter) or 642 ppm NO3− (as N).

The amount of water used during this slug fertigation process is, using the parameter that an ac-ft (acre-foot) is 325,851 gallons of water: 1200 gal./min.×60 min./hr.×9 hrs.=648,000 gal.×1 ac-ft/325,851 gal. or 1.99 ac-ft.

The 1.99 ac-ft of water is distributed over 150 acres and therefore the per-acre water distribution (1.99 ac-ft/150 acres) is 0.0133 ac-ft/acre. The next slug feed fertigation is May 15. The total evenly-distributed irrigation water to be delivered during March, April and May is 1 ac-ft. Therefore the amount of irrigation water delivered during the period of March 2nd (the day after the March 1st slug feeding) and May 14 (the day before the May 15th slug feeding) is about "1 ac-ft/acre×(2.5 months/3.0 months)" or 0.833 ac-ft/acre, and it will contain no nitrate nitrogen fertilizer. Again, this grower's normal irrigation period is 9 hours. Therefore after the single slug feed of fertilizer there are about "[(0.833 ac-ft/acre)/(0.0133 ac-ft/acre)−1]" or 61.6 irrigation periods on which no nitrate nitrogen fertilizer is delivered with the irrigation water.

Continuous Feed—Example 2 Projection (Nitrate Nitrogen):

A total of 25.00 lbs./acre nitrate nitrogen is continuously charged to the irrigation water distributed during each irrigation period during the months of March, April and May (from March 1 up to, but not including, June 1). For purposes of comparison to the slug-fed projection above, only the nitrate nitrogen charged, and the irrigation water delivered, during the shorter period of between March 1 and May 15 is considered. The comparative (normalized) amount of nitrate nitrogen is therefore 20.83 lbs./acre nitrate. The nitrate nitrogen (as N) concentration in the irrigation water during this continuous fertigation process is: (20.83 lbs./acre×150 acres×1000 grams/2.2 lbs.)/(0.833 ac-ft/acre×325,851 gal./ac-ft×3780 ml/gal.×150 acres) or 9.2 ppm NO3− (as N).

In other words, in this Example 2 projection, when the flow rate is sufficient the fertilizer is added with irrigation water delivered during the 62.6 nine-hour irrigation periods from March 1 through May 14, while in the Comparative Example B projection, the entire fertilizer is added only during the first nine-hour irrigation period on March 1st.

Another difference between the slug feeding and the present invention's continuous feeding is the rate of fertilizer addition. To fully illustrate the magnitude of this difference, the feed rates are provided below.

Slug Feed—Feed Rate of Comparative Example B Projection (Nitrate Nitrogen):

In the slug feeding projection of Comparative Example B, the nitrate nitrogen source is a commercial CAN-17 which has a nitrate composition of 11.6 percent nitrate nitrogen and a density of 12.64 lbs./gal. (CAN is an acronym for an aqueous solution of calcium nitrate and ammonium nitrate.) The volume of CAN-17 used is: 150 acres×23.07 lbs./acre NO3− (as N)×100%/11.6%×1 gal./12.64 lbs. or 2360 gallons. The feed rate of this 2360 gallons, which is fed for a 9.0 hr. irrigation period, is: 2360 gal./9.0 hrs.×1 hr./60 min. or 4.37 gal./min. (continuously fed throughout a nine hour irrigation period).

Continuous Feed—Feed Rate of Example 2 Projection (Nitrate Nitrogen):

In the continuous feeding projection of Example 2 (again, the normalized March 1 through May 14 feeding of 20.83 lbs./acre of nitrate nitrogen), the nitrate nitrogen is produced from three sources (again normalized): 4.88 lbs./acre of nitrate nitrogen from the calcium nitrate feedstock; 1.27 lbs./acre of nitrate nitrogen from the magnesium nitrate feedstock; and 14.68 lbs./acre of nitrate nitrogen from the nitric acid feedstock. These feedstocks have the following compositions and densities, respectively: 8.30% nitrate nitrogen and a density of 12.22 lbs./gal. for calcium nitrate; 7.30% nitrate nitrogen and a density of 11.29 lbs./gal. for magnesium nitrate; and 15.1% nitrate nitrogen and a density of 11.73 lbs./gal. for nitric acid. The volume of calcium nitrate feedstock used is 150 acres×4.88 lbs./acre NO3− (as N)×100%/8.3%×1 gal./12.22 lbs. or 723 gallons, which is charged continuously during 62.6 irrigation periods at a feed rate of 723 gal./62.6 cycles×1 cycle/9.0 hrs.×1 hr./60 min. or 0.0214 gal./min.

The volume of magnesium nitrate feedstock used is 150 acres×1.27 lbs./acre NO3− (as N)×100%/7.2%×1 gal./11.29 lbs. or 234 gallons, which is charged continuously during 62.6 irrigation periods at a feed rate of 234 gal./62.6 cycles×1 cycle/9.0 hrs.×1 hr./60 min. or 0.00693 gal./min.

The volume of nitric acid feedstock used is 150 acres×14.68 lbs./acre NO3− (as N)×100%/15.1%×1 gal./11.73 lbs./gal. or 1243 gallons, which is charged continuously during 62.6 irrigation periods at a feed rate of 1243 gal./62.6 cycles×1 cycle/9.0 hrs.×1 hr./60 min. or 0.0368 gal./min.

The same magnitude of differences between conventional slug-fed fertigation and the continuous fertigation of the present invention exists for every fertilizer component and for every irrigation time-period (March through May, June through August and the like). The nitrate nitrogen exemplified here and others below are merely presented for illustration purposes.

Further, as seen from this comparison using nitrate nitrogen as an example, the continuous fertigation of the present invention is far more efficient and effective than conventional slug-fed fertigation because the crop is receiving the right level of fertilizer continuously and no fertilizer is being wasted. In addition, if after the start of the irrigation time period, the weather conditions change from those predicted or there is a change in the nutrient needs of the crops for any reasons, the continuous fertigation of the present invention can be readily adjusted to levels appropriate for the altered needs, while no post-time-period-start adjustments can be made in a slug-fed fertigation because all of the fertilizers have been added to the soil.

Again, the traditional fertigation method is locked into the specific blend of fertilizer and cannot be varied from that blend. As a result of this rigidity the best source of fertilizer (i.e. urea (N) vs. ammoniacal (N) vs. nitrate (N)) is not always possible. In contrast, using the system and method of the present invention, any nutrient blend can be made at any time providing the best fertigation profile with absolutely no waste because the fertilizer is made in situ to exactly what the crop needs, instead of what is available to the grower from the formulations available from the fertilizer manufacturer.

The impact of the system and method of the present invention are again reflected in the feed rates. The conventional slug-fed feed rate is 4.37 gal./min. for a nitrate nitrogen addition of 23.07 lbs./acre. In contrast, using the system and method of the present invention, the feed rates are 0.0214 gal./min., 0.00629 gal./min., and 0.0368 gal./min. for nitrate nitrogen at a level of 20.83 lbs./acre, whereby the slug-fed rate is 204, 631 and 119 times higher respectively, although approximately the same amount nitrate nitrogen is ultimately fed.

As seen in the above comparison, the system and method of the present invention can charge the crop-quality-enhancer feedstock to the irrigation system because so little crop-quality enhancer is being charged and/or reacted in the irrigation water at any time interval that any exotherms or interaction between crop-quality enhancers and/or hard, alkaline irrigation water is dampened.

Slug Feed—Comparative Example B Projection (Potassium (as K2O)):

On March 15 potassium (as K2O) is slug fed into the irrigation system. Specifically, 100.0 lbs./acre potassium (as K2O) from a potassium thiosulfate source is fed to 150 acres at a flow rate of 1200 gallons/min. for this grower's normal 9.0 hour irrigation period. The potassium (as K2O) concentration in the irrigation water during this slug fertigation process is: (100.0 lbs./acre potassium (as K2O)×150 acres×1000 grams/2.2 lbs.)/(1200 gal./min.×9 hrs.×60 min./hr.×

3.78 liters/gal.×1000 ml/1 liter) or 2784 ppm potassium (as $K_2O$). This high concentration of potassium (as $K_2O$) cannot be fed simultaneously with the slug feeding of other fertilizers because of incompatibilities with other fertilizers and the lack of available equipment.

The amount of water used during this slug fertigation process is, using the parameter that an ac-ft (acre-foot) is 325,851 gallons of water: 1200 gal./min.×60 min./hr.×9 hrs. or 648,000 gal.×1 ac-ft/325,851 gal. or 1.99 ac-ft. The 1.99 ac-ft of water is distributed over 150 acres and therefore the per-acre water distribution (1.99 ac-ft/150 acres) is 0.0133 ac-ft/acre.

The next slug feed fertigation of potassium is September 30. The total evenly-distributed irrigation water to be delivered during the second half of March, April and May is 1 ac-ft. Therefore the amount of irrigation water delivered during the period of March 16th (the day after the March 15th slug feeding) and May 31st (the day before the June 1st slug feeding) is about "1 ac-ft/acre×(2.5 months/3.0 months)" or 0.833 ac-ft/acre, and it will contain no potassium (as $K_2O$) fertilizer. The total evenly distributed irrigation water to be delivered during the period from June 1 through August 31 is 2.5 ac-ft/acre and again will contain no potassium (as $K_2O$). The total evenly distributed irrigation water to be delivered during the period from September 1 through September 29 (the day before the September 30th slug feeding is about "0.5 ac-ft/acre×1.0 month/2 months)" or 0.25 ac-ft and it will again contain no potassium (as $K_2O$). As a result of this slug feed addition profile, there are about [(3.583 ac-ft/acre)/ 0.0133 ac-ft)−1]" or 268.4 irrigation periods during which no potassium (as $K_2O$) is delivered with the irrigation water between March 15 through September 29. Also, as demonstrated above, to adequately irrigate the crop the above scenario approximately 269, 9-hour irrigation periods are required to irrigate the almond crop. Since there are only 197 days between March 16 and September 29 there are some days (hotter weather) when there are two 9-hour irrigation periods (or the equivalent) to achieve the required amount of irrigation.

Continuous Feed—Example 2 Projection (Potassium (as $K_2O$)):

A total of 50.0 lbs./acre potassium (as $K_2O$) is continuously charged at a low concentration (18.5 ppm potassium (as $K_2O$) as shown below) to the irrigation water distributed during each irrigation period during the months of March, April and May (from March 1 up to, but not including, June 1). This low concentration of potassium (as $K_2O$), unlike the high concentration slug fed as described above, can be charged simultaneously with other low-concentration fertilizer feedstocks, and therefore this continuous feeding begins on the desired March 1 date.

For purposes of comparison to the slug-fed projection above, only the potassium (as $K_2O$) charged, and the irrigation water delivered, during the time period of between March 15 and May 31 is compared. The comparative (normalized) amount of potassium (as $K_2O$) charged between March 15 and May 31 is 41.7 lbs./acre potassium (as $K_2O$). The potassium (as $K_2O$) concentration in the irrigation water during this continuous fertigation process is: (41.7 lbs./acre×150 acres×1000 grams/2.2 lbs.)/(0.833 ac-ft/acre×325,851 gal./ ac-ft×3780 ml/gal.×150 acres) or 18.5 ppm potassium (as $K_2O$).

In other words, in this Example 2 projection, potassium is continuously delivered with the 0.833 ac-ft of irrigation water delivered during the 62.6 nine-hour irrigation periods from March 1 through May 31, while in the Comparative Example B projection, the entire fertilizer is added only during the first nine-hour irrigation period. Further, the potassium (as $K_2O$) charged in Example 2 is 50% less than in Comparative Example B because, given the rate of potassium uptake by a plant, this 50% lower amount is sufficient to maintain a constant supply of potassium in the wetted root zone throughout the March 1 through May 31 time period. In contrast, the higher amount of potassium is required in Comparative Example B to at least partially compensate for the amount of potassium in the single slug feeding that is later washed away from the wetted root zone before uptake by a plant.

Again, another difference between the slug feeding of Comparative Example B and the present invention's continuous feeding of Example 2 is the rate of fertilizer addition. Again to fully illustrate the magnitude of this difference, the feed rates are provided below.

Slug Feed—Feed Rate of Comparative Example B Projection (Potassium (as $K_2O$)):

In the slug feeding projection of Comparative Example B, the source of the 100 lbs./acre of potassium (as $K_2O$) is a potassium thiosulfate ($K_2SSO_3$) feedstock which is 25.0 percent potassium (as $K_2O$) and has a density of 12.64 lbs./gal. The volume of the potassium thiosulfate feedstock used is: 150 acres×100.0 lbs./acre potassium (as $K_2O$)×100%/ 25.0%×1 gal./12.64 lbs. or 4747 gallons. This 4747 gallons is then applied to the 150 acres in a 9.0 hr. period which means the feed rate is: 4747 gal./9.0 hrs.×1 hr./60 min.=8.79 gal./ min. (continuously throughout a nine hour irrigation period).

Continuous Feed—Feed Rate of Example 2 Projection (Potassium (as $K_2O$)):

In the continuous feeding projection of Example 2, which again will be illustrated as the normalized (March 15 through May 31) feeding of 41.7 lbs. of potassium (as $K_2O$), the source, a single source, is a potassium hydroxide feedstock having 42% potassium (as $K_2O$) and a density of 12.51 lb./ gal. The volume of the potassium hydroxide feedstock used is: 150 acres×41.7 lbs./acre potassium (as $K_2O$)×100%/42%×1 gal./12.51 lbs. or 1784 gallons. The feed rate of this 1784 gallons, which is charged continuously for delivery to 150 acres 62.6 nine-hour irrigation periods, is: 1784 gal./62.6 periods×1 period/9.0 hrs.×1 hr./60 min. or 0.0528 gal./min.

Therefore the feed rate of the present invention's Example 2 projection is 0.0558/8.79, or 0.6%, that of the feed rate of the Comparative Example B projection. In other words, the feed rate of the Comparative Example B projection is 8.79/ 0.0558, or 158% faster than the feed rate of the present invention's Example 2 projection. In other words, the conventional slug-feeding feed rate is 8.79 gal./min. for a potassium addition of 100.0 lbs./acre (as $K_2O$), the continuous-feed feed rate of the present invention is 0.0528 gal./min. for a potassium addition of 50.0 lbs./acre (as $K_2O$), and therefore the slug-feed is (8.79 gal./min)/(0.0528 gal./min.) or 158 times faster.

Continuous Feed—Responsive to Shifting Conditions, Example 2 Projection (Potassium (as $K_2O$)):

Although this Example 2 projection for potassium (and likewise any of the chemicals being added or produced) for a distinct irrigation period, it is easily seen that if the weather changes or a crops need changes their nutrient profile for any reason, the method and system of the present invention is, or preferably is, responsive to those changes. In contrast, once a single shot (slug feeding) of fertilizer is delivered to the crop as in the conventional method (such as shown in Comparative Example B), no responsive changes can be made because everything has already added to the soil. The method of the present invention, unlike the conventional slug feeding method, is not locked in to any formulation or any feed rate of components. In other words, any blend can be made at any time providing the best fertigation profile with absolutely no waste because the fertilizer is made on site to exactly what the crop needs, instead of what formulation is available to the grower from the fertilizer manufacturer.

Continuous Feed—Absence of Plugging, Example 2 Projection (Potassium (as K2O)):

Adding a KOH feedstock to an irrigation system in any conventional manner would cause severe plugging of the irrigation system and be detrimental to plant grower because it is extremely alkaline pH (>14). In the continuous feeding method of the present invention, the potassium hydroxide is neutralized with an acid. If that acid were simply concentrated H2SO4 (98%), and the neutralization reaction that shown in Eq. 2 above, the amount of acid used would be: 62.5 lbs/acre (as K2O)×150 acres×(98.0 g/mole)/(94.2 g/mole)× 100%/98% H2SO4×1 gal./15.30 lbs. or 650 gallons, which would be charged at a rate of: 650 gal./62.6 cycles×1 cycle/ 9.0 hrs.×1 hr./60 min. or 0.0192 gal./min. (over 62.6 fertigation periods).

In reality the neutralization is much more complicated than just a simple neutralization of 50 percent potassium hydroxide with concentrated sulfuric acid because, as outlined above, there are multiple crop-quality enhancers being simultaneously charged to produce multiple fertilizers, and therefore there are multiple reactions (and possibly non-reactive dissolutions) occurring simultaneously. The unique mixture of reaction, and possibly non-reactive dissolution, products consists of a solution of hydrogen ions, potassium cations, ammonium cations, nitrate anions, phosphate anions, sulfate anions and urea/urea carbamate. The entire reaction profile of the acids and bases being charged from March 1 through May 31 is provided in Example 2.1 below.

Example 2.1

Continuous Feed—Acid/Base Reaction Profile

Since (as shown above) there is considerably more alkalinity being added to the irrigation, to avoid the massive plugging that ordinarily would occur, concentrated sulfuric acid is added to neutralize the excess alkalinity (achieve a neutral pH) in the approximate amount of: (1267.2 OH− moles/acre)−(764.8 H+ moles/acre) or 502.4 H+ moles/acre. That requires: 502.4 H+ moles/acre×98 g/mole×(H2SO4/ 2H+)×100%/98%×2.2 lbs./1000 g or 55.3 lbs./acre. The volume amount is 55.3 lbs./acre×150 acres×1 gal./15.30 lbs. or 541.8 gallons.

During the time period of March 1 through May 31, there are 75.2 irrigation periods (1.0 ac-ft/acre/(0.0133 ac-ft), and the sulfuric acid feed rate is: 541.8 gal./75.2 cycles×1 cycle/ 9.0 hrs.×1 hr./60 min. or 0.0133 gal./min. (over 75.2 fertigation applications). In practice, the sulfuric acid pump is preferably initially set for about 120 percent of the calculated feed rate to achieve the desired pH because of the water quality of the irrigation water. (Typical irrigation water contains 100 to 500 ppm total alkalinity (as CaCO3)). This is a "rough" irrigation-water neutralization because, as mentioned elsewhere herein, the system of the present invention automatically senses the water pH and automatically corrects the water pH by adjustment of acid feed rate to assure the desired pH is continuously maintained.

In contrast to these simultaneous additions using the method and system of the present invention, if a grower attempted to simultaneously add the equivalent amounts of potassium hydroxide, ammonium hydroxide, urea, sulfuric acid, phosphoric acid and nitric acid, by the conventional slug-feeding method, an extreme exotherm would develop. This exotherm would be dangerous to both the irrigation equipment and equipment system, as well as the operator (irrigator). For this reason, the fertigation-addition of these chemicals in an agricultural environment, outside of the system and method of the present invention, would be wholly unreasonable and would not be attempted. In other words, the method and system of the present invention mitigate the conditions that generate huge exotherms by mixing and, in instances such as in this example, reacting these chemicals under conditions approaching infinite dilution.

Slug Feed—Comparative Example B Projection (Calcium, Magnesium, Phosphorus):

This projection does not take into account the water-quality factor, which is discussed separately below.

On March 1 calcium (as Ca) is slug fed into the irrigation system. Specifically, 17.50 lbs./acre calcium (as Ca) from a CAN-17 source is fed to 150 acres at a flow rate of 1200 gallons/min. for this grower's normal 9.0 hour irrigation period. (CAN is an acronym for an aqueous solution of calcium nitrate and ammonium nitrate.) The calcium (as Ca) concentration in the irrigation water during this slug fertigation process therefore is: (17.50 lbs./acre calcium (as Ca)× 150 acres×1000 grams/2.2 lbs.)/(1200 gal./min.×9 hrs.×60 min./hr.×3.78 liters/gal.×1000 ml/1 liter) or 487.1 calcium (as Ca). The amount of water used during this slug fertigation process is, using the parameter that an ac-ft (acre-foot) is 325,851 gallons of water: 1200 gal./min.×60 min./hr.×9 hrs. or 648,000 gal.×1 ac-ft/325,851 gal. or 1.99 ac-ft.

The 1.99 ac-ft of water is distributed over 150 acres and therefore the per-acre water distribution (1.99 ac-ft/150 acres) is 0.0133 ac-ft/acre. The next slug feed fertigation is July 1. The total evenly-distributed irrigation water to be delivered during March, April and May is 1.0 ac-ft. The total evenly distributed irrigation water to be delivered during June is "[(1.0 month/3.0 months)×2.5 ac-ft/acre]" or 0.833 ac-ft/ acre. Therefore, the amount of irrigation water delivered during the period of March 1 through June 30 (the day before the July 1 slug feeding) is about 1.833 ac-ft/acre. Again, this grower's normal irrigation period is 9 hours. Therefore after the single slug feed of fertilizer there are about "[(1.833 ac-ft/acre)/(0.0133 ac-ft/acre)−1]" or 136.8 irrigation periods on which no calcium fertilizer is delivered with the irrigation water.

No magnesium based material is added via the irrigation system in this Comparative Example B because there is no commercially practical source of a liquid-based magnesium fertilizer that is available to this grower. To satisfy a magnesium deficiency this grower has field-spread solid dolomite in the past, which has its problems, as mentioned earlier.

As seen from the above, the calcium and phosphorus fertilizers are slug fed on different days, namely the calcium fertilizer on March 1 and July 1, and the phosphorus fertilizer on March 30 and September 15. These fertilizers are not slug fed simultaneously because the slug-fed calcium concentration is vastly higher than the threshold level beyond which precipitation will occur when added together with phosphate. In more detail, when added as shown above, namely 17.5 lbs/acre calcium (as Ca) with a water usage of 0.0133 ac-ft/ acre (on both March 1 and July 1), the calcium addition rate is 487.1 ppm Ca+2 or 1218 ppm (as CaCO3). (Using the same calculation method, the addition rate of 35.00 lbs/acre phosphate (as P2O5) on March, 30 and September 15 is 1304 ppm PO4-3.) The maximum amount of calcium that can be present in the irrigation water concomitantly with that phosphate-based fertilizer, at a water pH of 6.5, is 4.4 ppm calcium (as CaCO3). The 1218 ppm calcium (as CaCO3) addition rate is about 275 times higher than that threshold, and even if the addition rates were lowered 50% via calcium and phosphate additions on four, rather than two, fertigation days, the calcium addition rate would still be vastly higher than the solubility threshold.

Continuous Feed—Example 2 Projection (Calcium, Magnesium):

This projection does not take into account the water-quality factor, which is discussed separately below.

These projections are first set out here as if the phosphoric acid addition during the various time periods did not occur. The profile with phosphoric acid addition are described thereafter.

A total of 8.33 lbs./acre of calcium (as Ca) is continuously charged to the irrigation water distributed during each irrigation period during the months of March, April and May (from March 1 up to, but not including, June 1). It is noted that any fertilizer feedstock, and therefore the calcium, is delivered to the crop at the time it is needed, and not merely when a tank or manpower is available as seen when conventional slug-fed fertigation techniques are used. The present invention is also illustrated below in this Example 2 for the subsequent irrigation periods that have a different water usage.

The calcium (as Ca) concentration in the irrigation water during the continuous fertigation process from March 1 through May 31 (a 1.0 ac-ft/acre water usage period) is: (8.33 lbs./acre×150 acres×1000 grams/2.2 lbs.)/(1.0 ac-ft/acre× 325,851 gal./ac-ft×3780 ml/gal.×150 acres) or 3.07 ppm calcium (as Ca).

The calcium (as Ca) concentration in the irrigation water during the continuous fertigation process from June 1 through August 31 (a 2.5 ac-ft/acre water usage period) is: (8.33 lbs./acre×150 acres×1000 grams/2.2 lbs.)/(2.5 ac-ft/acre× 325,851 gal./ac-ft×3780 ml/gal.×150 acres) or 1.23 ppm calcium (as Ca).

In this projection, and in the system and method of the present invention generally, the rate of chemical addition does not automatically change when the irrigation water usage or flow rate changes (unless the system is programmed to do so). When the amount of fertilizer (here, calcium (as Ca)) delivered during a 9 hour irrigation period is held constant regardless of the water usage, the concentration of calcium (as Ca) in the irrigation water is lower when the volume of irrigation water delivered is higher (because there are many more 9-hour irrigation periods, perhaps 2 or more per day) as seen here for the June 1 through August 31 time period. In fact, it is not uncommon for growers to irrigate 24 hours per day or 2.67, 9-hour, irrigation periods, in one day because of very high temperatures and the resultant high evaporative losses of water. This is an important distinction because this is the period where the plant/crop requires less or no nutrients, and a lower fertilizer level can be added providing better usage of the fertilizer by the plant as well as better economics. In addition, in contrast to the slug fed method, magnesium can be, and is, added through the irrigation system in this projection. A total of 1.33 lbs./acre of magnesium (as Mg) is continuously charged to the irrigation water distributed during each irrigation period during the months of March, April, May, June, July and August (from March 1 up to, but not including, September 1). Unlike conventional fertigation methods, any of the fertilizer nutrients or crop-quality enhancers and any combinations of these nutrients or crop-quality enhancers can be charged simultaneously using the system and the method of the present invention provided that no solubility limits are exceeded. Therefore, as seen in this projection, and generally, magnesium (as Mg) can, and is, delivered to the crop in the proper ratio to calcium when the crop needs it.

The magnesium (as Mg) concentration in the irrigation water during the continuous fertigation process from March 1 through May 31 (a 1.0 ac-ft/acre water usage period) is: (1.33 lbs./acre×150 acres×1000 grams/2.2 lbs.)/(1.0 ac-ft/acre× 325,851 gal./ac-ft×3780 ml/gal.×150 acres) or 0.49 ppm magnesium (as Mg).

The magnesium (as Mg) concentration in the irrigation water during the continuous fertigation process from June 1 through August 31 (a 2.5 ac-ft/acre water usage period) is: (1.33 lbs./acre×150 acres×1000 grams/2.2 lbs.)/(2.5 ac-ft/acre×325,851 gal./ac-ft×3780 ml/gal.×150 acres) or 0.20 ppm magnesium (as Mg).

Further, the calcium charged in this projection is less than in Comparative Example B because, given the rate of calcium uptake by a plant, these lower amounts are sufficient to maintain a constant supply of calcium in the wetted root zone throughout the time period. In contrast, the higher amounts of calcium are required in Comparative Example B to at least partially compensate for the amount of calcium in the single slug feeding and mechanical application respectively which is later washed away from the wetted root zone before uptake by a plant.

Again, as mentioned elsewhere herein, the system and method of the present invention substantially eliminate the problems that arise from incompatibilities between fertilizers because solubility limits generally cannot be exceeded when feeding continuously at low levels. When conventional slug-feeding fertigation methods are used, the solubility limits between incompatible fertilizers are exceeded, and therefore such fertilizers must be fed on different days, and then only after washing out the feeding equipment. As an example, both calcium and magnesium fertilizers normally form very insoluble calcium/magnesium phosphates in the presence of phosphate fertilizers, and therefore neither calcium or magnesium fertilizers can be slug fed together with phosphate fertilizers; doing so would cause massive, catastrophic plugging of the entire irrigation system.

Continuous Feed—Example 2 Projection (Calcium, Magnesium, Phosphorus):

The Example 2 calcium and magnesium projections above provide the amount of calcium and magnesium to be added continuously, and the concentrations of calcium and magnesium in the irrigation water for two levels of water usage (volume of irrigation water per acre delivered to the soil in a nine-hour irrigation period) when calcium and magnesium are continuously charged. Those concentrations of calcium and magnesium (continuously charged) are used in this projection as the basis or groundwork for the calculation of calcium and magnesium concentrations when fed at cyclic (recurring) intervals to avoid incompatibilities with phosphate.

This projection provides a profile regarding the calcium and magnesium feeding simultaneously with a phosphate crop-quality enhancer, which would be charged as follows. From March 1 up to, but not including, June 1, the addition of 30.00 lb/acre phosphate (as $P_2O_5$), given a water usage of 1.00 ac-ft/acre, provides a concentration of 14.81 ppm $PO_4^{-3}$ in the irrigation water. From September 1 up to, but not including, November 1, the addition of 20.00 lb/acre phosphate (as $P_2O_5$), given a water usage of 0.50 ac-ft/acre, provides a concentration of 19.75 ppm $PO_4^{-3}$ in the irrigation water.

When simultaneously feeding both a calcium and the above-indicated amount of phosphate crop-quality enhancer at a water pH of 6.5 using the method and system of the present invention, the maximum amount of calcium that can be present in the irrigation water is 94.8 ppm calcium (as Ca)

for 14.81 ppm PO4-3 and 78.2 ppm calcium (as Ca) for 19.75 ppm PO4-3. Exceeding that maximum will, due to calcium/phosphate interaction and/or precipitation, will lead to plugging of the irrigation system. As indicated above, the calcium (as Ca) concentration in the irrigation water is 3.08 ppm calcium (as Ca) during the continuous fertigation process from March 1 through May 31 and is 6.13 ppm calcium (as Ca) during the continuous fertigation process from September 1 through October 31. (There is no addition of phosphate June through August.) The calcium-concentration threshold above which there is a irrigation-system plugging problem, is thirty-six times higher than the highest calcium concentration used in this projection.

Slug Feed—Comparative Example B Projection (Calcium, Phosphorus, Water Quality):

The irrigation water at this site contains 150 ppm calcium (as CaCO3). As noted in the slug-feed projection above, calcium and phosphorus are fed on separate fertigation days to avoid interactions/precipitation arising from calcium and phosphate concentrations. That projection disregarded the 150 ppm calcium (as CaCO3) already present in the irrigation water.

The profile above provides fertigations on March 30 and September 15 that feed 1304 ppm phosphate (as PO4-3) and feeds no calcium because the calcium solubility threshold is 4.4 ppm calcium (as CaCO3). The 150 ppm calcium (as CaCO3) already present in the irrigation water is much higher than the 4.4 ppm calcium (as CaCO3) threshold, and therefore if that profile was followed, precipitation and plugging of the irrigation system would occur despite the precaution of not simultaneously slug feeding calcium and phosphate.

Continuous Feed—Example 2 Projection (Calcium, Phosphorus, Water Quality):

As noted above, the irrigation water at this site contains 150 ppm calcium (as CaCO3) or 60 ppm (as Ca). As noted in the projection above, the continuous feed method and system of the present invention provides a concentration of 14.81 ppm PO4-3 in the irrigation water from March 1 up to, but not including, June 1, and a concentration of 19.75 ppm PO4-3 in the irrigation water from September 1 up to, but not including, November 1. The calcium concentration thresholds for these time periods are 94.8 and 78.2 ppm calcium (as Ca) respectively, and the calcium concentrations from the continuous fertigations are 3.07 and 6.13 ppm calcium (as Ca) respectively. The addition of 60 ppm calcium (as Ca) already present in the irrigation water raises the calcium concentrations to about 63.1 and 66.2 ppm calcium (as Ca) respectively, which remain well below the thresholds of 94.8 and 78.2 ppm calcium (as Ca) respectively. In other words, despite the high calcium levels in the irrigation water itself, the continuous feed method and system of the present invention permits calcium and phosphate to be charged to the irrigation system simultaneously because the calcium-concentration threshold is about 1.5 times higher than the actual calcium concentration from March 1 up to, but not including, June 1, and the calcium-concentration threshold is about 1.2 times higher than the actual calcium concentration from is September 1 up to, but not including, November 1.

An Extrapolation of Example 2 Projection (Potassium (as K2O)):

The acids charged in the Example 2 projection are 116.7 lbs./acre concentrated nitric acid (15.1-0-0) and 55.24 lbs./acre concentrated phosphoric acid (0-54.3-0). The bases charged in the Example 2 projection are 119.0 lbs. of concentrated potassium hydroxide (0-0-42.0), 104.2 lbs./acre of concentrated ammonium hydroxide (24.0-0-0), and 108.7 lbs./acre of urea (23-0-0). Based on the reactions of these acids and bases, the amount of concentrated sulfuric acid required to achieve a neutral pH can be these approximated from the acidity and alkalinity contributions from these sources. Acidity due to nitric acid addition is 116.7 lbs./acre×68%×1 mole/63 g×1000 g/2.2 lbs. or 572.6 moles H+/acre. The acidity due to phosphoric acid is 55.24 lbs./acre×75%×1 mole/98 g×1000 g/2.2 lbs. or 192.2 moles H+/acre (this assumes that at a pH of 6.5 to 7.0 (typical operating pH) the phosphoric acid only contributes one proton toward neutralization). The alkalinity due to potassium hydroxide is 119.0 lbs./acre×50×1 mole/56.1 g×1000 g/2.2 lbs. or 482.1 moles OH−/acre. The alkalinity due to ammonium hydroxide is 104.2 lbs./acre×28.5%×1 mole/35 g×1000 g/2.2 lbs. or 385.7 moles OH−/acre. The alkalinity due to urea is 108.7 lbs./acre×48.5%×1 mole/60 g×1000 g/2.2 lbs. or 399.4 moles OH−/acre (noting that although urea is a weak base it will consume acid just like the strong bases such as potassium hydroxide and ammonium hydroxide). The total acidity is: (572.6 H+ moles/acre)+(192.2 H+ moles/acre) or 764.8 H+ moles/acre. The total alkalinity is: (482.1 OH− moles/acre)+(385.7 OH− moles/acre)+(399.4 OH− moles/acre) or 1267.2OH-moles/acre.

Comments on the In-Situ Fertilizer Manufacture Embodiment

In certain embodiment, the method and system of the present invention can use all or any of the raw materials that are used to manufacture the above-described commercial fertilizers, namely ammonia, potassium hydroxide, urea, nitric acid, sulfuric acid, phosphoric acid, calcium nitrate and magnesium nitrate, right at the irrigation site. When these raw materials are reacted utilizing the irrigation system the following reactions take place to some extent until an equilibrium is reached:

1). HNO3+KOH→ KNO3+H2O+heat of reaction
2). HNO3+NH3→+NH4NO3+heat of reaction
3). HNO3+urea→[urea][HNO3]+heat of reaction
4). H2SO4+KOH→+KHSO4+H2O+heat of reaction
5). H2SO4+2 KOH→K2SO4+2 H2O+heat of reaction
6). H2SO4+NH3→(NH4)HSO4+heat of reaction
7). H2SO4+2 NH3→(NH4)2SO4+heat of reaction
8). H2SO4+urea→[urea][H2SO4]+heat of reaction
9). H2SO4+2 urea→[urea]2[H2SO4]+heat of reaction
10). H2SO4+KOH+NH3→K(NH4)SO4+H2O+heat of reaction
11). H3PO4+KOH→KH2PO4+H2O+heat of reaction
12). H3PO4+2 KOH→K2HPO4+2 H2O+heat of reaction
13). H3PO4+3 KOH→K3PO4+3 H2O+heat of reaction
14). H3PO4+NH3→(NH4)H2PO4+heat of reaction
15). H3PO4+2 NH3→(NH4)2HPO$_{4+}$heat of reaction
16). H3PO4+3 NH3→(NH4)3PO4+heat of reaction
17). H3PO4+urea→[urea][H3PO4]+heat of reaction
18). H3PO4+NH3+KOH→K(NH4)HPO$_{4+}$H2O+heat of reaction
19). H3PO4+2 NH3+KOH→K(NH4)2PO4+H2O+heat of reaction
20). H3PO4+NH3+2 KOH→K2(NH4)PO4+2 H2O+heat of reaction
21). Ca(NO3)2—No reaction
22). Mg(NO3)2—No reaction In solution these transient compounds immediately dissociate into the following ionic and neutral species with the formation of additional heat: (a) the cations NH4+, H+, K+ and Ca+2; (b) the anions NO3−, H2PO4−, HPO4-2, PO4-3, HSO4− and SO4−; and neutral urea, and these are the species which ultimately form the basis of the nutrients that the plant uses.

In the in-situ fertilizer manufacture embodiment of the present invention, if the growing conditions (and therefore the desired nutrient addition) change, the amounts and ratios of the nutrients being charged can be changed to best suit conditions at a moments notice.

Example 3 and Comparative Example C Projections

The fertigation projections for a ranch having 453 acres of almonds under cultivation were developed using conventional fertigation techniques in Comparative Example C and, for comparison, the method and system of the present invention in Example 3. The expected irrigation period for the crop is March 1 through October 30. The irrigation system on this ranch does not allow simultaneous irrigation of the entire 453 acres. Instead, the 453 acres are irrigated in five portions or sections, and a set of valves switches the water flow from one section to another. Fertigation of course must likewise be conducted in five portions or sets, that is, one set for each of the five sections. Slug-fed fertigation for a set typically requires feeding the material into the irrigation system for a time period of six to seven hours, and then this is repeated the following day for the next set, until all sections are fertigated in five sets usually over a five-day time period. The continuous-feed fertigation of Example 3 is of course ongoing whenever the irrigation system is active and is at the appropriate water-flow level as described elsewhere.

The nutrient profiles and the materials and amounts thereof (lb./acre) to be fed for the conventional slug-fed fertigation with commercial fertilizers of Comparative Example C and the present invention's continuous in-situ manufacturing fertigation embodiment of Example 3 are provided below.

Comparative Example C

Conventional Slug-Fed Fertigation with Commercial Fertilizers

Meeting the nutrient profiles below requires thirteen fertigations (each designated by the first date of a series of five fertigation sets) and the addition of a single commercial fertilizer at a single feed point along the irrigation system's main line for each fertigation. The number of fertigation sets therefore is sixty-five. Due to the inflexibility of nutrient ratios of the commercial fertilizers, meeting the nutrient profiles requires exceeding at least one of the profiles. In addition, the total poundage fed to the system is significantly higher than that of Example 3.

Profiles:

Nitrogen as (N) Profile:

200 lbs./acre Total Nitrogen. The nitrogen will be obtained from a variety of nitrogen-containing fertilizer solutions: Commercial (7-21-0); Commercial (10-34-0); Commercial (15-0-0); Commercial (32-0-0); Commercial (20-0-0); Commercial (4-6-10); and Commercial (17-0-0+8.8 Ca). This is to be added during the following intervals: March 1 through May 31, 125 lbs./acre of total nitrogen (as N); June 1 through August 31, 25 lbs./acre of total nitrogen (as N); September 1 through October 30, 50 lbs./acre of total nitrogen (as N).

Phosphorus (as P2O5) Profile:

80 lbs./acre Total Phosphorus. The phosphorus will be obtained from a variety of commercially available fertilizers: Commercial (7-21-0); Commercial (4-6-10); Commercial (10-34-0); and Commercial (0-21-0). This is to be added during the following intervals: March 1 through May 31, 40 lbs./acre of total phosphorus (as P2O5); June 1 through August 31, 0 lbs./acre of total phosphorus (as P2O5); and September 1 through October 30, 40 lbs./acre of total phosphorus (as P2O5).

Potassium (as K2O) Profile:

180 lbs./acre Total Potassium. The potassium will be obtained from variety of commercially available fertilizers: Commercial (0-0-25); Commercial (4-6-10); and Commercial (0-0-5). This is to be added during the following intervals: March 1 through May 31, 100 lbs./acre of total potassium (as K2O); June 1 through August 31, 25 lbs./acre of total potassium (as K2O); September 1 through October 30, 55 lbs./acre of total potassium (as K2O).

Calcium (as Ca) Profile:

35 lbs./acre Total Calcium. The calcium will be obtained from a commercially available fertilizer (17-0-0+8.8 Ca). This is to be added during the following intervals: March 1 through May 31, 17.5 lbs./acre of total calcium (as Ca); June 1 through August 31, 0 lbs./acre of total calcium (as Ca); September 1 through October 30—17.5 lbs./acre of total calcium (as Ca).

pH Profile:

No adjustment (pH is the pH of the incoming irrigation water, which is about 7.8, which might be somewhat modified by the slug-feedings).

Commercial Fertilizers Fed and Nutrients Provided:

March 1 Commercial Fertilizer Fed and Nutrients Provided:

Slug-feed of 142.9 lbs./acre of a blended commercial mixture called Structure® (Structure® is a registered trademark of Actagro, LLC of Biola, Calif.) which is derived from ammonia, urea, ammonium nitrate, phosphoric acid and other non-fertilizer ingredients (7-21-0). This slug-feed provides: (a) 8.6 lbs./acre of ammoniacal nitrogen (as N); (b) 0.4 lbs./acre of nitrate nitrogen (as N); (c) 1.0 lbs./acre of urea nitrogen (as N); and (d) 30.0 lbs./acre of phosphorus (as P2O5).

March 15 Commercial Fertilizer Fed and Nutrients Provided:

Slug-feed 333.2 lbs./acre of a commercial mixture called K-Mend® (K-Mend® is a registered trademark of Best Sulfur Products, Inc. of Fresno, Calif.) which is derived from potassium thiosulfate (0-0-25). This slug-feed provides 83.3 lbs./acre of potassium (as K2O).

March 30 Commercial Fertilizer Fed and Nutrients Provided:

Slug-feed of 198.9 lbs./acre of a blended commercial mixture (called CAN-17) which is derived from ammonium nitrate and calcium nitrate (17-0-0+8.8 Ca). This slug-feed provides: (a) 10.8 lbs./acre of ammoniacal nitrogen (as N); (b) 23.1 lbs./acre of nitrate nitrogen (as N); and (c) 17.5 lbs./acre of calcium (as Ca).

April 15 Commercial Fertilizer Fed and Nutrients Provided:

Slug-feed of 126.7 lbs./acre of a blended commercial mixture (called N-pHuric 15/49) which is derived from urea and sulfuric acid (15-0-0). This slug-feed provides (a) 19.0 lbs./acre of urea nitrogen (as N).

May 1 Commercial Fertilizer Fed and Nutrients Provided:

Slug-feed of 167.2 lbs./acre of a blended commercial mixture called Cache® (Cache® is a registered trademark of Actagro, LLC of Biola, Calif.) which is derived from ammonia, urea, ammonium nitrate, phosphoric acid and potassium chloride (4-6-10). This slug-feed provides: (a) 3.7 lbs./acre of ammoniacal nitrogen (as N); (b) 1.0 lbs./acre of nitrate nitrogen (as N); (c) 2.0 lbs./acre of urea nitrogen (as N); (d) 10.0 lbs./acre of phosphorus (as P2O5); and (e) 16.7 lbs./acre of potassium (as K2O).

May 15 Commercial Fertilizer Fed and Nutrients Provided:

Slug-feed 173.4 lbs./acre of a blended commercial mixture (called UAN-32) which is derived from ammonium nitrate and urea (32-0-0). This slug-feed provides (a) 13.4 lbs./acre of ammoniacal nitrogen (as N); (b) 13.4 lbs./acre of nitrate nitrogen (as N); and (c) 28.6 lbs./acre of urea nitrogen (as N).

June 15 Commercial Fertilizer Fed and Nutrients Provided:

Slug-feed 100.0 lbs./acre of a commercial mixture called K-Mend® (K-Mend® is a registered trademark of Best Sulfur Products, Inc. of Fresno, Calif.) which is derived from potassium thiosulfate (0-0-25). This slug-feed provides 25.0 lbs./acre of potassium (as K2O).

July 1 Commercial Fertilizer Fed and Nutrients Provided:

Slug-feed 125.0 lbs./acre of a blended commercial mixture (called AN-20) which is derived from ammonium nitrate (20-0-0). This slug-feed provides (a) 12.5 lbs/acre of ammoniacal nitrogen (as N); and (b) 12.5 lbs/acre of nitrate nitrogen (as N).

September 1 Commercial Fertilizer Fed and Nutrients Provided:

Slug-feed 198.9 lbs./acre of a blended commercial mixture (called CAN-17) which is derived from ammonium nitrate and calcium nitrate (17-0-0+8.8 Ca). This slug-feed provides (a) 10.8 lbs./acre of ammoniacal nitrogen (as N); (b) 23.1 lbs./acre of nitrate nitrogen (as N); and (c) 17.5 lbs./acre of calcium (as Ca).

September 15 Commercial Fertilizer Fed and Nutrients Provided:

Slug-feed 88.2 lbs./acre of a blended commercial mixture (called liquid ammonium polyphosphate) which is derived from ammonium phosphate (10-34-0). This slug-feed provides (a) 8.8 lbs./acre of ammoniacal nitrogen (as N); and (b) 30.0 lbs./acre of phosphorus (as P2O5).

October 1 Commercial Fertilizer Fed and Nutrients Provided:

Slug-feed 47.6 lbs./acre of a blended commercial mixture (called DPG 0-21-0) which is derived from phosphoric acid and other non-fertilizer ingredients (0-21-0). This slug-feed provides 10.0 lbs./acre of phosphorus (as P2O5).

October 15 Commercial Fertilizer Fed and Nutrients Provided:

Slug-feed 48.6 lbs./acre of a blended commercial mixture called N-pHuric® 15/49 which is derived from urea and sulfuric acid (15-0-0). This slug-feed provides (a) 7.3 lbs./acre of urea nitrogen (as N).

October 30 Commercial Fertilizer Fed and Nutrients Provided:

Slug-feed 1100.0 lbs./acre of a blended commercial mixture called Potassium sulfate solution which is derived from potassium sulfate (0-0-5). (The more convenient source, namely 220 lbs/acre of a commercial mixture called K-Mend® which is derived from potassium thiosulfate (0-0-25) was not available to the grower at the time it was needed.) This slug feed provides 55.0 lbs./acre of potassium (as K2O).

Example 3

Continuous In-Situ Manufactured Fertigation Embodiment of the Present Invention

The nutrient profiles (below) are satisfied with a continuous feeding of a plurality of co-reactant crop-quality enhancers and any included non-co-reactant crop-quality enhancers, the composition of which is different during three continuous-fertigation intervals (each designated by the first and last dates of the interval) wherein up to seven co-reactant and non-co-reactant crop-quality enhancers are simultaneous charged at separate, but proximate, feed points along the irrigation system's main line. These co-reactant crop-quality enhancers, upon intermixing and reacting within the main line, and upon intermixing with any included non-co-reactant crop-quality enhancers, produce the present invention's fertilizer crop-quality enhancers. The in-situ manufacturing method embodiment of the present invention provides the flexibility with limitless and continuous fertigations (for every irrigation set) and matches, without exceeding, the nutrient profiles. In other words, unlike Comparative Example C's conventional fertigation in which, due to the inflexibility of nutrient ratios of the commercial fertilizers, meeting the nutrient profiles requires exceeding at least one of the profiles, the continuous crop-quality-enhancement fertigation embodiment of the present invention ensures that all nutrient profiles are met and none are exceeded. In addition, the total poundage fed to the system is significantly lower.

Profiles:

Nitrogen (as N) Profile:

200 lbs./acre Total Nitrogen. The nitrogen will be obtained from calcium nitrate solution, concentrated nitric acid, ammonia and an urea solution. This is to be added continuously during the following intervals: March 1 through May 31, 125 lbs./acre of total nitrogen (as N); June 1 through August 31, 25 lbs./acre of total nitrogen (as N); and September 1 through October 30, 50 lbs./acre of total nitrogen (as N).

Phosphorus (as P2O5) Profile:

80 lbs./acre Total Phosphorus. The phosphorus will be obtained from concentrated phosphoric acid. This is to be added continuously during the following intervals: March 1 through May 31, 40 lbs./acre of total phosphorus (as P2O5); June 1 through August 31, 0 lbs./acre of total phosphorus (as P2O5); September 1 through October 30, 40 lbs./acre of total phosphorus (as P2O5).

Potassium (as K2O) Profile:

180 lbs./acre Total Potassium. The potassium will be obtained from concentrated potassium hydroxide. This is to be added continuously during the following intervals: March 1 through May 31, 100 lbs./acre of total potassium (as K2O). June 1 through August 31, 25 lbs./acre of total potassium (as K2O). September 1 through October 30, 55 lbs./acre of total potassium (as K2O).

Calcium (as Ca) Profile:

35.00 lbs./acre Total Calcium. The calcium will be obtained from calcium nitrate solution (a non-co-reactant crop-quality enhancer). This is to be added continuously during the following intervals: March 1 through May 31, 17.5 lbs./acre of total calcium (as Ca); June 1 through August 31, 0 lbs./acre of total calcium (as Ca); September 1 through October 30, 17.5 lbs./acre of total calcium (as Ca).

pH Profile:

Continuously adjust to a pH of 6.5 March 1 through October 30: The exact amount of sulfuric acid that is added is dependent on both the alkalinity resulting from the other crop-quality enhancers, as well as the alkalinity of the irrigation water. This amount is determined by the pH controller, which always maintains the pH at the desired level. In this case the target pH is set at 6.5. (Note: Since sulfuric acid does not contain any nutrients it has no impact on the NPK levels.)

Charges and Nutrients Provided:

March 1 Through May 31 Charges and Nutrients Provided:

Continuous simultaneous charge and reaction of the following co-reactant and non-co-reactant crop-quality enhancers: 50.60 lbs./acre ammonia, 148.32 lbs./acre calcium nitrate, 194.52 lbs./acre nitric acid, 181.20 lbs./acre urea, 73.68 lbs./acre phosphoric acid, 238.08 lbs./acre potassium hydroxide and sulfuric acid (as required to maintain a target pH of 6.5 for the treated irrigation water). This continuous charge provides: (a) 125 lbs./acre of total nitrogen (as N), equally distributed between ammoniacal (41.68 lbs./acre), nitrate (41.68 lbs./acre), and urea (41.68 lbs/acre) nitrogen; (b) 40.00 lbs./acre phosphate (as P2O5); 100.00 lbs./acre potassium (as K2O); and (d) 17.5 lbs./acre calcium (as Ca).

June 1 Through August 31 Charges and Nutrients Provided:

Continuous simultaneous charge and reaction of the following co-reactant crop-quality enhancers: 10.11 lbs./acre ammonia, 55.16 lbs./acre nitric acid, 36.21 lbs./acre urea, 59.52 lbs./acre potassium hydroxide and sulfuric acid (as required to maintain a target pH of 6.5 for the treated irrigation water). This continuous charge provides: (a) 24.99 lbs./acre of total nitrogen (as N), equally distributed between ammoniacal (8.33 lbs./acre), nitrate (8.33 lbs./acre), and urea (8.33 lbs/acre) nitrogen; and (b) 25.00 lbs./acre potassium (as K2O).

September 1 Through October 30 Charges and Nutrients Provided:

Continuous simultaneous charge and reaction of the following co-reactant and non-co-reactant crop-quality enhancers: 20.22 lbs./acre ammonia, 148.30 lbs./acre calcium nitrate, 28.86 lbs./acre nitric acid, 72.42 lbs./acre urea, 73.68 lbs./acre phosphoric acid, 130.96 lbs./acre potassium hydroxide and sulfuric acid (as required to maintain a target pH of 6.5 for the treated irrigation water). This continuous charge provides: (a) 49.98 lbs./acre of total nitrogen (as N), equally distributed between ammoniacal (16.66 lbs./acre), nitrate (16.66 lbs./acre), and urea (16.66 lbs/acre) nitrogen; (b) 40.00 lbs./acre phosphate (as P2O5); (c) 55.00 lbs./acre potassium (as K2O); and (d) 17.50 lbs./acre calcium (as Ca).

Summary and Comments on Example 3 and Comparative Example C:

Fertilizers are the distinct formulations that are manufactured and consist of electrically neutral, reacted compounds such as ammonium nitrate, potassium sulfate, potassium ammonium phosphate and the like. In all the fertilizers manufactured by commercial producers or via the method and system of the present invention, such neutral, reacted compounds are manufactured, but once these fertilizer formulations are in solution such compounds all dissociate into anions, cations or remain as neutral species and it is these anions, cations and neutral species that are the actual nutrients (fertilizer nutrients). Again, the macronutrients are N, P, K, or nitrogen, phosphorus and potassium.

As to the macronutrients, nitrogen (N) is the fertilizer nutrient that is most complicated to provide because there are three forms, namely, urea-based nitrogen (urea), ammoniacal nitrogen (NH4+) and nitrate nitrogen (NO3−). Urea and ammoniacal nitrogens must be broken down in the soil (hydrolysis and/or oxidation) to nitrate (NO3−) nitrogen before they can be used by the plant. Phosphate's nutrient species are H2PO4, HPO4-2 and PO4-3. Potassium's nutrient species is K+.

As to the primary micronutrients, calcium's nutrient species is Ca+2 and magnesium's micronutrient species is Mg+2.

As to other fertilizer components, the hydrogen (H+) cation is not a nutrient or micronutrient but the pH of the soil (H+ concentration) affects the ability of the plant to absorb the nutrient species, including in particular the micronutrients. The sulfate anion SO4-2 is mostly inert and not considered a nutrient although plants may absorb some sulfate for its S requirement. The thiosulfate anion S2O3-2 is inert and is rapidly oxidized to sulfate in the soil. The chloride anion is detrimental to plant growth and should be avoided if at all possible.

As seen above, there are just a few basic nutrients which can be obtained from fertilizer formulations.

Summary and Comments on Comparative Example C, March 1 Through June 15

The March 1 fertigation used Structure® (Structure® is a registered trademark of Actagro, LLC of Biola, Calif.). Structure® as stated in Comparative Example C is made from the following raw materials; ammonia, ammonium nitrate, urea, and phosphoric acid. When these raw materials are reacted at the commercial fertilizer production plant the following reactions take place to some extent until an equilibrium is reached:

1). NH4NO3—No reaction
    2). Urea+H3PO4→[Urea][H3PO4]+heat of reaction
    3). NH3+H3PO4→(NH4)H2PO4+heat of reaction
    4). 2 NH3+H3PO4→(NH4)2HPO4+heat of reaction
    5). 3 NH3+H3PO4→(NH4)3PO4+heat of reaction In solution these transient reaction products immediately dissociate into the following ionic and neutral species with the formation of additional heat: (a) the cations NH4+ and H+; (b) the anions NO3−, H2PO4−, HPO4-2 and PO4-3; and (c) the neutral species urea, and these are the species which ultimately form the basis of the nutrients that the plant uses.

The March 15 fertigation used K-Mend® (K-Mend® is a registered trademark of Best Sulfur Products, Inc. of Fresno, Calif.) which, as stated in the Comparative Example C, is potassium thiosulfate made from the following raw materials; potassium sulfite and elemental sulfur. When these raw materials are reacted at the fertilizer plant the following reaction takes place when heat is applied:

1. K2SO3+S+heat→K2S2O3

In solution this transient compound immediately dissociates into the following ionic species: (a) the cation K+; and (b) the anion S2O3-2. The potassium ion forms the basis for a potassium nutrient while the thiosulfate anion eventually is oxidized to a sulfate anion in the soil. Potassium thiosulfate, although difficult to manufacture, provides one of the few potassium salts that can be used as a fertilizer because of solubility and/or compatibility reasons.

The March 30 fertigation used CAN-17 which, as stated in Comparative Example C, is made from the following raw materials; calcium nitrate and ammonium nitrate. When these raw materials are blended at the fertilizer plant the following reactions take place to some extent until an equilibrium is reached:

1). NH4NO3—No reaction
    2. Ca(NO3)2—No reaction

In solution these transient compounds immediately dissociate into the following ionic and neutral species with the formation of additional heat: (a) the cations Ca+2 and NH4+; and (b) the anion NO3−, and these are the species which ultimately form the basis of the nutrients that the plant uses.

The April 15 fertigation used N-pHuric® which, as stated in Comparative Example C, is made from the following raw materials: urea and sulfuric acid. When these raw materials are reacted at the fertilizer plant the following reactions take place to some extent until an equilibrium is reached:

1. Urea+H2SO4→+[Urea][H2SO4]+heat of reaction

In solution these transient compounds immediately dissociate into the following ionic and neutral species with the formation of additional heat: (a) the cation H+; (b) the anions HSO4− and SO4-2; and (c) neutral urea, and these are the species which ultimately form the basis of the nutrients that the plant uses.

The May 1 fertigation used Cache® (Cache® is a registered trademark of Actagro, LLC of Biola, Calif.) which, as stated in Comparative Example C, is made from the following raw materials; ammonia, ammonium nitrate, urea, phosphoric acid and potassium chloride. When these raw materials are reacted at the fertilizer plant the following reactions take place to some extent until an equilibrium is reached:
1). $NH_4NO_3$—No reaction
2). $Urea+H_3PO_4 \rightarrow [Urea][H_3PO_4]+$heat of reaction
3). $NH_3+H_3PO_4 \rightarrow (NH_4)H_2PO_4+$heat of reaction
4). $2\ NH_3+H_3PO_4 \rightarrow (NH_4)_2HPO_4+$heat of reaction
5). $3\ NH_3+H_3PO_4 \rightarrow (NH_4)_3PO_4+$heat of reaction
6). KCl—No reaction In solution these transient compounds immediately dissociate into the following ionic and neutral species with the formation of additional heat: (a) the cations $NH_4+$, $H+$ and $K+$; (b) the anions $HPO_4-2$, $H_2PO_4-$, $PO_4-3$ and Cl—; and (c) neutral urea, and these are the species which ultimately form the basis of the nutrients that the plant uses, except for chloride. The chloride anion is not a fertilizer nor any kind of nutrient. It is actually toxic for many crops. The reason why many commercial formulations use potassium chloride is because there are few potassium compounds that can be used as fertilizers because of the limited solubility of potassium salts. As a result, except for potassium thiosulfate, there are no viable potassium salts that can be formulated into a potassium fertilizer. This is the reason why potassium sulfate is rarely used as a fertilizer because only very dilute solutions can be manufactured which cause exorbitant shipping, storage and handling problems.

The May 15 fertigation used UAN 32 which, as stated in Comparative Example C, is made from the following raw materials; ammonium nitrate, and urea. When these raw materials are reacted at the fertilizer plant the following reactions take place to some extent until an equilibrium is reached:
1). $NH_4NO_3$—No reaction
2). Urea—No reaction In solution these transient compounds immediately dissociate into the following ionic and neutral species with the formation of additional heat: (a) the cation $NH_4+$; (b) the anion $NO_3-$; and (c) neutral urea, and these are the species which ultimately form the basis of the nutrients that the plant uses.

The June 15 fertigation used K-Mend® (K-Mend® is a registered trademark of Best Sulfur Products, Inc. of Fresno, Calif.) which is described above for the March 15 fertigation and therefore will not be repeated here.

Summary and Comments on Example 3, March 1 Through June 15

In certain embodiments, the method and system of the present invention can use all or any of the concentrated raw materials that are used to manufacture the above-described commercial fertilizers, namely ammonia, potassium hydroxide, urea, nitric acid, sulfuric acid, phosphoric acid, calcium nitrate and magnesium nitrate right at the irrigation site. When these raw materials are reacted utilizing the irrigation system the following reactions take place to some extent until an equilibrium is reached:
1). $HNO_3+KOH \rightarrow KNO_3+H_2O+$heat of reaction
2). $HNO_3+NH_3 \rightarrow NH_4NO_3+$heat of reaction
3). $HNO_3+urea \rightarrow [urea][HNO_3]+$heat of reaction
4). $H_2SO_4+KOH \rightarrow KHSO_4+H_2O+$heat of reaction
5). $H_2SO_4+2\ KOH \rightarrow K_2SO_4+2\ H_2O+$heat of reaction
6). $H_2SO_4+NH_3 \rightarrow (NH_4)HSO_4+$heat of reaction
7). $H_2SO_4+2\ NH_3 \rightarrow (NH_4)_2SO_4+$heat of reaction
8). $H_2SO_4+urea \rightarrow [urea][H_2SO_4]+$heat of reaction
9). $H_2SO_4+2\ urea \rightarrow [urea]_2[H_2SO_4]+$heat of reaction
10). $H_2SO_4+KOH+NH_3 \rightarrow K(NH_4)SO_4+H_2O+$heat of reaction
11). $H_3PO_4+KOH \rightarrow KH_2PO_4+H_2O+$heat of reaction
12). $H_3PO_4+2\ KOH \rightarrow K_2HPO_4+2H_2O+$heat of reaction
13). $H_3PO_4+3\ KOH \rightarrow K_3PO_4+3H_2O+$heat of reaction
14). $H_3PO_4+NH_3 \rightarrow (NH_4)H_2PO_4+$heat of reaction
15). $H_3PO_4+2\ NH_3 \rightarrow (NH_4)_2HPO_4+$heat of reaction
16). $H_3PO_4+3\ NH_3 \rightarrow (NH_4)_3PO_4+$heat of reaction
17). $H_3PO_4+urea \rightarrow [urea][H_3PO_4]+$heat of reaction
18). $H_3PO_4+NH_3+KOH \rightarrow (NH_4)HPO_4+H_2O+$heat of reaction
19). $H_3PO_4+2\ NH_3+KOH \rightarrow K(NH_4)_2PO_4+H_2O+$heat of reaction
20). $H_3PO_4+NH_3+2\ KOH \rightarrow K_2(NH_4)PO_4+2H_2O+$heat of reaction
21). $Ca(NO_3)_2$—No reaction
22). $Mg(NO_3)_2$—No reaction In solution these transient compounds immediately dissociate into the following ionic and neutral species with the formation of additional heat: (a) the cations $NH_4+$, $H+$, $K+$, $Ca+2$ and $Mg+2$; (b) the anions $NO_3-$, $H_2PO_4-$, $HPO_4-2$, $PO_4-3$; and (c) neutral urea, and these are the species which ultimately form the basis of the nutrients that the plant uses.

The continuous fertigations use the same crop-quality enhancers and ratios throughout the time period or, if the growing conditions changed, the amounts and ratios of the nutrients, or other crop-quality enhancer(s), being charged can be changed to best suit conditions at a moment's notice.

Summary and Comments on Comparative Example C, October 30 Potassium Addition

As noted to a degree above, potassium thiosulfate was not available commercially, and therefore on October 30 no commercial fertilizer derived from potassium thiosulfate was available to the grower. As a result of the unavailability of a commercial potassium thiosulfate fertilizer to meet the potassium requirements of the crop, the grower was forced to have a fertilizer company manufacture a potassium sulfate fertilizer. Due to the low solubility of potassium sulfate, the grower had to ship, store and fertigate with 1100.0 lbs./acre of a dilute potassium sulfate fertilizer solution (0-0-5) which resulted in an extreme expense and inconvenience.

Summary and Comments on Comparative Example C and Example 3 Material Usage

As shown above, to provide the same N,P,K amounts, in Comparative Example C the grower was required to have 1,291,324 lbs. of commercial fertilizer shipped to the site, while in Example 3 the grower was only required to have 689,376 lbs. of crop-quality enhancers shipped. This vast difference in shipping weights of 689,376 lbs for Example 3 versus 1,291,324 lbs for Comparative Example C represents a 53.4% cost savings in shipping for the grower.

Example 4 and Comparative Example D Projections

In a situation as described above for Example 3 and Comparative Example C, the same projections and profiles were set prior to the growing season, but then excessive rainfall began and continued into the growing season. Since the crop had already received an excessive amount of water, no irrigation or fertigation was done until the rainfalls ceased and the soil sufficiently dried. When irrigation and fertigation could commence, it was no longer desirable to use the slow-release forms of nitrogen, namely urea and ammoniacal nitrogen that are broken down in the soil to nitrate nitrogen. Instead, fertigation with nitrate nitrogen to provide nitrogen to the crop as quickly as possible was desired.

In the Comparative Example C situation, the grower intended to use commercial fertilizers which provided a significant proportion of slow-release forms of nitrogen on each of March 1, March 30, April 15, May 1, May 15 and June 1, and to assure that these fertilizers were available when needed, the grower contracted in advance to purchase these fertilizers in the quantities needed. The grower's options are to initiate the late-season fertigations using the commercial fertilizers under contract or fulfill its contractual obligations while concomitantly purchasing high nitrate-nitrogen fertilizer for actual use. The first option is a poor choice for good crop growth, and therefore has negative financial impacts, and the second option is also a poor choice financially.

In the Example 3 situation, the grower also intended to use a crop-quality-enhancer feedstock which included slow-release forms of nitrogen, but since the fertilizer would be manufactured in situ from crop-quality enhancers that could be changed as to amount and proportion at will, that grower did not contract to purchase any fertilizers.

When fertigation could be initiated, the grower merely switched the crop-quality-enhancer feedstock from one which provided a significant proportion of slow-release forms of nitrogen to one which provided the needed nitrate nitrogen. The grower essentially has no burden whatsoever, and if additional quantities of crop-quality enhancers are needed, the bulk transport thereof would be far less than the bulk transport of a high-nitrate-nitrogen commercial fertilizer.

In addition, to accommodate the reduced need for irrigation and the increased need for nitrogen that can be taken up by the plant, as a result of the heavy rainfall, the quantity (higher than the projected amount to be added by the continuous fertigation beginning March 1) of fast release nitrate nitrogen per unit time is simply and easily increased with the continuous fertigation. In a similar fashion, the other forms of nitrogen (ammoniacal and urea nitrogen) are decreased or stopped to provide the amount needed under the nitrogen profile with the continuous fertigation. Although the irrigation time is now shorter, the increase in fast release nitrate nitrogen, when increased or adjusted in this manner, quickly alleviates any nitrogen deficiency caused by the unexpected rainfall. This example demonstrates the versatility of the present invention (particularly but not limited to the in-situ-manufacturing embodiment) which rapidly corrects for any nutrient (N,P,K) deficiency by instantly changing the N,P,K profile with no adverse impact on the crop or the grower.

Example 5 and Comparative Example E Projections

The method of the present invention in comparison to conventional fertilization practices were evaluated for use at a 150 acre pistachio ranch that has been using conventional fertilization practices for years. For this comparison, a fertigation program similar to that used in the past was selected for the projection of Comparative Example E. The projection of Example 5 is based on the same nutrients as Comparative Example E at amounts that are approximately 25 percent lower because, as discussed above, a far higher percentage of the nutrients applied are available to the crop in comparison to conventional fertilization practices such as those of Comparative Example E. These projections are shown in Table 10 below.

TABLE 10

| Recommended Nutrient | Comparative Example E Recommended Amount | Example 5 Recommended Amount |
|---|---|---|
| Nitrogen (as N) | 200 lb/acre as N | 150 lb/acre as N |
| Phosphorus (as P2O5) | 40 lb/acre as P2O5 | 30 lb/acre as P2O5 |
| Potassium (as K2O) | 150 lb/acre as K2O | 120 lb/acre as K2O |
| Calcium (as Ca) | 50 lb/acre as Ca | 35 lb/acre as Ca |

The agricultural area of this Example 5 and Comparative Example E, namely the 150 acre pistachio ranch, will normally receive a total of four acre-feet of irrigation water over its eight-month (March 1 to November 1) growing season, delivered as follows: (a) 1.0 acre-foot during the first three months (March 1 through June 1); (b) 2.5 acre-feet during the second three months (June 1 through September 1); and (c) 0.5 acre-foot during the last two months (September 1 through November 1). An acre-foot is 325,851 gallons, and therefore 195.5 million gallons of irrigation water are normally delivered to acreage of this ranch per growing season. The conventional fertigation program or schedule historically required on this pistachio ranch to meet the nutrient profile (shown again in Table 11 below) is shown in Table 12 below. The fertigation program required using the method of the present invention to meet the adjusted nutrient profile (shown again in Table 13 below) is shown in Table 14 below. The downward adjustment of the nutrient profile for the method of the present invention is a very conservative estimate of the lower nutrient levels required when nutrients are no longer being lost to the root area as described above for conventional fertilization.

TABLE 11

| Nutrient Profile | |
|---|---|
| Nutrient | Total Nutrient Amount |
| Nitrogen (as N) | 200 lb/acre |
| Phosphorus (as P2O5) | 40 lb/acre |
| Potassium (as K2O) | 150 lb/acre |
| Calcium (as Ca) | 50 lb/acre |

TABLE 12

| | Conventional Fertigation Schedule | | | | | | | | |
|---|---|---|---|---|---|---|---|---|---|
| | Amounts Slug Fed (lb./acre) | | | | | | | | |
| | Mar. 1 | Mar. 10 | Mar. 15 | Mar. 30 | Jun. 1 | Sep. 1 | Sep. 15 | Oct. 1 | Oct. 30 |
| Fertilizer Solution (%N-P-K & other nutrients) | | | | | | | | | |
| NH4H2PO4 (10-34-0) | 73.5 | | | | | | | | 44.1 |
| UAN-32 (32-0-0) | | 263.6 | | | | | | 22.8 | |
| CAN-17 | | | 284.1 | 170.5 | 113.6 | | | | |

TABLE 12-continued

Conventional Fertigation Schedule

Amounts Slug Fed (lb./acre)

|  | Mar. 1 | Mar. 10 | Mar. 15 | Mar. 30 | Jun. 1 | Sep. 1 | Sep. 15 | Oct. 1 | Oct. 30 |
|---|---|---|---|---|---|---|---|---|---|
| (17-0-0) + 8.8 Ca |  |  |  |  |  |  |  |  |  |
| K2S2O3 (0-0-25) |  |  |  | 500.0 |  |  | 100.0 |  |  |
| Nutrient by Type |  |  |  |  |  |  |  |  |  |
| Nitrate nitrogen (as N) |  | 20.43 | 32.96 |  | 19.78 | 13.18 |  | 1.77 |  |
| Ammoniacal nitrogen (as N) | 7.35 | 20.43 | 15.34 |  | 9.21 | 6.13 |  | 1.77 | 4.41 |
| Urea nitrogen (as N) |  | 43.49 |  |  |  |  |  | 3.76 |  |
| Phosphorus (as P2O5) | 25.00 |  |  |  |  |  |  |  | 15.00 |
| Potassium (as K2O) |  |  |  | 125.0 |  |  | 25.00 |  |  |
| Calcium (as Ca) |  |  | 25.00 |  | 15.00 | 10.00 |  |  |  |

TABLE 13

Adjusted Nutrient Profile

| Nitrogen (as N) | 150 lb/acre |
|---|---|
| Phosphorus (as P2O5) | 30 lb/acre |
| Potassium (as K2O) | 120 lb/acre |
| Calcium (as Ca) | 35 lb/acre |

TABLE 14

Continuous-Feed On-Site Manufacture Fertilization Schedule

Total Amounts Fed Over Time Periods (lb.)

|  | March | April | May | June | July | August | September | October |
|---|---|---|---|---|---|---|---|---|
| Fertilizer Solution (% N-P-K & other nutrients) |  |  |  |  |  |  |  |  |
| NH4H2PO4 (10-34-0) | ← | 58.82 | → |  |  |  | ← 44.1 → |  |
| UAN-32 (32-0-0) | ← | 219.4 | → |  |  |  | ← 6.09 → |  |
| CAN-17 | ← | 170.5 | → | ← | 113.6 | → | ← 113.6 → |  |
| K2S2O3 (0-0-25) | ← |  | 400.0 |  | → |  | ← 80.0 → |  |
| Nutrient (by type) |  |  |  |  |  |  |  |  |
| Nitrate nitrogen (as N) | ← | 36.77 | → | ← | 13.18 | → | ← 13.65 → |  |
| Ammoniacal nitrogen (as N) | ← | 32.08 | → | ← | 6.14 | → | ← 11.02 → |  |
| Urea nitrogen (as N) | ← | 36.17 | → |  |  |  | ← 1.0 → |  |
| Phosphorus (as P2O5) | ← | 20.00 | → |  |  |  | ← 10.00 → |  |
| Potassium (as K2O) | ← |  | 100.0 |  | → |  | ← 20.00 → |  |
| Calcium (as Ca) | ← | 15.0 | → | ← | 10.0 | → | ← 10.0 → |  |

Projection Comparisons:

Slug Feed—Comparative Example E Projection (Nitrate Nitrogen):

On both March 10 and March 15 nitrate nitrogen (as N) is slug fed into the irrigation system. Specifically, on March 10, 20.43 lbs./acre nitrate (as N) from a UAN-32 source is fed to 150 acres at a flow rate of 1200 gallons/min. for this grower's normal 9.0 hour irrigation period. (UAN is an acronym for an aqueous solution of urea and ammonium nitrate.) The nitrate nitrogen (as N) concentration in the irrigation water during this slug fertigation process is: (20.43 lbs./acre NO3–(as N)×150 acres×1000 grams/2.2 lbs.)/(1200 gal./min.×9 hrs.×60 min./hr.×3.78 liters/gal.×1000 ml/1 liter) or 569 ppm NO3– (as N). Specifically, on March 15, 32.96 lbs./acre nitrate (as N) from a CAN-17 source is fed to 150 acres at a flow rate of 1200 gallons/min. for this grower's normal 9.0 hour irrigation period. (CAN is an acronym for an aqueous solution of calcium nitrate and ammonium nitrate.) The nitrate nitrogen (as N) concentration in the irrigation water during this slug fertigation process is: (32.96 lbs./acre NO3–(as N)×150 acres×1000 grams/2.2 lbs.)/(1200 gal./min.×9 hrs.×60 min./hr.×3.78 liters/gal.×1000 ml/1 liter) or 917 ppm NO3– (as N).

The amount of water used during each slug fertigation process is, using the parameter that an ac-ft (acre-foot) is 325,851 gallons of water: 1200 gal./min.×60 min./hr.×9 hrs.=648,000 gal.×1 ac-ft/325,851 gal. or 1.99 ac-ft.

The 1.99 ac-ft of water is distributed over 150 acres and therefore the per-acre water distribution (1.99 ac-ft/150 acres) is 0.0133 ac-ft/acre. The next nitrogen slug feed fertigation is June 1. The total evenly-distributed irrigation water to be delivered during March, April and May is 1 ac-ft. Therefore the amount of irrigation water delivered during the period of March 16 (the day after the March 15th nitrogen slug feeding) and May 30 (the day before the June 1st slug feeding) is about "1 ac-ft/acre×(2.5 months/3.0 months)" or 0.833 ac-ft/acre, and it will contain no nitrate nitrogen fertilizer. Again, this grower's normal irrigation period is 9 hours per day. Therefore after the second nitrate slug feed of fertilizer there are about "[(0.833 ac-ft/acre)/(0.0133 ac-ft/acre)–1]" or 61.6 irrigation periods (irrigation days) on which no nitrate nitrogen fertilizer is delivered with the irrigation water.

Continuous Feed—Example 5 Projection (Nitrate Nitrogen):

A total of 36.77 lbs./acre nitrate nitrogen is continuously charged to the irrigation water distributed during each irrigation period during the months of March, April and May (from March 1 up to, but not including, June 1). For purposes of comparison to the slug-fed projection above, only the nitrate nitrogen charged, and the irrigation water delivered, during the shorter period of between March 15 and May 30 is considered. The comparative (normalized) amount of nitrate nitrogen is therefore 30.63 lbs./acre nitrate. The nitrate nitrogen (as N) concentration in the irrigation water during this continuous fertigation process is: (30.63 lbs./acre×150 acres×1000 grams/2.2 lbs.)/(0.833 ac-ft/acre×325,851 gal./ac-ft×3780 ml/gal.×150 acres) or 13.6 ppm NO3− (as N).

In other words, in this Example 5 projection, when the flow rate is sufficient the fertilizer is added with irrigation water delivered during the 62.6 nine-hour irrigation periods from March 15 through May 30, while in the Comparative Example E projection, the entire fertilizer is added only during two irrigation periods, each period being 9 hours, separated by 4 days namely March 10 and March 15, respectively.

Another difference between the slug feeding and the present invention's continuous feeding is the rate of fertilizer addition. To fully illustrate the magnitude of this difference, the feed rate are provided below.

Slug Feed—Feed Rate of Comparative Example E Projection (Nitrate Nitrogen):

In the slug feeding projection of Comparative Example E, the nitrate nitrogen source, on March 10 is a commercial UAN-32 which has a nitrate composition of 7.75 percent nitrate nitrogen and a density of 11.06 lbs./gal. (UAN is an acronym for an aqueous solution of urea and ammonium nitrate.) The volume of UAN-32 used is: 150 acres×20.43 lbs./acre NO3− (as N)×100%/7.75%×1 gal./11.06 lbs. or 3575 gallons. The feed rate of this 3575 gallons, which is fed in a 9.0 hr. irrigation-period, is: 3575 gal./9.0 hrs.×1 hr./60 min. or 6.62 gal./min. (continuously throughout a nine hour irrigation period). Similarly, in the slug feeding projection of Comparative Example E, the nitrate nitrogen source, on March 15 is a commercial CAN-17 which has a nitrate composition of 11.6 percent nitrate nitrogen and a density of 12.64 lbs./gal. (CAN is an acronym for an aqueous solution of calcium nitrate and ammonium nitrate.) The volume of CAN-17 used is: 150 acres×32.96 lbs./acre NO3− (as N)×100%/11.6%×1 gal./12.64 lbs. or 3372 gallons. The feed rate of this 3372 gallons, which is fed in a 9.0 hr. irrigation period, is: 3372 gal./9.0 hrs.×1 hr./60 min. or 6.24 gal./min. (continuously throughout a nine hour irrigation period).

Continuous Feed—Feed Rate of Example 5 Projection (Nitrate Nitrogen):

In the continuous feeding projection of Example 5 (again, the normalized March 15 through May 30 feeding of 30.63 lbs./acre of nitrate nitrogen), the nitrate nitrogen is produced from two sources (again normalized): 14.15 lbs./acre of nitrate nitrogen from the UAN-32 nitrate nitrogen feedstock; and 16.48 lbs./acre of nitrate nitrogen from the CAN-17 feedstock. These feedstocks have the following compositions and densities, respectively: 7.75% nitrate nitrogen and a density of 11.06 lbs./gal. and 11.6% nitrate nitrogen and a density of 12.64 lbs./gal. The volume of UAN-32 nitrate feedstock used is 150 acres×14.15 lbs./acre NO3− (as N)×100%/7.75%×1 gal./11.06 lbs. or 2476 gallons, which is charged continuously during 62.6 irrigation periods at a feed rate of 2476 gal./62.6 cycles×1 cycle/9.0 hrs.×1 hr./60 min. or 0.0732 gal./min.

The volume of CAN-17 nitrate feedstock used is 150 acres×16.48 lbs./acre NO3− (as N)×100%/11.6%×1 gal./12.64 lbs. or 1686 gallons, which is charged continuously during 62.6 irrigation periods at a feed rate of 1686 gal./62.6 cycles×1 cycle/9.0 hrs.×1 hr./60 min. or 0.0499 gal./min.

The same magnitude of differences between conventional slug-fed fertigation and the continuous fertigation of the present invention exists for every fertilizer component and for every irrigation time-period (March through May, June through August and the like). The nitrate nitrogen exemplified here and others below are merely presented for illustration purposes.

Further, as seen from this comparison using nitrate nitrogen as an example, the continuous fertigation of the present invention is far more efficient and effective than conventional slug-fed fertigation because the crop is receiving the right level of fertilizer continuously and no fertilizer is being wasted. In addition, if after the start of the irrigation time period, the weather conditions change from those predicted or there is a change in the nutrient needs of the crops for any reasons, the continuous fertigation of the present invention can be readily adjusted to levels appropriate for the altered needs, while no post-time-period-start adjustments can be made in a slug-fed fertigation because all of the fertilizers have been added to the soil.

The impact of the system and method of the present invention are again reflected in the feed rates. Conventional slug-fed feed rate is 6.62 gal./min. for a nitrate nitrogen addition of 20.43 lbs./acre for UAN-32 on March 10 and conventional slug-fed rate is 6.24 gal./min. for nitrate addition of 32.96 lbs./acre for CAN-17 on March 15. In contrast, using the system and method of the present invention, the feed rates are 0.0732 gal./min. and 0.0499 gal./min. for nitrate nitrogen at a level of 36.77 lbs./acre, whereby the slug-fed rate is 90.4 and 125.1 times higher respectively, although approximately the same amount nitrate nitrogen is ultimately fed.

As seen in the above comparison, the system and method of the present invention can charge the fertilizer-nutrient feedstock to the irrigation system because so little fertilizer is being charged into the irrigation water at any time interval that any exotherms or interaction between the fertilizers or interaction between the fertilizers and the hard alkaline irrigation water are dampened.

Slug Feed—Comparative Example E Projection (Potassium (as K2O)):

On March 30 potassium (as K2O) is slug fed into the irrigation system. Specifically, 125.0 lbs./acre potassium (as K2O) from a potassium thiosulfate source is fed to 150 acres at a flow rate of 1200 gallons/min. for this grower's normal 9.0 hour irrigation period. The potassium (as K2O) concentration in the irrigation water during this slug fertigation process is: (125.0 lbs./acre potassium (as K2O)×150 acres×1000 grams/2.2 lbs.)/(1200 gal./min.×9 hrs.×60 min./hr.×3.78 liters/gal.×1000 ml/1 liter) or 3,479 ppm potassium (as K2O). This high concentration of potassium (as K2O) cannot be fed simultaneously with, or immediately after, the slug feeding of other fertilizers because of the incompatibilities with other fertilizers.

The amount of water used during this slug fertigation process is, using the parameter that an ac-ft (acre-foot) is 325,851 gallons of water: 1200 gal./min.×60 min./hr.×9 hrs. or 648,000 gal.×1 ac-ft/325,851 gal. or 1.99 ac-ft. The 1.99 ac-ft of water is distributed over 150 acres and therefore the per-acre water distribution (1.99 ac-ft/150 acres) is 0.0133 ac-ft/acre.

The next slug feed fertigation of potassium is September 15. The total evenly-distributed irrigation water to be delivered during April through September 15 is 3.292 ac-ft. Therefore the amount of irrigation water delivered during the period of April 1st (the day after the March 30th slug feeding) and September 14th (the day before the September 15th slug feeding) is about "(1 ac-ft/acre×(2.0 months/3.0 months))+2.5 ac-ft/acre+(0.5 ac-ft/acre×(0.5 month/2.0 months))" or 3.292 ac-ft/acre, and it will contain no potassium (as K2O) fertilizer. Again, this grower's normal irrigation period is 9 hours per day. Therefore after the single slug feed of fertilizer there are about "[(3.292 ac-ft/acre)/(0.0133 ac-ft/acre)−1]" or 246.5 irrigation periods on which no potassium (as K2O) fertilizer is delivered with the irrigation water.

Continuous Feed—Example 5 Projection (Potassium (as K2O)):

A total of 100.0 lbs./acre potassium (as K2O) is continuously charged at a low concentration (15.8 ppm potassium (as K2O) as shown below) to the irrigation water distributed during each irrigation period during the months of March, April, May, June, and July (from March 1 up to, but not including, August 1). This low concentration of potassium (as K2O), unlike the high concentration slug fed as described above, can be charged simultaneously with other low-concentration fertilizer feedstocks, and therefore this continuous feeding begins on the desired March 1 date.

For purposes of comparison to the slug-fed projection above, only the potassium (as K2O) charged, and the irrigation water delivered, during the time period of between March 30 and July 31 is compared. The comparative (normalized) amount of potassium (as K2O) charged between March 30 and July 31 is 100.0 lbs./acre potassium. The potassium (as K2O) concentration in the irrigation water during this continuous fertigation process is: (100.0 lbs./acre×150 acres× 1000 grams/2.2 lbs.)/(2.333 ac-ft/acre×325,851 gal./ac-ft× 3780 ml/gal.×150 acres) or 15.8 ppm potassium (as K2O).

In other words, in this Example 5 projection, potassium is continuously delivered with the 2.333 ac-ft of irrigation water delivered during the 175.4 nine-hour irrigation periods from March 30 through July 31, while in the Comparative Example E projection, the entire fertilizer is added only during the first nine-hour irrigation period. Further, the potassium (as K2O) charged in Example 5 is 25% less than in Comparative Example E because, given the rate of potassium uptake by a plant, this 75% lower amount is sufficient to maintain a constant supply of potassium in the wetted root zone throughout the March 1 through July 31 time period. In contrast, the higher amount of potassium is required in Comparative Example E to at least partially compensate for the amount of potassium in the single slug feeding that is later washed away from the wetted root zone before uptake by a plant.

Again, another difference between the slug feeding of Comparative Example E and the present invention's continuous feeding of Example 5 is the rate of fertilizer addition. Again to fully illustrate the magnitude of this difference, the feed rate are provided below.

Slut Feed—Feed Rate of Comparative Example E Projection (Potassium (as K2O))

In the slug feeding projection of Comparative Example E, the source of the 125 lbs./acre of potassium (as K2O) is a potassium thiosulfate (K2SSO3) feedstock which is 25.0 percent potassium (as K2O) and has a density of 12.64 lbs./gal. The volume of the potassium thiosulfate feedstock used is: 150 acres×125.0 lbs./acre potassium (as K2O)×100%/ 25.0%×1 gal./12.64 lbs. or 5934 gallons. This 5934 gallons is then applied to the 150 acres in a 9.0 hr. period which means the feed rate is: 5934 gal./9.0 hrs.×1 hr./60 min.=10.99 gal./ min. (continuously throughout a nine hour irrigation period).

Continuous Feed—Feed Rate of Example 5 Projection (Potassium (as K2O)):

In the continuous feeding projection of Example 5, which again will be illustrated as the normalized (March 30 through July 31) feeding of 100.0 lbs. of potassium (as K2O), the source being potassium thiosulfate having 25% potassium (as K2O) and a density of 12.64 lb./acre. The volume of potassium thiosulfate feedstock used is: 150 acres×100 lbs./acre potassium (as K2O)×100%/25%×1 gal./12.64 lbs. or 4747 gallons.

The feed rate of this 4747 gallons, which is charged continuously for delivery to 150 acres 175.4 nine-hour irrigation periods, is: 4747 gal./175.4 periods×1 period/9.0 hrs.×1 hr./ 60 min. or 0.0501 gal./min.

Therefore the feed rate of the present invention's Example 5 projection is 0.0501/10.99, or 0.46%, that of the feed rate of the Comparative Example E projection. In other words, the feed rate of the Comparative Example E projection is 10.99/ 0.0501, or 219.4% faster than the feed rate of the present invention's Example 5 projection. In other words, the conventional slug-feeding feed rate is 10.99 gal./min. for a potassium addition of 125.0 lbs./acre (as K2O), the continuous-feed feed rate of the present invention is 0.0501 gal./min. for a potassium addition 100.0 lbs./acre (as K2O), and therefore the slug-feed is (10.99 gal./min)/(0.0501 gal./min.) or 219 times faster.

Continuous Feed—Responsive to Shifting Conditions, Example 5 Projection (Potassium (as K2O)):

Although this Example 5 projection for potassium (and likewise any of the chemicals being added or produced) for a distinct irrigation period, it is easily seen that if the weather changes or a crops need changes their nutrient profile for any reason, the method and system of the present invention is, or preferably is, responsive to those changes. In contrast, once a single shot (slug feeding) of fertilizer is delivered to the crop as in the conventional method (such as shown in Comparative Example E), no responsive changes can be made because everything has already added to the soil. The method of the present invention, unlike the conventional slug feeding method, is not locked in to any feed rate of components. In other words, any blend can be injected at any time providing the best fertigation profile with absolutely no waste because the fertilizer is injected exactly when the crop needs it, instead of meeting equipment and labor constraints as occurs with the slug feed approach.

Slug Feed—Comparative Example E Projection (Calcium, Phosphorus):

This projection does not take into account the water-quality factor, which is discussed separately below.

On March 15 calcium (as Ca) is slug fed into the irrigation system. Specifically, 25.00 lbs./acre calcium (as Ca) from a CAN-17 source is fed to 150 acres at a flow rate of 1200 gallons/min. for this grower's normal 9.0 hour irrigation period. (CAN is an acronym for an aqueous solution of calcium nitrate and ammonium nitrate.) The calcium (as Ca) concentration in the irrigation water during this slug fertigation process therefore is: (25.00 lbs./acre calcium (as Ca)× 150 acres×1000 grams/2.2 lbs.)/(1200 gal./min.×9 hrs.×60 min./hr.×3.78 liters/gal.×1000 ml/1 liter) or 695.9 ppm calcium (as Ca). The amount of water used during this slug fertigation process is, using the parameter that an ac-ft (acre-foot) is 325,851 gallons of water: 1200 gal./min.×60 min./ hr.×9 hrs. or 648,000 gal.×1 ac-ft/325,851 gal. or 1.99 ac-ft.

The 1.99 ac-ft of water is distributed over 150 acres and therefore the per-acre water distribution (1.99 ac-ft/150 acres) is 0.0133 ac-ft/acre. The next slug feed fertigation is June 1. The total evenly-distributed irrigation water to be delivered during March, April, and May is 1 ac-ft. Therefore the amount of irrigation water delivered during the period of March 16th (the day after the March 15th slug feeding) and May 30 (the day before the June 1 slug feeding) is about "1 ac-ft/acre×(2.5 months/3.0 months)" or 0.833 ac-ft/acre, and it will contain no CAN-17 fertilizer. Again, this grower's normal irrigation period is 9 hours per day. Therefore after the single slug feed of fertilizer there are about "[(0.833 ac-ft/acre)/(0.0133 ac-ft/acre)−1]" or 61.6 irrigation periods on which no calcium fertilizer is delivered with the irrigation water.

As seen from the above, the calcium and phosphorus fertilizers are slug fed on different days, namely the calcium fertilizer on March 15, June 1 and September 1, and the phosphorus fertilizer on March 1 and October 30. These fertilizers are not slug fed simultaneously because the slug-fed calcium concentration is vastly higher than the threshold level beyond which precipitation will occur when added together with phosphate. In more detail, when added as shown above, namely 25.00 lbs/acre calcium (as Ca) with a water usage of 0.0133 ac-ft/acre on March 15, 15.00 lbs./acre calcium (as Ca) with a water usage of 0.0133 ac-ft/acre on June 1 and 10.00 lbs./acre calcium (as Ca) with a water usage of 0.0133 ac-ft/acre on September 1, the calcium addition rate is 695.9 ppm calcium (as Ca) or 1740 ppm (as CaCO3) on March 15, 417.5 ppm calcium (as Ca) or 1044 ppm (as CaCO3) on June 1 and 278.4 ppm calcium (as Ca) or 695.9 ppm (as CaCO3) on September 1. (Using the same calculation method, the addition rate of 25.00 lbs/acre phosphate (as P2O5) on March, 1 and 15.00 lbs/acre phosphate (as P2O5) on October 30 is 931.1 ppm PO4-3 and 558.7 ppm PO4-3, respectively.)

For the first injection of a phosphate fertilizer the maximum amount of calcium that can be present in the irrigation water concomitantly with that phosphate-based fertilizer, at a water pH of 6.5, is 2.5 ppm calcium (as Ca). For the second injection of a phosphate fertilizer the maximum amount of calcium that can be present in the irrigation water concomitantly with that phosphate-based fertilizer, at a water pH of 6.5, is 4.2 ppm calcium (as Ca). The 695.9 ppm (as Ca) addition rate is about 278 times higher than that threshold for the first injection of phosphate fertilizer. The 278.4 ppm (as Ca) addition rate is about 66.3 times higher than that threshold for the second injection of phosphate fertilizer. Even if the addition rates were lowered by 50% via calcium additions on six rather than three fertigation days and the phosphate four rather than two irrigation days, the calcium addition rate would still be vastly higher than the solubility threshold.

Continuous Feed—Example 5 Projection (Calcium):

This projection does not take into account the water-quality factor, which is discussed separately below.

These projections are first set out here as if the phosphate addition during the various time periods did not occur. The profile with phosphate addition are described thereafter.

A total of 15.00 lbs./acre of calcium (as Ca) is continuously charged to the irrigation water distributed during each irrigation period during the months of March, April and May (from March 1 up to, but not including, June 1). It is noted that any fertilizer feedstock and therefore the calcium is delivered to the crop at the time it is needed, and not merely when a tank or manpower is available as seen when conventional slug-fed fertigation techniques are used. The present invention is also illustrated below in this Example 5 for the subsequent irrigation periods that have a different water usage.

The calcium (as Ca) concentration in the irrigation water during the continuous fertigation process from March 1 through May 31 (a 1.0 ac-ft/acre water usage period) is: (15.00 lbs./acre×150 acres×1000 grams/2.2 lbs.)/(1.0 ac-ft/acre×325,851 gal./ac-ft×3780 ml/gal.×150 acres) or 5.54 ppm calcium (as Ca).

The calcium (as Ca) concentration in the irrigation water during the continuous fertigation process from June 1 through August 31 (a 2.5 ac-ft/acre water usage period) is: (10.00 lbs./acre×150 acres×1000 grams/2.2 lbs.)/(2.5 ac-ft/acre×325,851 gal./ac-ft×3780 ml/gal.×150 acres) or 1.48 ppm calcium (as Ca).

The calcium (as Ca) concentration in the irrigation water during the continuous fertigation process from September 1 through October 31 (a 0.5 ac-ft/acre water usage period) is: (10.00 lbs./acre×150 acres×1000 grams/2.2 lbs.)/(0.5 ac-ft/acre×325,851 gal./ac-ft×3780 ml/gal.×150 acres) or 7.38 ppm calcium (as Ca).

In this projection, and in the system and method of the present invention generally, the rate of chemical addition does not automatically change when the irrigation water usage or flow rate changes (unless the system is programmed to do so). When the amount of fertilizer (here, calcium (as Ca)) delivered during a 9 hour irrigation period is held constant regardless of the water usage, the concentration of calcium (as Ca) in the irrigation water is lower when the volume of irrigation water delivered during a 9 hour irrigation period is higher, as seen here for the from June 1 through August 31 time period. Similarly, the concentration of calcium (as Ca) in the irrigation water is higher when the volume of irrigation water delivered during a 9 hour irrigation period is lower, as seen here for the from September 1 through October 31 time period. This is an important distinction because this is the period where the plant/crop requires less or no nutrients, and a lower fertilizer level can be added providing better usage of the fertilizer by the plant as well as better economics. Unlike conventional fertigation methods, any of the fertilizer nutrients or crop-quality enhancers and any combinations of these nutrients or crop-quality enhancers can be charged simultaneously using the system and the method of the present invention provided that no solubility limits are exceeded.

Further, the calcium charged in this projection is less than in Comparative Example E because, given the rate of calcium uptake by a plant, this lower amount is sufficient to maintain a constant supply of calcium in the wetted root zone throughout the time period. In contrast, the higher amounts of calcium are required in Comparative Example E to at least partially compensate for the amount of calcium in the single slug feeding and mechanical application respectively which is later washed away from the wetted root zone before uptake by a plant.

Again, as mentioned elsewhere herein, the system and method of the present invention substantially eliminate the problems that arise from incompatibilities between fertilizers because solubility limits generally cannot be exceeded when feeding continuously at low levels. When conventional slug-feeding fertigation methods are used, the solubility limits between incompatible fertilizers are exceeded, and therefore such fertilizers must be fed on different days, and then only after washing out the feeding equipment. As an example, calcium fertilizers normally form very insoluble calcium phosphates in the presence of phosphate fertilizers, and therefore calcium fertilizers cannot be slug fed together phosphate fertilizers; doing so would cause massive, catastrophic plugging of the entire irrigation system.

Continuous Feed—Example 5 Projection (Calcium, Phosphorus):

The Example 5 calcium projections above provide the amount of calcium to be added continuously, and the concentrations of calcium in the irrigation water for two levels of water usage (volume of irrigation water per acre delivered to the soil in a nine-hour irrigation period) when calcium is continuously charged. Those concentrations of calcium (continuously charged) are used in this projection as the basis or groundwork for the calculation of calcium concentrations when fed at cyclic (recurring) intervals to avoid incompatibilities with phosphate.

This projection provides a profile regarding the calcium feeding simultaneously with a phosphate crop-quality enhancer, which would be charged as follows. From March 1 up to, but not including, June 1, the addition of 20.00 lb/acre phosphate (as P2O5), given a water usage of 1.00 ac-ft/acre, provides a concentration of 9.88 ppm PO4-3 in the irrigation water. From September 1 up to, but not including, November 1, the addition of 10.00 lb/acre phosphate (as P2O5), given a water usage of 0.50 ac-ft/acre, provides a concentration of 9.88 ppm PO4-3 in the irrigation water.

When simultaneously feeding both a calcium and the above-indicated amount of phosphate crop-quality enhancer at a water pH of 6.5 using the method and system of the present invention, the maximum amount of calcium that can be present in the irrigation water is 124 ppm calcium (as Ca). Exceeding that maximum will, due to calcium/phosphate interaction and/or precipitation, lead to plugging of the irrigation system. As indicated above, the calcium (as Ca) concentration in the irrigation water is 5.54 ppm calcium (as Ca) during the continuous fertigation process from March 1 through May 31 and is 7.38 ppm calcium (as Ca) during the continuous fertigation process from September 1 through October 31. (There is no addition of phosphate June through August.) The calcium-concentration threshold above which there is a irrigation-system plugging problem, is twenty-two times higher than the highest calcium concentration used in this projection during the period of March 1 through May 31 and is seventeen times higher than the highest calcium concentration used in this projection during the period of September 1 through October 31.

Slug Feed—Comparative Example E Projection (Calcium, Phosphorus, Water Quality):

The irrigation water at this site contains 60 ppm calcium (as Ca). As noted in the slug-feed projection above, calcium and phosphorus are fed on separate fertigation days to avoid interactions/precipitation arising from calcium and phosphate concentrations. That projection disregarded the 60 ppm calcium (as Ca) already present in the irrigation water.

The profile above provides fertigations on March 1 and October 30 that feed 928.4 ppm phosphate (as PO4-3) and 556.9 ppm phosphate (as PO4-3), respectively. No calcium is fed on these dates because the calcium solubility threshold is 5.54 ppm calcium (as Ca) and 7.38 ppm (as Ca), respectively. The 60 ppm calcium (as Ca) already present in the irrigation water is much higher than the 5.54 ppm (as Ca) and 7.38 ppm calcium (as Ca) threshold values, and therefore if that profile was followed, precipitation and plugging of the irrigation system would occur despite the precaution of not simultaneously slug feeding calcium and phosphate.

Continuous Feed—Example 5 Projection (Calcium, Phosphorus, Water Quality):

As noted above, the irrigation water at this site contains 60 ppm calcium (as Ca). As noted in the projection above, the continuous feed method and system of the present invention provides a concentration of 9.88 ppm PO4-3 in the irrigation water from March 1 up to, but not including, June 1, and a concentration of 9.88 ppm PO4-3 in the irrigation water from September 1 up to, but not including, November 1. The calcium concentration thresholds for these time periods are both 124.1 ppm calcium (as Ca) and the calcium concentrations from the continuous fertigations are 5.54 and 7.38 ppm calcium (as CaCO3) respectively. The addition of 60 ppm calcium (as Ca) already present in the irrigation water raises the calcium concentrations to about 65.5 and 67.4 ppm calcium (as Ca) respectively, which remain well below the thresholds of 124.1 ppm calcium (as Ca). In other words, despite the high calcium levels in the irrigation water itself, the continuous feed method and system of the present invention permits calcium and phosphate to be charged to the irrigation system simultaneously because the calcium-concentration threshold is about 1.9 times higher than the actual calcium concentration from March 1 up to, but not including, June 1, and the calcium-concentration threshold is about 1.8 times higher than the actual calcium concentration from is September 1 up to, but not including, November 1.

Examples 6-11

Micronutrient Augmented Feedstocks

The projections of Examples 15 through 20 exemplify micronutrient-augmented crop-quality-enhancement fertigation for six separate agricultural sites, including post-harvest fertigation prior to the crop cycles in five of the Examples. The amounts of the macronutrient-crop-quality-enhancer raw materials that are fed, and the amounts of micronutrient raw materials and specific micronutrients that are fed, for each example, each in terms of lb/acre of an element or defined moiety, per month for each fertigation month, are set forth below in Tables 17-22. The macronutrient raw materials ("Mac-RM") are described in Table 15 below and the micronutrient raw materials (Mic-RM) are described in Table 16 below. In Tables 17 to 22, the abbreviation "t-Me" means "total metals" (total micronutrients) and is used to delineate the total amount of micronutrient charged based on actives. The total amount of each micronutrient added during the crop cycles, or combined post-harvest and crop cycles of Examples 6-8, 10 and 11, for each of Examples 6 to 11, are set out in Table 23 below. The pH of the fertigation water was adjusted to a pH of 6.5 in each of Examples 6 to 11.

TABLE 15

| | |
|---|---|
| Mac-1 | A blend of ammonium nitrate and urea which contains 32.0% nitrogen (as N), namely 7.75% ammoniacal nitrogen (slow release nitrogen), 7.75% nitrate nitrogen (fast release nitrogen, calcium salt), and 16.5% urea nitrogen (very slow release nitrogen) |
| Mac-3 | Concentrated phosphoric acid solution (NPK of 0-42-0) |
| Mac-4 | Concentrated potassium hydroxide solution (NPK of 0-0-42) |

TABLE 16

| Micronutrient Raw Material ("RM") No. | Micronutrients in Percentage Order (highest to lowest) |
|---|---|
| Mic-1 | Fe, Mn, Zn, Mg, B and Cu salts |
| Mic-2 | Fe, Mn, Zn, Mg, Cu, Mo and Co salts |
| Mic-3 | Fe, Mn, Zn, Mg, B, Cu, Mo and Co salts |
| Mic-4 | Fe and Zn salts |
| Mic-5 | Zn, Fe, Mn, Mg, B and Cu salts |
| Mic-6 | Fe salts |

TABLE 17

Example 6

| | Mac-1 (as N) | Mac-1 (as Ca) | Mac-2 (as N) | Mac-3 (as P2O5) | Mac-4 (as K2O) | Mic-1 (as t-Me) |
|---|---|---|---|---|---|---|
| October-November | 35 | 18.1 | — | 40 | 45 | 0.355 |
| December-January | — | — | — | — | — | — |
| February | 30 | 15.5 | — | 22.5 | 20 | 0.473 |
| March | 40 | 20.7 | — | 22.5 | 30 | 1.419 |
| April | — | — | 40 | 15 | 50 | 0.355 |
| May | — | — | 35 | 10 | 50 | 0.355 |
| June | — | — | 15 | — | 30 | 0.355 |
| July | — | — | 10 | — | 25 | 0.355 |
| August-September | — | — | — | — | — | — |

TABLE 18

Example 7

| | Mac-1 (as N) | Mac-1 (as Ca) | Mac-2 (as N) | Mac-3 (P2O5) | Mac-4 (as K2O) | Mic-2 (as t-Me) |
|---|---|---|---|---|---|---|
| October-November | — | — | 30 | 25 | 40 | 0.170 |
| December-January | — | — | — | — | — | — |
| February | 50 | 25.8 | — | 25 | 40 | 0.170 |
| March | 50 | 25.8 | — | 25 | 50 | 0.170 |
| April | 50 | 25.8 | 20 | 25 | 60 | 0.170 |
| May | — | — | 50 | — | 40 | 0.170 |
| June | — | — | — | — | 30 | 0.170 |
| July | — | — | — | — | — | 0.170 |
| August-September | — | — | — | — | — | — |

TABLE 19

Example 8

| | Mac-1 (as N) | Mac-1 (as Ca) | Mac-2 (as N) | Mac-3 (as P2O5) | Mac-4 (as K2O) | Mic-3 (as t-Me) |
|---|---|---|---|---|---|---|
| October-November | — | — | 35 | 25 | 30 | 0.332 |
| December-January | — | — | — | — | — | — |
| February | 50 | 25.8 | — | 25 | 30 | 0.332 |
| March | 50 | 25.8 | — | 25 | 30 | 0.332 |
| April | — | — | 50 | 15 | 50 | 0.332 |
| May | — | — | 50 | 15 | 50 | 0.332 |
| June | — | — | 10 | — | 30 | — |
| July | — | — | 5 | — | 15 | — |
| August-September | — | — | — | — | — | — |

TABLE 20

Example 9

| | Mac-1 (as N) | Mac-1 (as Ca) | Mac-2 (as N) | Mac-3 (as P2O5) | Mac-4 (as K2O) | Mic-4 (as t-Me) |
|---|---|---|---|---|---|---|
| January | — | — | — | — | — | — |
| February | 10 | 5.2 | — | 10 | 10 | 0.250 |
| March | 25 | 12.9 | — | 15 | 25 | 0.250 |
| April | 25 | 12.9 | — | 15 | 25 | 0.250 |
| May | 25 | 12.9 | — | 15 | 25 | 0.250 |
| June | 25 | 12.9 | — | 15 | 25 | 0.250 |
| July | 25 | 12.9 | — | 15 | 25 | 0.250 |
| August | 25 | 12.9 | — | 15 | 25 | 0.250 |
| September | 25 | 12.9 | — | 15 | 25 | 0.250 |
| October-December | — | — | — | — | — | — |

TABLE 21

Example 10

| | Mac-1 (as N) | Mac-1 (as Ca) | Mac-2 (as N) | Mac-3 (as P2O5) | Mac-4 (as K2O) | Mic-5 (as t-Me) |
|---|---|---|---|---|---|---|
| September 15-November | 35 | 18.1 | — | 20 | 10 | 0.142 |
| December-January | — | — | — | — | — | — |
| February | 25 | 12.9 | — | 15 | 10 | 0.213 |
| March | 65 | 33.6 | — | 20 | 40 | 0.426 |
| April | 75 | 38.8 | — | 15 | 50 | 0.142 |
| May | 85 | 44 | — | 10 | 50 | 0.142 |
| June | 15 | 7.8 | — | — | 20 | 0.142 |
| July-September. 14 | — | — | — | — | — | — |

TABLE 22

Example 11

| | Mac-1 (as N) | Mac-1 (as Ca) | Mac-2 (as N) | Mac-3 (as P2O5) | Mac-4 (as K2O) | Mic-6 (as t-Me) |
|---|---|---|---|---|---|---|
| October-November | 35 | 18.1 | — | 40 | 45 | 0.286 |
| December-January | — | — | — | — | — | — |
| February | 30 | 15.5 | — | 22.5 | 20 | 0.286 |
| March | 40 | 20.7 | — | 22.5 | 30 | 0.286 |
| April | — | — | 40 | 15.10 | 50 | 0.286 |
| May | — | — | 35 | — | 50 | 0.286 |
| June | — | — | 15 | — | 30 | 0.286 |
| July | — | — | 10 | — | 25 | 0.286 |
| August-September | — | — | — | — | — | — |

TABLE 23

Total Macronutrients and Micronutrients Added (all in lb/acre)

| | Ex. 6 | Ex. 7 | Ex. 8 | Ex. 9 | Ex. 10 | Ex. 11 |
|---|---|---|---|---|---|---|
| Macronutrients | | | | | | |
| N (as N) | 205 | 250 | 250 | 185 | 300 | 205 |
| Ca (as Ca) | 54.3 | 77.4 | 51.6 | 95.5 | 155.3 | 54.3 |
| P (as P2O5) | 110 | 80 | 100 | 110 | 80 | 110 |
| (K as K2O) | 250 | 260 | 225 | 185 | 180 | 250 |
| Micronutrients | | | | | | |
| Fe | 0.772 | 0.310 | 0.310 | 0.667 | 0.600 | 2.000 |
| Mn | 0.772 | 0.310 | 0.310 | 1.333 | 0.254 | — |
| Zn | 1.823 | 0.310 | 0.310 | 1.333 | 0.254 | — |
| Mg | 0.234 | 0.050 | 0.050 | — | 0.077 | — |
| B | 0.052 | — | 0.800 | — | 0.017 | — |
| Cu | 0.012 | 0.150 | 0.150 | — | 0.004 | — |
| Mo | — | 0.030 | 0.030 | — | — | — |
| Co | — | 0.030 | 0.030 | — | — | — |

In these six examples (Examples 6-11), crop-quality-enhanced fertigation over four to six months during crop cycles, and in some, but not all, instances over one and a half to two months after the prior harvest, for the benefit of the subsequent crop cycle, are shown. In each example, one or more micronutrients are included in the feedstock together with macronutrients over the fertigation period, or part thereof, and in Example 7 micronutrient addition is continued beyond macronutrient addition. The micronutrients preferably are charged in an available form, such as soluble salts and chelates, and are charged at levels below the precipitation threshold.

The present invention in some embodiments is a system for continuous crop-quality-enhancement fertigation of an agricultural field under the irrigation of an active agricultural irrigation system. Such continuous crop-quality-enhancement fertigation includes charging a crop-quality-enhancer feedstock to the active agricultural irrigation system, wherein the active agricultural irrigation system has flowing irrigation water upstream of the agricultural field. The crop-quality-enhancer feedstock is comprised of one or more crop-quality enhancers (which are also referred to herein as raw materials and which may, but need not be, co-reactants). The crop-quality-enhancer feedstock may be comprised of (a) a plurality of co-reactant crop-quality enhancers (which are also referred to herein as co-reactants), (b) one or more non-co-reactant crop-quality enhancers (which are also referred to herein as non-co-reactants) and (c) combinations thereof, and such co-reactant and non-co-reactant crop-quality enhancers generate an exotherm upon intermixing with the irrigation water and, at times, upon intermixing with each other.

The system for continuous crop-quality-enhancement fertigation has at least one, and possibly a plurality of, crop-quality-enhancer feed point(s) open to a stream of flowing irrigation water. The feed points (when there is a plurality of feed points) are sufficiently proximate each other and the stream of the irrigation water has sufficient flow to intermix the crop-quality enhancer(s) with the stream of flowing irrigation water. (The generation of dissolution exotherm(s) and any reaction exotherm would, of course, be experienced as merely an exotherm.) The feed points (when there are a plurality of feed points) are each preferably spaced-apart from the neighboring feed point(s) a distance of no more than about 10 inches, and more preferably no more than about 8 inches because, in preferred embodiments, the pH of the post-feed (treated) irrigation water is monitored upstream of the agricultural field. The length of the mainline along which such pH monitoring occurs might be twenty to thirty feet, or it might be only a few feet. In the former instances, closely proximate feed points and the positioning of the feed points well upstream of the pH monitoring point allows a good intermixing of the crop-quality enhancers ahead of the pH monitoring point. In the latter instances, closely proximate feed points positioned as far upstream of the pH monitoring point as practically possible are needed to provide a reasonable degree of intermixing of the crop-quality enhancers ahead of the monitoring point.

The stream of irrigation water also has a sufficient flow to dampen the dissolution exotherm(s) and any reaction exotherm(s). Such dissolution and reaction exotherms generally raise the temperature of the water which receives the crop-quality enhancer(s). In an irrigation system, the ambient temperature of the irrigation water depends on a number of factors, including the time of year (which impacts ambient outdoors air temperature) and the ambient temperature of the water source (which varies from very cold water, such as snow run-off, to rather warm water, such as well water in geothermal areas) and it can range from 35 to 100 degrees F. An excessive, and in instances dangerous, increase in water temperature would ensue if the irrigation water were static or had an insufficient flow to dampen the exotherm(s). A sufficient flow is difficult to adequately describe in terms of flow rates because main-line diameters and other factors differ drastically from one irrigation system to another. Therefore the sufficiency of flow is better described in terms of its ability to dissipate the heat of the exotherms, which in turn is measurable by the increase, if any, in the ambient water temperature of the irrigation water. In the present invention generally, an increase in temperature over ambient water temperature (which again can be very cold to rather warm) is no more than about 60 degrees F. and is dependent on the co-reactants being fed, and rate at which they are being fed, and individual characteristics of the irrigation system being served. In preferred embodiments the dissolution exotherm(s) and any reaction exotherm(s) are dampened to the extent that a temperature increase is no more than 40 degrees F. over ambient irrigation water temperature, and more preferably no more than 20 degrees F. over ambient irrigation water temperature.

The system of the present invention has means for separately and simultaneously feeding at least one, and possibly a plurality of, crop-quality-enhancer(s) to the stream of flowing irrigation water whereby treated irrigation water is formed. As described above for the systems shown in FIG. 1 to FIG. 4, such means can include feed lines, each running from a supply of a crop-quality enhancer to a feed point, and the various controls described for activating and maintaining the feeding of a crop-quality enhancer, and in certain embodiments the simultaneous feeding of crop-quality enhancers, to the stream of flowing irrigation water. Upon the feeding of the crop-quality enhancer(s) to the stream of flowing irrigation water, the crop-quality enhancers intermix with the irrigation water and any included additional crop-quality enhancers, and in certain embodiments react and disassociate as described above, and convert the irrigation water to treated irrigation water (the irrigation water now being a vehicle carrying the crop-quality enhancer(s) to the agricultural field).

The present invention does not exclude, but is not limited to, simultaneously feeding two or more co-reactant crop-quality-enhancers with or without one or more non-co-reactant crop-quality-enhancer. Every co-reactant would be a crop-quality enhancer co-reactant with at least one other crop-quality-enhancer being simultaneously fed or it would not be a co-reactant crop-quality-enhancer as that term is used herein.

The irrigation system includes means for irrigating the agricultural field with the treated irrigation water, which means are the transport pipe lines and micro-irrigation type of emitters or the like, or overhead sprinkling systems.

The crop-quality-enhancer feed point(s) preferably open to a high-dilution environment and therefore the crop-quality enhancer(s) are fed to a high-dilution environment. Feeding to such a high-dilution environment is preferred because a greater dampening of exotherms will be realized. Embodiments of the system of the present invention in which the crop-quality enhancer(s) are fed to a high-dilution environment include feeding to the stream of flowing irrigation water flowing through the main line of an irrigation system at a section upstream of the agricultural field, and in such embodiments the feed point(s) are disposed along the main line. Embodiments of the system of the present invention in which the crop-quality enhancer(s) are fed to a high-dilution environment also include feeding to a stream of irrigation water flowing through a side-arm mixing chamber (which discharges to the main line) and then the feed point(s) are disposed along the side-arm mixing chamber. In the latter instance, the fast flow and discharge to the main line are a sufficiently high-dilution environment to dampen exotherms although monitoring the water temperature in this region is prudent while monitoring water temperature in the former embodiments can be unnecessary.

In preferred embodiments, the system of the present invention includes means to commence the feed of crop-quality enhancer(s) upon the water stream reaching a first pre-selected degree of flow, means to halt the feed upon the stream reaching a second pre-selected degree of flow, and means to separately provide a pre-selected degree of feed through each of the feed point(s), such as the components described above for the systems shown in FIG. 1 through FIG. 4.

In preferred embodiments, the system of the present invention includes means to determine the pH of the treated irrigation water upstream of the agricultural field, such as the components described above for the systems shown in FIG. 1 through FIG. 4. The point for determining the pH of the treated irrigation water is of course downstream of the feed point(s) because irrigation water is converted to treated irrigation water only upon receiving the crop-quality enhancer(s). Preferably the pH of the treated irrigation water has sufficient time to stabilize prior to being monitored and therefore the monitoring of the pH, or the sampling for the pH monitoring, is as far downstream of the feed point(s) as practicalities permit. For this same reason, namely to space apart the feed point(s) and pH monitoring point, the feed points, when there are a plurality of feed points, are preferably close to each other, for instance no more than about ten inches apart from adjacent feed points. A distance between adjacent feed points of from about six to about eight inches is very practical. When the length of main line available is only about three feet, the feed point(s) are preferably placed as far upstream as possible and the pH monitoring point is placed as far downstream as practical so as to leave the longest stretch of line between them as is practical. When the length of available main line is thirty-five feet, it is still desirable to place the feed point(s) well upstream and the pH monitoring point well downstream for optimal pH stabilization.

The method of the present invention preferably uses the system of the present invention. The method of the present invention is a method of continuous crop-quality-enhancement fertigation of an agricultural field. This method is practiced or implemented only for an active irrigation system having flowing irrigation water upstream of the agricultural field. In broad embodiments of the present invention, the method comprises the steps of: (step 1) continuously charging a crop-quality-enhancer feedstock comprised of at least one crop-quality enhancer to the active agricultural irrigation system by sub-step 1a and optionally sub-step 1b of: (sub-step 1a) continuously charging a first crop-quality enhancer to a stream of flowing irrigation water upstream of the agricultural field at a first feed point; and (sub-step 1b) simultaneously charging a second crop-quality enhancer to the stream of flowing irrigation water at a second feed point. The stream of flowing irrigation water has sufficient flow to intermix the crop-quality enhancer(s) with the irrigation water, generating at least one dissolution exotherm and possibly at least one reaction exotherm. The stream of flowing irrigation water has sufficient flow to dampen the dissolution (and any reaction) exotherm(s). The irrigation water is converted to treated irrigation water. Then (step 2) the agricultural field is irrigated with the treated irrigation water. In preferred embodiments, the flow of the stream of flowing irrigation water is sufficient to dampen the dissolution (and any reaction) exotherm(s) to a maximum temperature increase of 40 degrees F. over ambient irrigation water temperature, and more preferably 20 degrees F. over ambient irrigation water temperature. In various preferred embodiments the method includes, in sub-steps 1a, and optionally sub-step 1b, charging of the first, and possibly second or more crop-quality enhancer(s) to a high-dilution environment, such as charging of the first, or more, crop-quality enhancer(s) to the main line and charging to a side-arm mixing chamber that discharges to the main line.

In preferred embodiments of the method of the present invention, when the crop-quality enhancers are available in concentrated form, they are used in concentrated form, for instance sulfuric acid in an aqueous solution containing from 50 to 98 wt. percent sulfuric acid, or an aqueous solution containing from 50 to 71 wt. percent nitric acid or phosphoric acid in an aqueous solution containing from 65 to 85 wt. percent phosphoric acid, or potassium hydroxide as a 35 to 50 wt. percent aqueous solution, urea as a 40 to 50 wt. percent aqueous solution, ammonium hydroxide as a 20 to 29 wt. percent aqueous solution and ammonia as a 95 to 100 wt. percent gas.

In other preferred embodiments, the method further includes the steps of selecting a target pH, determining the pH of the treated irrigation water, and charging an acid to the stream of flowing irrigation water in an amount sufficient to adjust the pH of the treated irrigation water to a target pH.

In preferred embodiments, the methods described above further explicitly include a crop-quality-enhancer feedstock that includes one or more micronutrient-crop-quality enhancers such as Fe, Mn, Zn, Mg, B, Cu, Mo and Co salts and chelants thereof.

While the foregoing written description of the invention enables one of ordinary skill in the art to make and use the invention, and to make and use what is presently considered the best mode of the invention, those of ordinary skill in the art will understand and appreciate the existence of variations, combinations and equivalents of the specific embodiments, methods and examples provided herein. The present invention should not be limited by the above described embodiments, methods and examples.

We claim:

1. A method of crop-quality-enhancement fertigation of an agricultural field, said agricultural field being irrigated by means of an active irrigation system having a stream of flowing irrigation water upstream of said agricultural field, said method comprising the steps of:

(step 1) converting said irrigation water to treated irrigation water by continuously charging a crop-quality-enhancer feedstock comprised of a first crop-quality enhancer, a second crop-quality enhancer and a micronutrient-crop-quality enhancer to said stream of flowing irrigation water at respectively a first feed point, a second feed point and a third feed point, generating a dissolution exotherm, wherein said first crop-quality enhancer is selected from the group consisting of sulfuric acid in an aqueous solution containing from 50 to 98 wt. percent sulfuric acid, nitric acid in an aqueous solution containing from 50 to 71 wt. percent nitric acid and phosphoric acid in an aqueous solution containing from 65 to 85 wt. percent phosphoric acid, wherein said second crop-quality enhancer is selected from the group consisting of potassium hydroxide as a 35 to 50 wt. percent aqueous solution, urea as a 40 to 50 wt. percent aqueous solution, ammonium hydroxide as a 20 to 29 wt. percent aqueous solution and ammonia as a 95 to 100 wt. percent gas, wherein said stream of flowing irrigation water has sufficient flow to intermix said crop-quality enhancer with said irrigation water and dampen said dissolution exotherm;

(step 2) irrigating said agricultural field with said treated irrigation water; and (step 3) repeating step 1 and step 2 each irrigation day.

2. The method of crop-quality-enhancement fertigation of an agricultural field of claim 1 wherein said micronutrient-crop-quality enhancer is selected from the group consisting of Fe, Mn, Zn, Mg, B, Cu, Mo, Co salts and chelants thereof.

3. The method of crop-quality-enhancement fertigation of an agricultural field of claim 1 wherein said flow of said stream of flowing irrigation water is sufficient to dampen said dissolution exotherm to a maximum temperature increase of 20 degrees F. over ambient irrigation water temperature.

4. The method of crop-quality-enhancement fertigation of an agricultural field of claim 1 wherein said agricultural irrigation system includes a main line upstream of said agricultural field, and wherein said charging of said crop-quality-enhancer feedstock to said stream of flowing irrigation water is a charging of said crop-quality-enhancer feedstock to said main line.

5. A method of crop-quality-enhancement fertigation of an agricultural field under the irrigation of an active agricultural irrigation system using a continuous crop-quality-enhancement fertigation system, said active agricultural irrigation system having a stream of flowing irrigation water upstream of said agricultural field, a main line and a side-arm mixing chamber off said main line, wherein said stream of flowing irrigation water is flowing through said side-arm mixing chamber and discharging to said main line, said crop-quality-enhancement fertigation system having a first feed point and a second feed point, said first and second feed points being disposed along said side-arm mixing chamber and open to said stream of flowing irrigation water, wherein said stream of flowing irrigation water has sufficient flow to intermix a first crop-quality enhancer and a micronutrient-crop-quality enhancer with said stream of flowing irrigation water, generating at least one dissolution exotherm, and wherein said stream of flowing irrigation water has sufficient flow to dampen said dissolution exotherm, and means for feeding said first crop-quality enhancer and said micronutrient-crop-quality enhancer to said stream of flowing irrigation water whereby treated irrigation water is formed, wherein said agricultural irrigation system includes means for irrigating said agricultural field with said treated irrigation water, said method comprising the steps of:

(step 1) continuously feeding a crop-quality-enhancer feedstock comprised of said first crop-quality enhancer and said micronutrient-crop-quality enhancer at respectively said first feed point and said second feed point to said stream of flowing irrigation water flowing through said side-arm mixing chamber and discharging to said main line at levels within the system solubility limits, whereby said irrigation water is converted to treated irrigation water;

(step 2) irrigating said agricultural field with said treated irrigation water; and (step 3) repeating step 1 and step 2 each irrigation day.

6. The method of crop-quality-enhancement fertigation of an agricultural field of claim 5 wherein said system further includes means to regulate the feed of said first crop-quality enhancer and the feed of said micronutrient-crop-quality enhancer being fed to said stream of flowing irrigation water through respectively said first feed point and said second feed point, including means to commence said feed upon said stream reaching a first pre-selected degree of flow, means to halt said feed upon said stream reaching a second pre-selected degree of flow, and means to provide a pre-selected degree of feed through said feed point, wherein, in said step 1, said continuous feeding of said first crop-quality enhancer and said micronutrient-crop-quality enhancer commences upon said stream reaching a first pre-selected degree of flow and halts upon said stream reaching a second pre-selected degree of flow.

7. The method of crop-quality-enhancement fertigation of an agricultural field of claim 5, wherein said micronutrient-crop-quality enhancer is selected from the group consisting of Fe, Mn, Zn, Mg, B, Cu, Mo and Co salts and chelants thereof.

8. The method of crop-quality-enhancement fertigation of an agricultural field of claim 5, wherein said micronutrient-crop-quality enhancer is selected from the group consisting of Fe, Mn, Zn, Mg and B salts and chelants thereof.

9. The method of crop-quality-enhancement fertigation of an agricultural field of claim 5, wherein said crop-quality-enhancer feedstock includes a second crop-quality enhancer and wherein said first crop-quality enhancer and said second crop-quality enhancer are respectively sulfuric acid in an aqueous solution containing from 50 to 98 wt. percent sulfuric acid and a crop-quality enhancer selected from the group consisting of potassium hydroxide as a 35 to 50 wt. percent aqueous solution, urea as a 40 to 50 wt. percent aqueous solution, ammonium hydroxide as a 20 to 29 wt. percent aqueous solution and ammonia as a 95 to 100 wt. percent gas.

10. The method of crop-quality-enhancement fertigation of an agricultural field of claim 5, wherein said crop-quality-enhancer feedstock includes a second crop-quality enhancer and wherein said first crop-quality enhancer and said second crop-quality enhancer are respectively nitric acid in an aqueous solution containing from 50 to 71 wt. percent nitric acid and a crop-quality enhancer selected from the group consisting of potassium hydroxide as a 35 to 50 wt. percent aqueous solution, urea as a 40 to 50 wt. percent aqueous solution, ammonium hydroxide as a 20 to 29 wt. percent aqueous solution and ammonia as a 95 to 100 wt. percent gas.

11. The method of crop-quality-enhancement fertigation of an agricultural field of claim 5, wherein said crop-quality-enhancer-feedstock includes a second crop-quality enhancer and wherein said first crop-quality enhancer and said second crop-quality enhancer are respectively phosphoric acid in an aqueous solution containing from 65 to 85 wt. percent phosphoric acid and a crop-quality enhancer selected from the group consisting of potassium hydroxide as a 35 to 50 wt. percent aqueous solution, urea as a 40 to 50 wt. percent aqueous solution, ammonium hydroxide as a 20 to 29 wt. percent aqueous solution and ammonia as a 95 to 100 wt. percent gas.

12. The method of crop-quality-enhancement fertigation of an agricultural field of claim 5 wherein said flow of said stream of flowing irrigation water is sufficient to dampen said dissolution exotherm to a maximum temperature increase of 20 degrees F. over ambient irrigation water temperature.

13. A method of crop-quality-enhancement fertigation of an agricultural field, said agricultural field being irrigated by means of an active irrigation system having a stream of flowing irrigation water upstream of said agricultural field, said method comprising the steps of:

(step 1) converting said irrigation water to treated irrigation water by continuously charging a crop-quality-enhancer feedstock comprised of a first crop-quality enhancer, a second crop-quality enhancer and a micronutrient-crop-quality enhancer to said stream of flowing irrigation water at respectively a first feed point, a second feed point and a third feed point, wherein said first, second and third feed points are sufficiently proximate each other and wherein said stream of said irrigation water has sufficient flow to intermix said first crop-quality enhancer, said second crop-quality enhancer and said micronutrient-crop-quality enhancer with each other and with said irrigation water, generating at least one dissolution exotherm, wherein said stream of flowing irrigation water has sufficient flow to intermix said crop-quality enhancer with said irrigation water and dampen said dissolution exotherm;

(step 2) irrigating said agricultural field with said treated irrigation water; and (step 3) repeating step 1 and step 2 each irrigation day.

14. The method of crop-quality-enhancement fertigation of an agricultural field of claim 13 wherein said first feed point and said second feed point are spaced apart a maximum of ten inches.

15. The method of crop-quality-enhancement fertigation of an agricultural field of claim 13 wherein said flow of said stream of flowing irrigation water is sufficient to dampen said dissolution exotherm to a maximum temperature increase of 20 degrees F. over ambient irrigation water temperature.

16. The method of crop-quality-enhancement fertigation of an agricultural field of claim 13 wherein said agricultural irrigation system includes a main line upstream of said agricultural field, and wherein said charging of said crop-quality-enhancer feedstock to said stream of flowing irrigation water is a charging of said crop-quality-enhancer feedstock to said main line.

17. The method of crop-quality-enhancement fertigation of an agricultural field of claim 13, wherein said micronutrient-crop-quality enhancer is selected from the group consisting of Fe, Mn, Zn, Mg, B, Cu, Mo and Co salts and chelants thereof.

* * * * *